United States Patent
Cahill et al.

(10) Patent No.: US 6,535,855 B1
(45) Date of Patent: Mar. 18, 2003

(54) PUSH BANKING SYSTEM AND METHOD

(75) Inventors: Thomas Cahill, Newton, NJ (US); Steven Chabra, New York, NY (US); Vincent Clowney, Chatham, NY (US); John Cowan; Thomas Fitzgerald, both of New York, NY (US); Louis Fuertes, Westport; Lloyd O'Connor, Canaan, both of CT (US); Randy Schafer, New York; Richard Q. Schmidt, Huntington, both of NY (US); Fred Slavin, Manalapan, NJ (US); Leonid Vayner, Brooklyn, NY (US); Christopher P. Westerman, Ridgewood, NJ (US); Janet Wynn, New York; Wil Velarde, Brooklyn, both of NY (US)

(73) Assignee: The Chase Manhattan Bank, New York, NY (US)

( * ) Notice: Subject to any disclaimer, the term of this patent is extended or adjusted under 35 U.S.C. 154(b) by 0 days.

(21) Appl. No.: 09/052,777

(22) Filed: Mar. 31, 1998

Related U.S. Application Data

(60) Provisional application No. 60/067,987, filed on Dec. 9, 1997.

(51) Int. Cl.[7] ............................................. G06F 17/60
(52) U.S. Cl. .......................... 705/1; 340/540; 340/679; 340/870.01; 340/870.16
(58) Field of Search ................................ 705/35, 1, 40, 705/76, 50; 709/200, 217; 340/540, 679, 870.01, 870.16

(56) References Cited

U.S. PATENT DOCUMENTS

| | | | |
|---|---|---|---|
| 4,426,691 A | * 1/1984 | Kawasaki | 369/21 |
| 4,855,906 A | 8/1989 | Burke | 707/10 |

(List continued on next page.)

FOREIGN PATENT DOCUMENTS

| | | |
|---|---|---|
| EP | 0747844 | 12/1996 |
| JP | 06-324100 | * 11/1994 |
| WO | WO9423537 | 10/1994 |
| WO | WO9727546 | 7/1997 |
| WO | WO9803016 | 1/1998 |
| WO | 9838558 | 9/1998 |

OTHER PUBLICATIONS

American Banker, "Push Pull", Oct. 6, 1997.*
Ilgen; "Expert system as an operator interface for advanced controls"; Proceedings of the Industrial Computing Conference; Sep. 1993, Publ by the Industtrial Computing Society and Industrial Society of Publ by America, pp. 265–276; (Abstract Only.*
Matson et al: "Ultrasonic flowmeters offer reliable solution to stack monitoring. (Air Polution Sensing and Monitoring—PArt 5a) (Tutorial)"; I&CS (instrumentation & Control Systems); Feb. 1994, v67, n67, n2, p.67.*

(List continued on next page.)

*Primary Examiner*—Edward R. Cosimano
(74) *Attorney, Agent, or Firm*—Ostrolenk, Faber, Gerb & Soffen, LLP

(57) ABSTRACT

A software/hardware system which provides immediate, on-going interaction between an institution and its customers. The system communicates with customers/subscribers over numerous, different communication channels and actively screens market conditions for situations that could potentially impact its customers, based on the customers' unique situation and prearranged instructions. The system and method interacts with the institution's processing centers which handle incoming customer transactions and the system creates outgoing messages. The system has a decision making component used to make the decision in each case as to which information to push to the customer in the form of a message. The message is delivered to the customer via any communication channels presently known. The system allows the customer to respond electronically or by telephone or by fax or by any means, all of which are intended to allow the institution to receive the response information from the customer expeditiously and to enable the institution to act upon the customer's instructions.

41 Claims, 61 Drawing Sheets

U.S. PATENT DOCUMENTS

| | | | | |
|---|---|---|---|---|
| 4,930,071 A | | 5/1990 | Tou et al. | 707/4 |
| 5,167,011 A | | 11/1992 | Priest | 706/62 |
| 5,177,342 A | | 1/1993 | Adams | 235/379 |
| 5,220,501 A | * | 6/1993 | Lawlor et al. | 380/24 |
| 5,259,066 A | * | 11/1993 | Schmidt | 706/50 |
| 5,262,942 A | | 11/1993 | Earle | 705/37 |
| 5,412,753 A | | 5/1995 | Alston et al. | 706/11 |
| 5,461,624 A | | 10/1995 | Mazzola | 370/402 |
| 5,530,438 A | | 6/1996 | Bickham et al. | 340/825.34 |
| 5,586,218 A | | 12/1996 | Allen | 706/12 |
| 5,592,660 A | | 1/1997 | Yokota et al. | 707/8 |
| 5,615,110 A | | 3/1997 | Wong | 705/38 |
| 5,642,419 A | * | 6/1997 | Rosen | 380/23 |
| 5,655,081 A | | 8/1997 | Bonnell et al. | 709/202 |
| 5,673,430 A | | 9/1997 | Story | 455/4.2 |
| 5,692,128 A | * | 11/1997 | Bolles et al. | 709/224 |
| 5,708,422 A | | 1/1998 | Blonder et al. | 340/825.34 |
| 5,740,231 A | * | 4/1998 | Cohn et al. | 379/88.22 |
| 5,740,549 A | | 4/1998 | Reilly et al. | 705/14 |
| 5,790,793 A | | 8/1998 | Higley | 709/218 |
| 5,793,301 A | | 8/1998 | Patterson, Jr. et al. | 340/825.26 |
| 5,796,832 A | | 8/1998 | Kawan | 705/65 |
| 5,828,835 A | * | 10/1998 | Isfeld et al. | 709/200 |
| 5,867,153 A | | 2/1999 | Grandcolas et al. | 345/326 |
| 5,913,040 A | | 6/1999 | Rakavy et al. | 709/232 |
| 5,919,247 A | | 7/1999 | Van Hoff et al. | 709/217 |
| 5,933,816 A | * | 8/1999 | Zeanah et al. | 705/35 |
| 5,978,840 A | * | 11/1999 | Nguyen et al. | 709/217 |

OTHER PUBLICATIONS

Apply Your Marketing Talent to Promote On–Line Banking, Bank Marketing, May 1, 1996, pp. 25–30.

Roving Software, Inc., Mar. 13, 1998 Turnkey Active Personalization for Web Commerce at http://www.roving.com/home.htm.

Nations Bank, 1997, web page.

Meca Software LLC, Dec. 9, 1997 Press Release.

Press Release Nations Bank, Nov. 7, 1997.

Press Release Nations Bank, Nov. 10, 1997.

Article from American Banker, Jan. 31, 1998.

Information Week, May 19, 1997, p. 63–76, "Browsers for E–Mail".

Information Week, May 5, 1997, p. 198, "Incredible Shrinking Bandwidth".

Information Week, Apr. 21, 1997, p. 28, "Netscape adds Push Component".

Information Week, May 12, 1997, p. 60, "Barnes & Noble Ventures Online".

Apr. 1997, "Banks Get Pushy".

Wired Magazine, Mar. 1997, "Push!".

Information Week, Dec. 15, 1997 "Lost in the Translation" p. 111.

Information Week, Dec. 15, 1997, p. 548,52, "Explorer Gains Fame".

Information Week, undated, "Documents Get a Push".

Brochure of Wayfarer Communications, Incisa Product.

Brochure of Back Web, "Push The Information, the Enterprise . . . ".

Advertisement for "Spatch" by the Hyde Company.

Information Week, Mar. 2, 1998, p. 30, "Battle Is On To Prove Pushes Value".

* cited by examiner

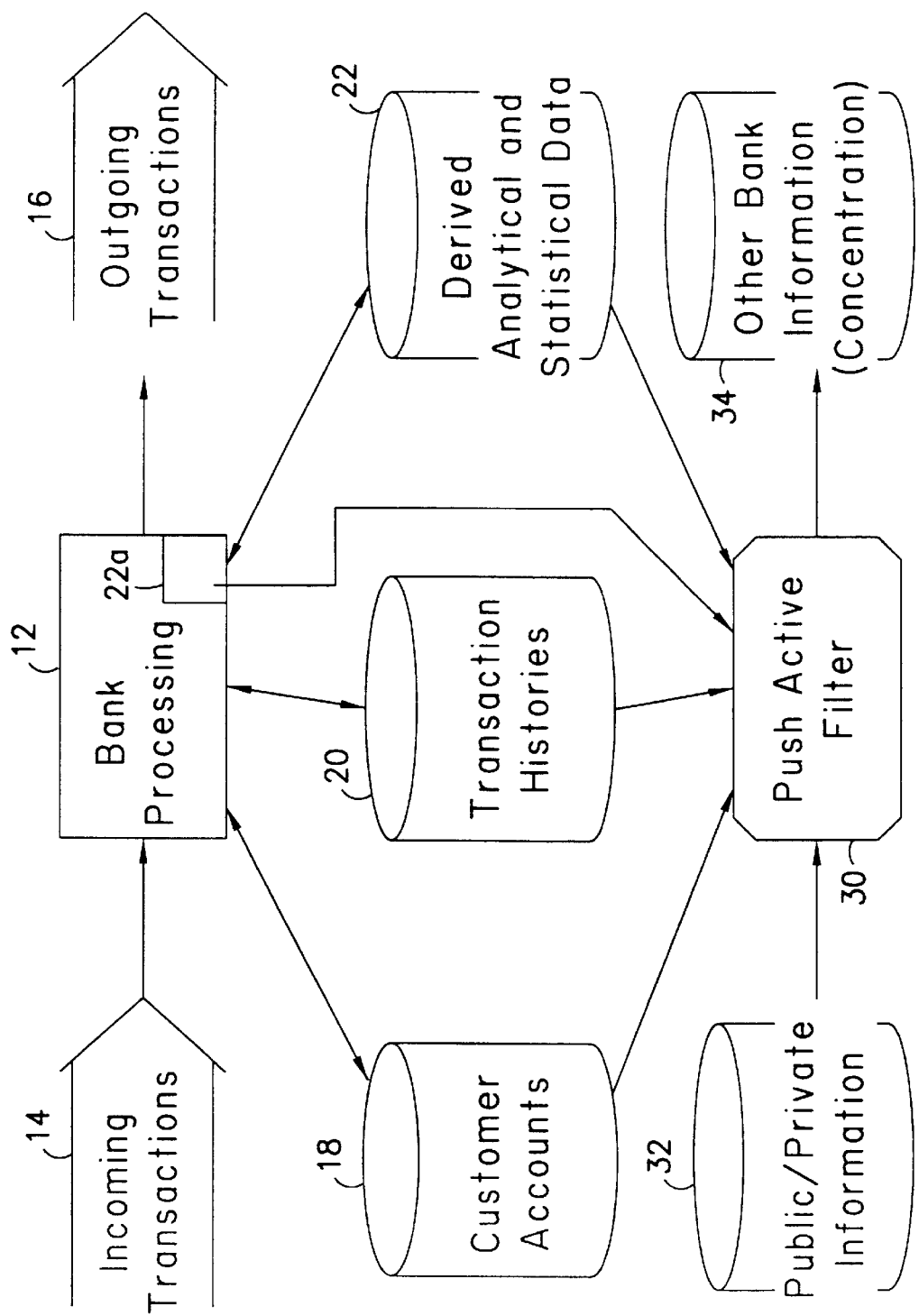

Push Banking Information

| Checking | Credit Card | Brokerage | Other |

Bank Name [Chase Manhattan Bank] Account Number [1234567.9009] Amount Available ($) [12,780.52]

Bank Name [Chase Manhattan Bank] Account Number [788A9933-9012121-7] OverDraft Amount ($) [2,780.52]

| Pay | Check Number | Check Amount | Notes |
|-----|--------------|--------------|-------|
| Yes | 1006 | 563.90 | |
| No  | 2390 | 26.39  | |
| Yes | 1017 | 353.11 | |
| Yes | 1025 | 210    | Chase Life Insurance |
| Yes | 1030 | 14.72  | |
| Yes | 1042 | 12.90  | |

[Submit Change] [Cancel] [Send Message]

FIG. 14B

Profile

Other Information | Non-Financial Channel

Customer Information | Customer Detail | Account Information

Account ID: 1920299

Channel: Desktop ▽

Call In Authentication Code: Mother's Maiden Name ▽

Primary Name: Mary Smith          SS Number: 111-11-1111

Secondary Name: John Smith        SS Number: 101-01010-010

[ Accept ]          [ End ]

FIG. 14D

| Profile | | |
|---|---|---|
| Other Information | Non-Financial Channel | |
| Customer Information | Customer Detail | Account Information |

Type ○ Primary ○ Secondary
Name [Mary Smith]
Business
Company Name [Cacoro]
Address [123 Mickey Mouse Drive] Home
[330.33] Address [345 Pluto Way]

City [New York] City [Greenwich]
State/Province [New York] State/Province [Connecticut]
ZIP Code/Postal Code [10005] ZIP Code/Postal Code [06302]
Phone [1.212.555.6662] Phone [1.203.242.7838]
Fax Number [1.212.555.7838] Fax Number [1.203.270.7232]

[Accept] [End]

FIG. 14E

Profile

Other Information | Non-Financial Channel

Customer Information | Customer Detail | Account Information

| | | | |
|---|---|---|---|
| Channel Type | PDA | Category | Financial |
| Bank Identification | 12232 | Push Channel Priority | High - 2 |
| Bank Name | FirstBoston | Address | 172.991.121.21 |
| Account Number | 12323232-1212121 | Device PIN | |
| Contact Name | Christopher Westerman | Time to Send | 0630  To  1630 |
| Address | 6272 Daisy Street | Days to Send | Tuesday  To  Thursday |
| Branch | West Long Island | Repeat Duration | 360  Continues |
| Telephone Number | 1.516.672.9990 | Secure Channel | Yes |
| Fax Number | 1.516.212.1211 | PIN Active | ○ Yes  ○ No |
| | | | Reset PIN |
| Add New Channel | Save Channel | Add New Category | Save Category |

Accept    End

FIG. 14F

Profile

Customer Information | Customer Detail | Account Information

Other Information | Non-Financial Channel

| Field | Value | | Field | Value |
|---|---|---|---|---|
| Category | Mecca ▷ | | Routing Information | |
| Push Channel Priority | Highest ▷ | | Send to Identifier | 122.212.122 |
| Type of Device | Beeper ▷ | | Send to Name | NYU Hospital |
| Address | 1.800.222.2222 | | Send to Address | 127.0.0.1 |
| Device PIN | Text29 | | Secure Channel | Yes |
| Time to Send | 0800 To 2330 | | PIN Active | Yes |
| Days to Send | Monday To Friday | | | Reset PIN |
| Repeat Duration | 360 Minutes | | | |

[Add New Channel] [Save Channel]    [Add New Category] [Save Category]

[Accept] [End]

FIG. 14G

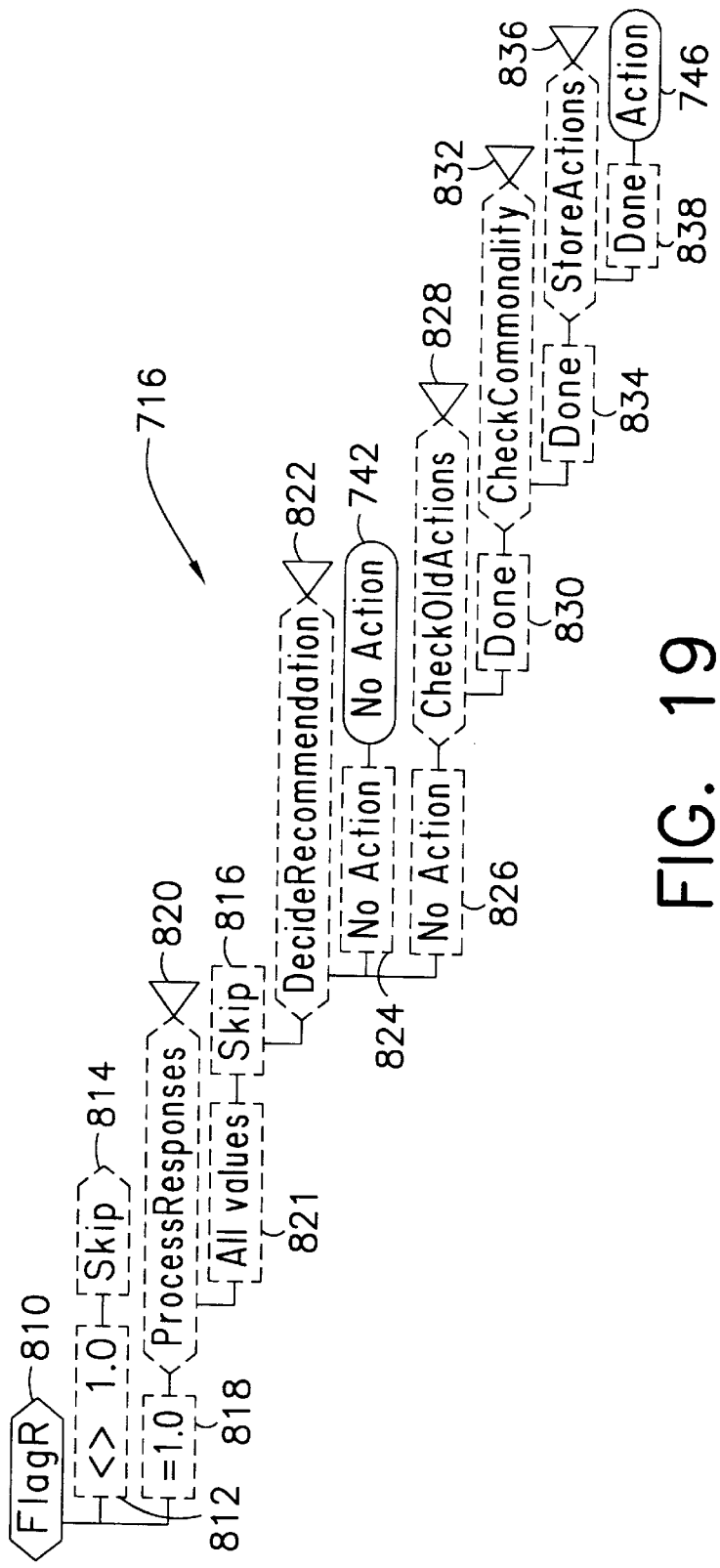
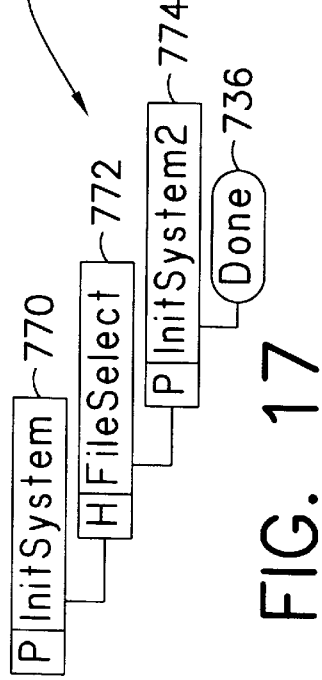
FIG. 19
FIG. 17

Figure 1-Server

PUSH BANKING SYSTEM AND METHOD

CROSS REFERENCE TO RELATED APPLICATION

This application is based on and claims priority to U.S. Provisional Patent Application Ser. No. 60/067,987 filed Dec. 9, 1997, entitled PUSH BANKING SYSTEM AND METHOD which is hereby incorporated by reference.

BACKGROUND OF THE INVENTION

The present invention relates to banking services and more particularly to a system and method which provides virtually immediate, on-going interaction between a banking institution and its customers.

Decades ago, financial institutions had the capability of offering service that could be tailored almost down to the single customer. For example: The Bank of Smalltown receives through deposit or clearing, a check on the account of valued customer Jones. The check will cause the customer's account to go into overdraft. The Bank reaches Jones by phone and advises him of the situation. Jones promises to come to the Bank that day with a cash deposit sufficient to cover the overdraft. At three o'clock, closing time for the Bank, Jones has not arrived. The branch manager, Smith, knows that Jones will honor his promise and assumes he must have been delayed. He also knows that Jones will suffer if the check is returned (i.e. returned to the bank of first deposit or to the local depositor—colloquially, the check will bounce). Smith keeps Jones' account open. Jones arrives at 3:30 p.m. and apologizes through the locked door to Smith. Smith takes Jones' money through the slot in the Bank's door and records the deposit. Service on a personal level such as described above, is largely a thing of the past.

Today, customers have three possible ways to receive information from their financial service institution. First, a customer can receive paper and/or microform records shipped to them on a prearranged schedule. Second, the customer can subscribe to an online service that allows the customer to pull down information from online databases that are updated on a fixed schedule. In the case of a corporate customer, the service is called, for example, an "online cash management system", while in the case of an individual customer, the online system is usually called a "home banking system". Typically, both of the above systems operate on intraday or intramonth batching schedules. These systems interleave exceptional information with everyday reporting, are cumbersome when there is a large amount of data, are labor intensive, and are prone to delays and missed opportunities unless managed with close precision by the customer. In essence, the customer gets the information the bank makes available on the bank's schedule.

In a third method of communication, the bank makes known to its clients information relevant to their accounts on an account by account basis via telephone. The contact by phone is labor intensive, and is therefore selectively used. It is also not reliable since the recipient may not be near the phone and a message recording device may not be activated.

Reasons for the unavailability, expense or ineffectiveness of such personal services include the volume of transactions passing through the financial networks, the number of businesses and persons having one or more accounts, the inability to precisely pinpoint the exact time when a service or special attention will be needed by a customer and finally, the inability to reliably communicate bi-directionally between the customers and the financial service institution at the point when knowledge of the information is critical.

This last point is especially true in the case of retail customers, individuals, regarding the reliable delivery of confirmations of receipt of instructions and confirmation of executed transactions.

The present invention addresses the aforementioned drawbacks of the prior art in the form of a new system and service which establishes a new paradigm in the delivery of financial banking services. This new paradigm is referred to herein as "Push Banking". The terminology "Push Banking" is inspired, in part, by the evolution of the concept of "Push Technology" on the Internet.

Push Technology, as implemented to date, is an attempt to address the growing problem of the enormous amount of available information on the Internet. Existing search engine technology is inadequate to get reliable access to certain pieces of information. Such searches return thousands or tens of thousands of "hits" which must be searched with ever increasing ingenuity on the part of the operator. Even so, the final results of the automated search must usually be reviewed by the searcher to find the required information, if it can be found at all. "Push" in this context means that the information is sent to the operator by the system. "Pull" refers to the original search engine model where the operator requests the information from the system.

It appears that in all cases of Push Technology there exists an implicit profile of the information the operator desires to receive (usually established by the operator before the initiation of push services). In most cases there is an active application on the operator's workstation which "polls" a server on a periodic basis and downloads the information to the operator's terminal and displays it. In this case, it appears to the operator that the information is being "pushed" to him. More correctly, however, the operator has installed an application that does periodic customized searches (i.e. "pulls") and then displays the results of the search. In at least one case, a Push Technology (from a company Backweb™ is used to do automatic software upgrades.

The terms "Webcasting" and "Netcasting" are also sometimes used interchangeably with "Push." Indeed the radio or television broadcast is an archetype of the "Push" concept. In "Web/Netcasting" there is usually some sense of a filtered or customized broadcast (e.g. as described by a company POINTCAST™ under the term PERSONALCAST™ ). This implies a large common pool of broadcast information which is limited or filtered in some way to suit an individual operator. However, none of the prior art implements or teaches a pure Push Banking process as contained in the present invention which is driven by data of essential concern to a customer and facilitates immediate response from the customer via two way acknowledgment interaction.

SUMMARY OF THE INVENTION

Accordingly, the present invention is a software/hardware system which provides increased diversity in the delivery of banking services. The system provides virtually immediate, on-going interaction between a banking institution and its customers and delivers to banking customers the information the customers need, at the moment it is available, at the customer's convenience.

The present invention is software driven system which is capable of reaching customers/subscribers over numerous, different communication channels and actively screens market conditions for situations that could potentially impact its customers, based on the customers' unique financial situation and prearranged instructions.

The present invention overcomes the limitations of the prior art by providing a comprehensive, fast, reliable, less expensive notification process for banks or other institutions with which to communicate relevant information to clients via messages that represent the considered whole of all the information at the time of transmission. The information can include a information about a customer's accounts and personal information of high importance to clients in a reliable and timely manner.

The drawbacks of the prior art have been ameliorated and the above and other objects of the invention have been realized in the form described below, by the instant inventors who have worked under the auspices of the assignee of the present invention, The Chase Manhattan Bank ("Chase").

As a financial services entity, any bank has access to certain customers' financial information sooner than the customers. Additionally, if customers had earlier access to some of their account information based on prearranged screening (e.g. performed by Artificial Intelligence (AI) or other process) of the customers' situations vis-à-vis some emerging situational information, the customers could take immediate action in order to correct adverse financial impacts or to otherwise take advantage of the information. The entirety of the invention does not rest with the earlier correction of financial issues, but rather relates to the timely provision of financial information to a customer which enables the customer to take the earlier action.

The services realized by the present invention range from on-demand payment services to presenting critical information on a timely basis. The present invention, referred to herein as Push Banking, is designed to automatically send information to the customer, with the means for the customer to make the appropriate response on which the Bank can then act. In contrast, in today's environment, a customer must affirmatively seek the information and then respond accordingly. For example, suppose a customer has exceeded the credit-line on his credit card and has the funds in his checking account to pay off the credit card. In the prior art system of notification to the customer, the customer's response to the bank to use funds from the checking account will typically arrive too late. In contrast, the Push Banking system of the present invention alerts the customer of the over-limit condition immediately and allows the customer to pay the credit card overdraft immediately from the checking account, or stop payment in the event of fraud.

The present invention also provides substantial business processing benefits. Today, a bank's financial data must be processed twice, serially—once in order for it to be outputted by the Bank to the customer and again for it to be inputted, analyzed and acted upon by the customer. The Push Banking system of the present invention reduces the frequency and amount of manually initiated double processing of information. This reduction in labor and inefficiency has also the unanticipated and beneficial effect of allowing the time—between the creation or receipt of a significant piece of information by the bank, its transmission to the customer and the receipt of any needed response from the customer— to collapse to the minimum time possible relative to communication technology and the customer's ability to receive a transmission via at least one of many possible means.

The present invention is a new paradigm in bank service. It represents a new offering that responds to the scarcest commodity of all—time. It anticipates the need for customers to react to information independent of time zones restrictions. This new paradigm changes the time dimension as well as the content dimension of the information delivered by any banking or financial institution to its customers. The present invention is not Push Technology and it is not simply using Push technology to deliver information.

An integral part of the system and method of the invention that implements the aforementioned service is referred to herein as the Push Active Filter (PAF). The Push Active Filter interacts with the bank's processing centers which handle incoming customer transactions and creates outgoing transactions. The Push Active Filter also interacts with various data banks containing customer account information, transaction histories, current transaction activity, and derived analytical/statistical data as well as external sources of information such as the Internet.

The Push Active Filter employs artificial intelligence and other analytical tools as well as customer specific profiles to make the decision in each case as to which information to push to the customer. Information is pushed automatically, on a virtually instantaneous basis, as soon as the information becomes available so that customers may act on it relatively immediately.

The Push Active Filter is a software/hardware construct that is responsible for selecting and conveying the information to the customer, based on knowledge of the type of tools that are available (or unavailable) at the customers' site. This allows the invention to deliver information to the customer via any communication means presently known, or that might be available in the future. This includes telephone, telegraph, fax, beeper, one-way cable TV, one-way satellite, dial-out terminal, on-line terminal, Internet, Intranet or Extranet, SmartPhone, 2-way beeper, 2-way cable TV, 2-way satellite, Personal Digital Assistant (PDA), Personal Computer (PC), express mail delivery, commercial express delivery and various systems of the type mentioned above. These systems allow the customer to respond electronically or by telephone or by fax or by any means, all of which are intended to allow the bank to receive the response information from the customer expeditiously and to enable the bank to act upon the customer's instructions.

The Push Active Filter consists of two main components: the Push Active Filter Decision Component (PAFDC) and the Push Active Filter Communication Component (PAFCC). The PAFDC receives information input from all the accounts of every client subscribing to this service. Since the number of clients can be very large (millions), the invention provides ready partitioning across physical devices to enable practical implementation of a service with immediate notification capability. The PAFDC contains notification criterion values supplied by each client for use with bank specified conditions to initiate notices to those clients. The PAFDC creates the notices when the specified conditions occur and sends those notices to a corresponding PAFCC for transmission by any channels known by the PAFCC to be effective in reaching the client. By partitioning the clients into groups serviced by PAFDC-PAFCC pairs, scalability to large numbers of clients is assured. Each PAFCC, upon receipt of communications from a client, relays the communication to its corresponding PAFDC and other systems if applicable. Errors detected by the PAFCC are communicated to the PAFDC to cause proper corrective action. The PAFCC also corrects errors and takes corrective action.

The PAFDC periodically runs through the list of clients that it contains and determines if any of the clients should be notified, if any responses from previous notifications have been received, and if any transactions initiated by the PAFDC have been completed. The PAFDC receives account information at a rate that depends on the method of implementation. Three methods of implementation are envisioned, to be used in any combination: 1) account information is sent to the PAFDC on a client whenever a change in the client's account occurs, 2) the PAFDC requests data from an account database when needed, 3) agents of the PAFDC, possessing knowledge of the notification criterion values specified by the clients and located at the relevant data sources, send data on a client to the PAFDC only when a notification condition occurs.

The PAFDC, upon determining that more than one message is to be sent or a message(s) is (are) to be sent and a prior message(s) has (have) been sent that is (are) still pending completion of the required action(s), makes an overall determination of the most appropriate action to take. It may decide that the present condition warrants no new notification(s) because the prior notice(s) is (are) still valid and adequate. It may decide that a new message is required to modify past instructions and/or add a new instruction(s). The preferred embodiment thus makes its determinations in two steps, first deciding on individual accounts, taking into consideration nuances specific to that type of account for that particular client in view of the client's stated preferences. Then, second, it collects all notices generated by the first step and decides what notice(s) should be sent, if any, in light of messages previously sent, but whose intended activity has not been brought to conclusion, as well as considering the possible interaction between newly generated first step notices (e.g. advising to transfer an amount to one account, and to transfer an amount to a second account, when the sum of the two transfers would overdraw the source account).

Once the PAFDC decides what message(s) has (have) to be sent to the client, it generates the message(s) with a unique message identifier(s) that enables tracking the message(s) through the system until they are brought to conclusion. The message(s) is (are) sent to the corresponding PAFCC for transmission to the client either as soon as they are prepared, or in groups, or at completion of the entire client list, as determined by the requirements of the system at the time of designing the system (although building a system that adapts to changing conditions is possible). A unique client ID is also placed in each message to enable the PAFCC to determine who is to receive the message. The PAFCC contains the necessary information on each client to decide how to transmit the message.

A priority for the message is assigned by the PAFDC to guide the PAFCC in determining the order in which to send messages when limited by channel capacity. The PAFDC time stamps each message with a Stale Date to enable the client to determine whether a response could still be effective if sent. The PAFCC uses the Stale Date to initiate a clean up of messages not responded to within the allotted time. The PAFCC notifies the PAFDC when it has cleaned up a message by generating a response with that information content. Any response received after clean up is treated by the PAFDC in a manner similar to when it receives a client initiated message; it sends a message to the client informing the client that the response was received too late and no action taken. If at that time a new relevant notice is to be sent to the client, the two messages would be combined into one coherent message. Client initiated messages otherwise are reacted to by the PAFDC in a manner similar to receiving a response to a message sent to the client.

In order for the client to control which communication channels are used to transmit the messages, the PAFCC maintains a list of channels and priorities that are settable by the client (e.g. the client may be going on a trip and wants to eliminate messages to his home and designate his mobile unit as the top priority receiver). Because of the difference in message capacity, security and formatting across the range of devices, the PAFCC also maintains a list of device types and formats messages according to the actual capabilities of the target device(s). The PAFDC includes a numeric code with the message that designates a class of communication to the PAFCC that is associated with the account type to which the message pertains, making it simpler for the PAFCC to select the correct communication class. When the PAFDC wants to delete a prior message, such as when a superseding message must be sent prior to receiving a response to an earlier relevant message, a specific value of the numeric code informs the PAFCC to remove the prior message identified by the unique message identifier included in the message.

When a response to a message is received by the PAFDC from a client (via the PAFCC), It reads the response when it next gets to that client in its processing cycle. The PAFDC is able to recognize what message is being responded to by the unique message identifier included in the response that has been copied from the message into the response by the responding mechanism (the identifier copy is provided by the client if the client doesn't possess an automated response mechanism). Client initiated messages have a unique code (e.g. zero) that enables recognizing it as client initiated. If the identifier copy is corrupted, predetermined rules direct the PAFDC how to handle the situation; either accepting the response as genuine with a message to that effect to the client, or requesting confirmation.

When a message has been responded to and the indicated transaction successfully completed or responded to, the PAFDC issues an acknowledgment that requires no response. However the PAFCC checks that the message is received and viewed. This information is kept in the PAFCC's history file for audit purposes.

All messages that the PAFDC has sent are saved in two files. One file contains just active messages that have not been closed out. The other file archives all messages for future reference if needed to trace actions taken. The latter file can be used by customer service representatives while answering calls from clients, in order to see what activity has preceded the call.

When the bank is made aware of any situation requiring notification in accord with agreements made with the bank, the PAFDC is informed and a coordinated message is sent in a manner similar to the financially triggered messages described above. Thus the invention anticipates a broader service than traditionally handled by a bank in view of the comprehensive notification process provided by the invention. In fact, the processing of the invention is of a general nature that will be recognized as being applicable beyond just the banking industry. In particular, the applicability of the processing to such well known activities as workflow processing or bill presentment will be seen as benefiting from this new functionality.

When notification to a customer is required, it may require minimal time delay in sending the notice. In order to provide this immediacy of response economically, it may be necessary to interrupt the normal processing cycle described above, which may encompass millions of accounts, to service one or more urgent messages. The preferred embodiment therefore provides this capability by completing the processing of any client it is processing, and then issuing the urgent message and all messages processed up to the time of receiving the urgent message. The urgent message is combined with any other messages already processed for that client. The process then continues processing the remaining clients in its normal order, including the client for whom the urgent message was sent if it had not been processed prior to receiving the interruption.

Other features and advantages of the present invention will become apparent from the following description of the invention which refers to the accompanying drawings.

BRIEF DESCRIPTION OF THE DRAWINGS

FIG. 2 illustrates the location of the Push Active Filter of the present invention relative to the other components of the prior art typical banking system of FIG. 1;

FIGS. 13A–1, 13A–2 and 13B–13D are flow diagrams showing the processes for different procedures involving communications with the customers having different types of physical devices;

FIGS. 14A–14H show various screens of devices either at the banking institution or on the customers' client device;

FIGS. 15–19, 20A, 20B, 20C and 21 depict flow diagrams of the PAF Decision Component;

FIGS. 34A and 34B illustrates the flow for processing a pager message.

DETAILED DESCRIPTION OF THE INVENTION

Figure 1:
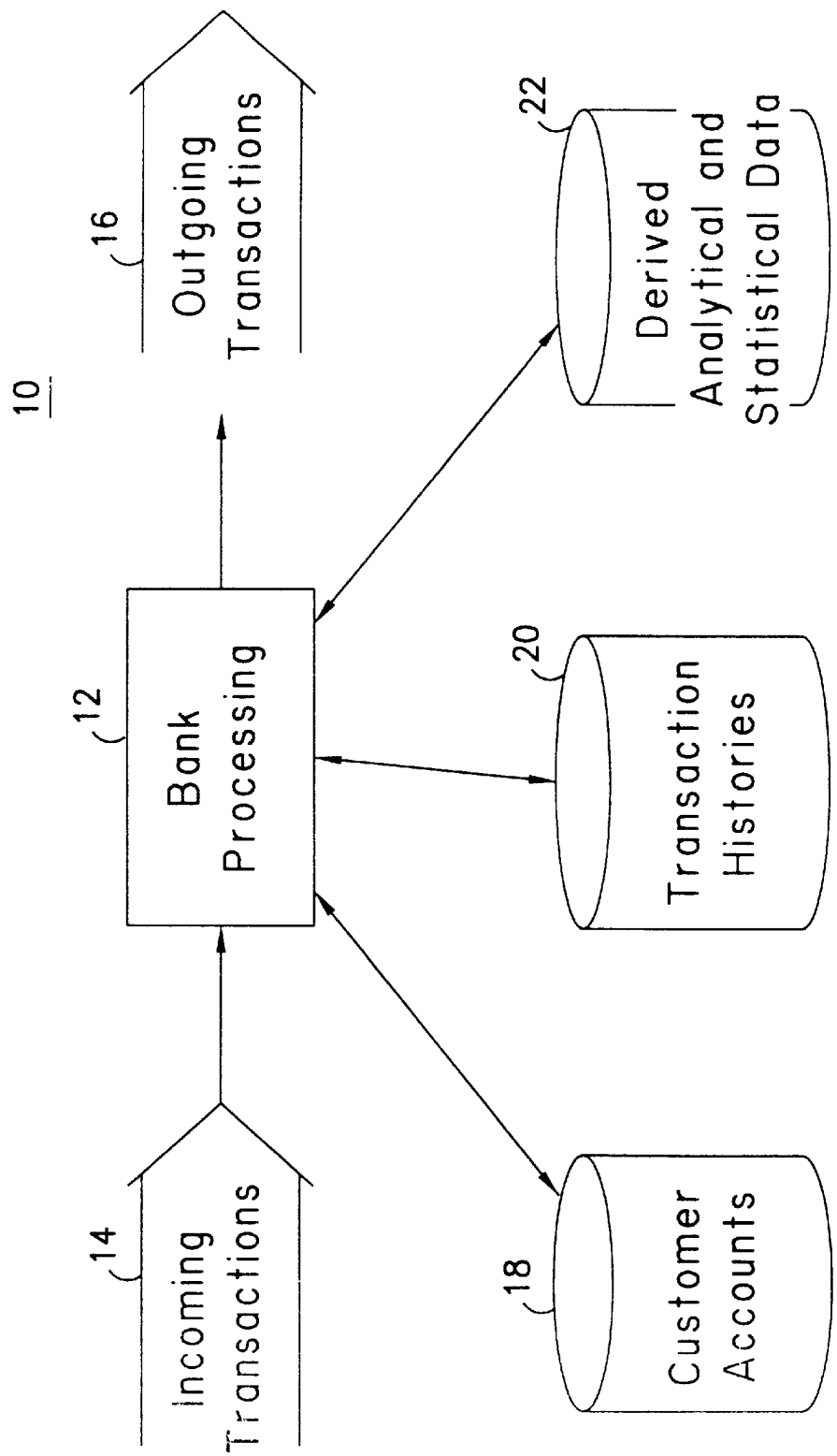
FIG. 1 is a high level generalized block diagram of a typical, prior art banking processing environment.

FIG. 1 is a high level generalized diagram of a typical current banking processing environment. This Figure depicts the prior art system 10 comprising a processing section 12 which is responsible for processing incoming transactions 14, e.g. money deposits, drafts, orders to pay bills, money transfers, letters of credit and the like. Processed information is output by the processing section 12 as outgoing transactions 16, such as banking statements, notification of various events and the like to banking customers. The bank processing section 12 makes use of information that is looked up or obtained from customers accounts 18, transaction histories 20 and derived analytical and statistical data 22.

Although described throughout this discussion with respect to a banking system, the present invention is applicable to any industry or person which must act on time sensitive information.

Figures 1, 13A:
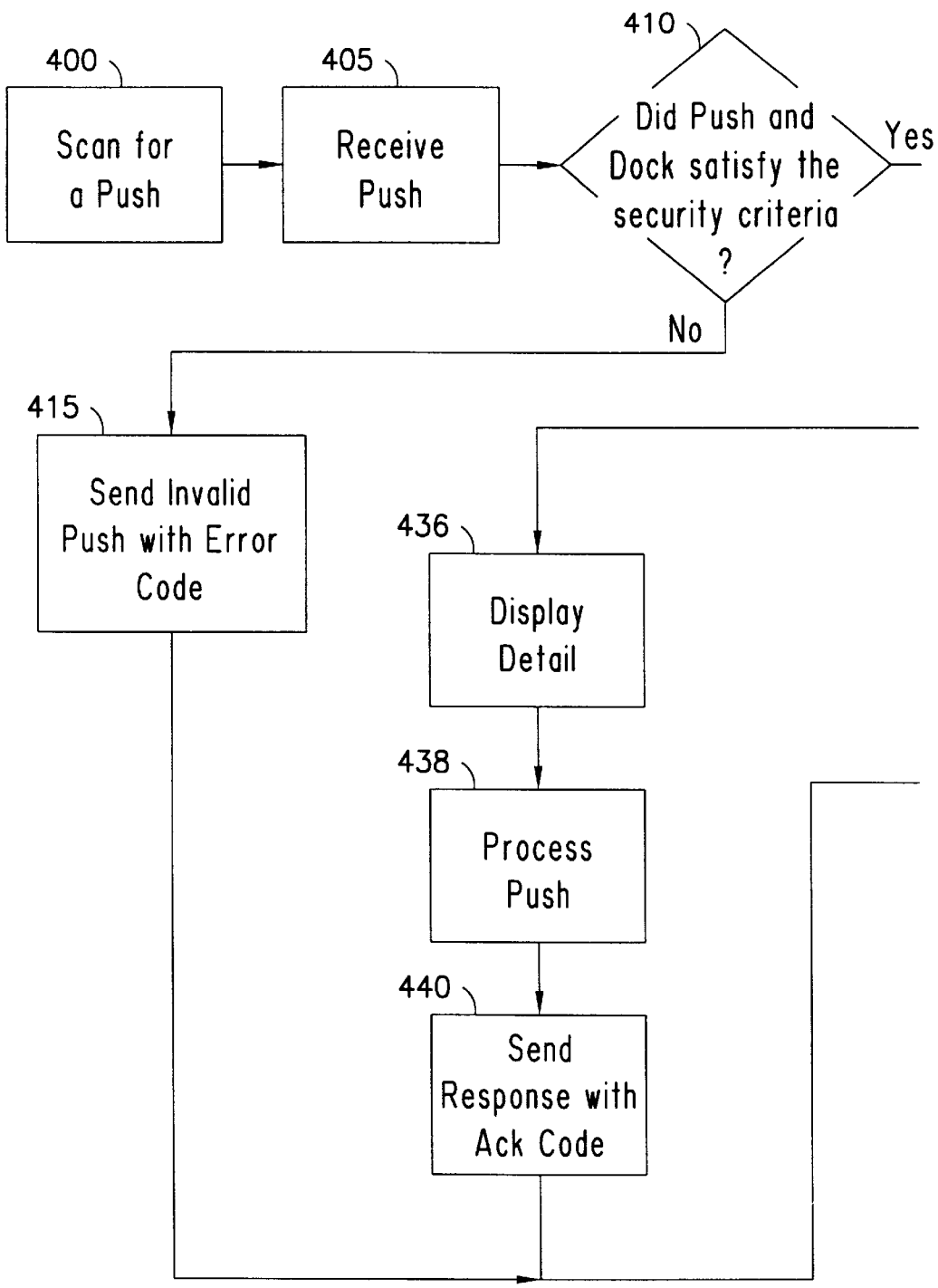
Figures 2, 13A:
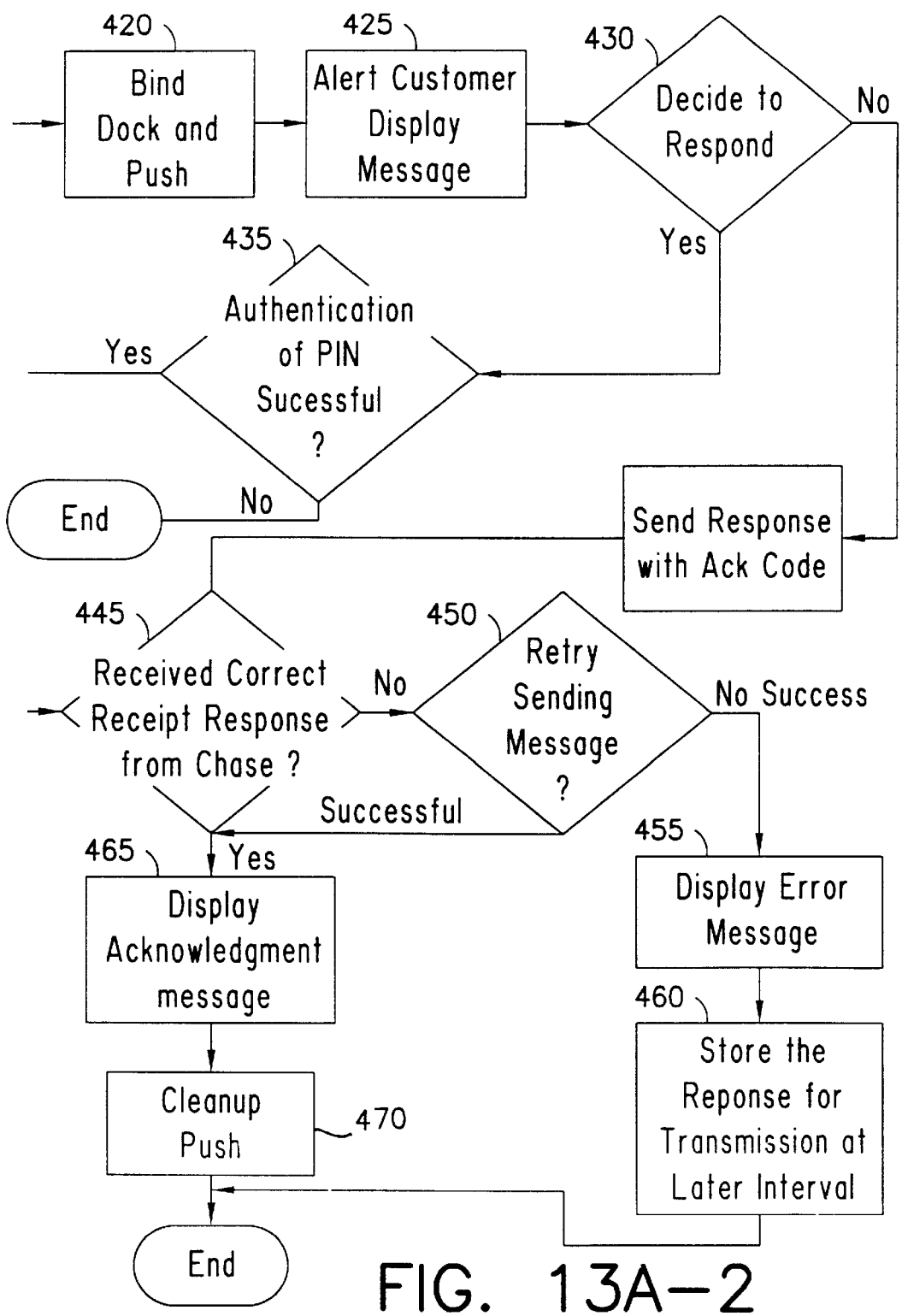

As shown in FIG. 2, an integral component of the present invention comprises the Push Active Filter (PAF) 30 which the invention has incorporated into the prior art environment depicted in FIG. 1. As shown, the Push Active Filter (PAF) 30 also interacts with other sources of information such as public and private information 32, information from other banks 34 not currently used in normal bank processing, and product specific agents 22a providing immediate messages.

Figure 3:
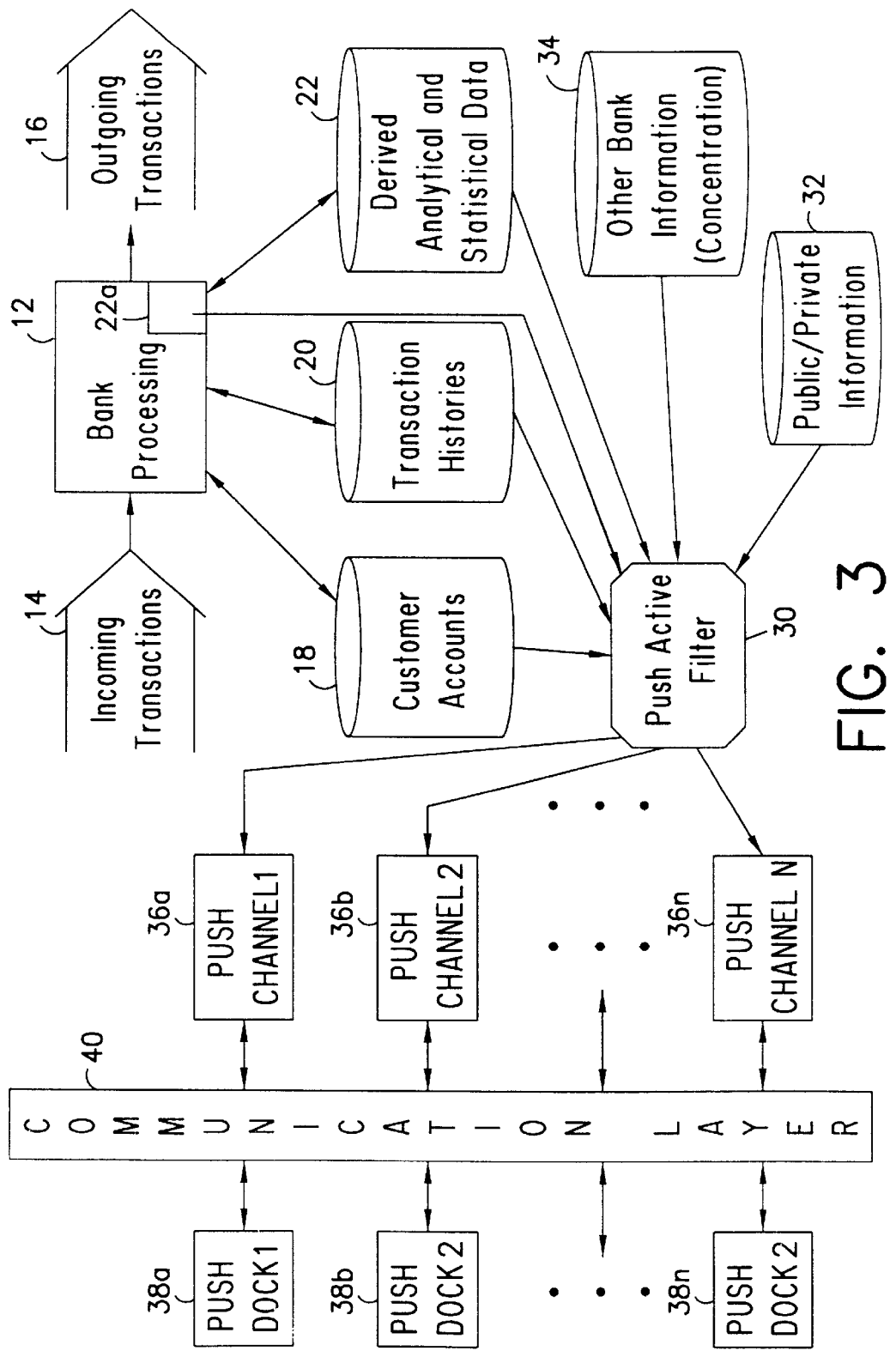
FIG. 3 is a high level block diagram of the overall system of the present invention.

The block diagram of FIG. 3 is intended to convey the gist of the overall system of the present invention which comprises a new paradigm in banking pursuant to which the customer does not look for banking information. Rather, the information looks for the customer. When the information arrives, it brings with it the means to make an appropriate response so that the customer gets the information the customer needs, as soon as the information is available, at the customer's convenience, with the ability to take immediate action on the information.

To this end, as shown in FIG. 3, the Push Active Filter 30 operates in conjunction Push Channels 36a–36n and Push Docks 38a–38n to enable the system of the present invention to interact with customers and/or electronic devices associated with customers through communication media 40. The communication media 40 is intended to encompass any mode of communication between a banking institution and its customers that is capable of transmitting information to the customer either electronically or in hard copy or any other format. This includes, by way of example and not limitation: telephone, telegraph, fax, one-way beeper, one-way cable TV, one-way satellite, dial-out terminal, on-line terminal, Internet, Intranet or Extranet, SmartPhone, 2-way beeper, 2-way cable TV, 2-way satellite, Personal Digital Assistant (PDA), Personal Computer (PC), express mail delivery, commercial express delivery and various systems of the type mentioned above. As will be described in greater detail further on, the function of the Push Active Filter 30 is to select and establish communication, and to carry out the transmission of information via the communication media 40 to the customers and from the customers back to the bank. The Push Docks 38a–38n are located at the customer's side of the system and represent the diverse nature of bank customers and their devices with which communication must be established. These include customers who wish to be reached via Personal Digital Assistant or Personal Computer or paper or fax or beeper or cable TV or SmartPhone, etc.

The present invention applies equally to systems of the future where it might occur that all potential Docks are directly addressable via unique addresses on the Internet and all use standard Internet communication protocols or other communications standards or virtually any form of communications.

The system of FIG. 3 is designed such that the Push Active Filter 30 constantly monitors the results of bank transactions and information obtained from other databases to make decisions whether to "push" information to various customers. Throughout this discussion, the term "Push" will be used to describe the information or messages which is (are) sent (pushed) to a customer. The Push decisions are made, as shall be explained in more detail further on, based on various predetermined information and customer profiles. The key is to get the information to the customer as rapidly as possible, without the customer asking for it. Moreover, the system of the present invention expects, in most cases, to receive an interactive response from the customers to the information that has been presented.

Figure 4A:
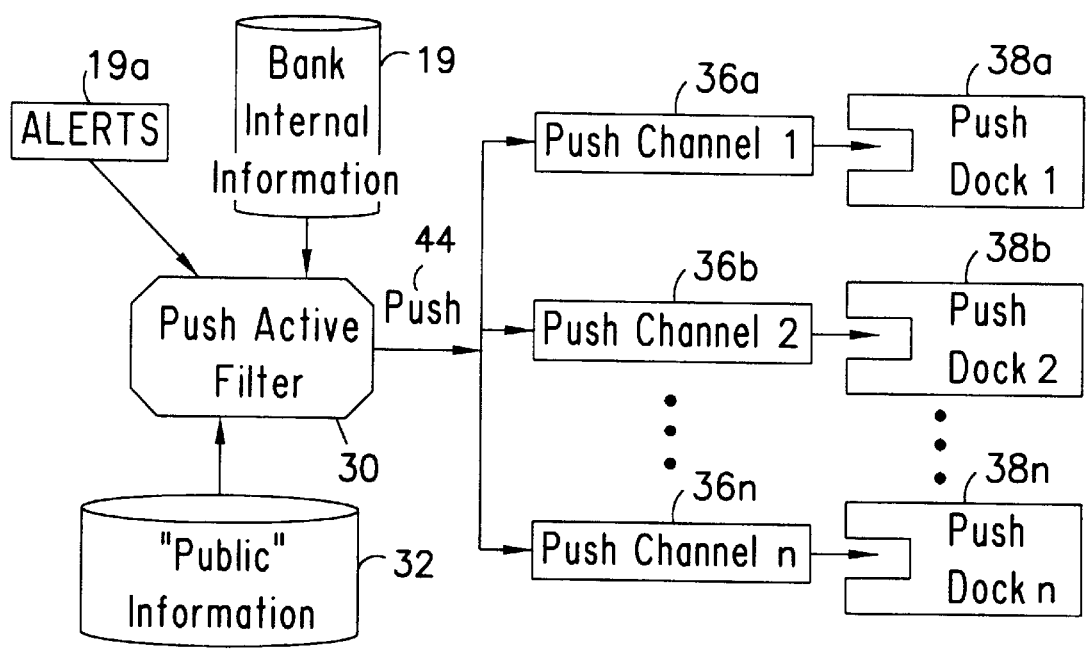
FIG. 4A depicts the Push Active Filter of the present invention communicating through Push Channels to Push Docks of the invention in order to push information to a customer.

To this end, FIG. 4A shows the Push Active Filter (PAF) 30 acting on public information 32, bank information alerts 19a, and general banking information 19 (comprising the sources of information identified by reference numerals 18, 20, 22 and/or 34 in FIGS. 2 and 3). Push Active Filter 30 creates a Push 44 (a message or applet) and thereafter chooses the appropriate/optimal channel or channels from among the Push Channels 36a, 36b . . . 36n with which to communicate with the customer(s). The PAF 30 thereafter packages the information in the appropriate format(s) and transmits that information over the chosen channel(s) 36a–36n to the customer at his/her Push Dock(s) 38a, 38b . . . 38n associated with the chosen channels. Throughout this discussion and the Figures, it must be appreciated that each customer may have multiple channels associated with it (e.g. a Personal Computer's modem telephone number, beeper number, a fax number). Furthermore, the Push Banking system of the present invention can simultaneously support multiple channels for each of multiple customers.

Figure 4B:
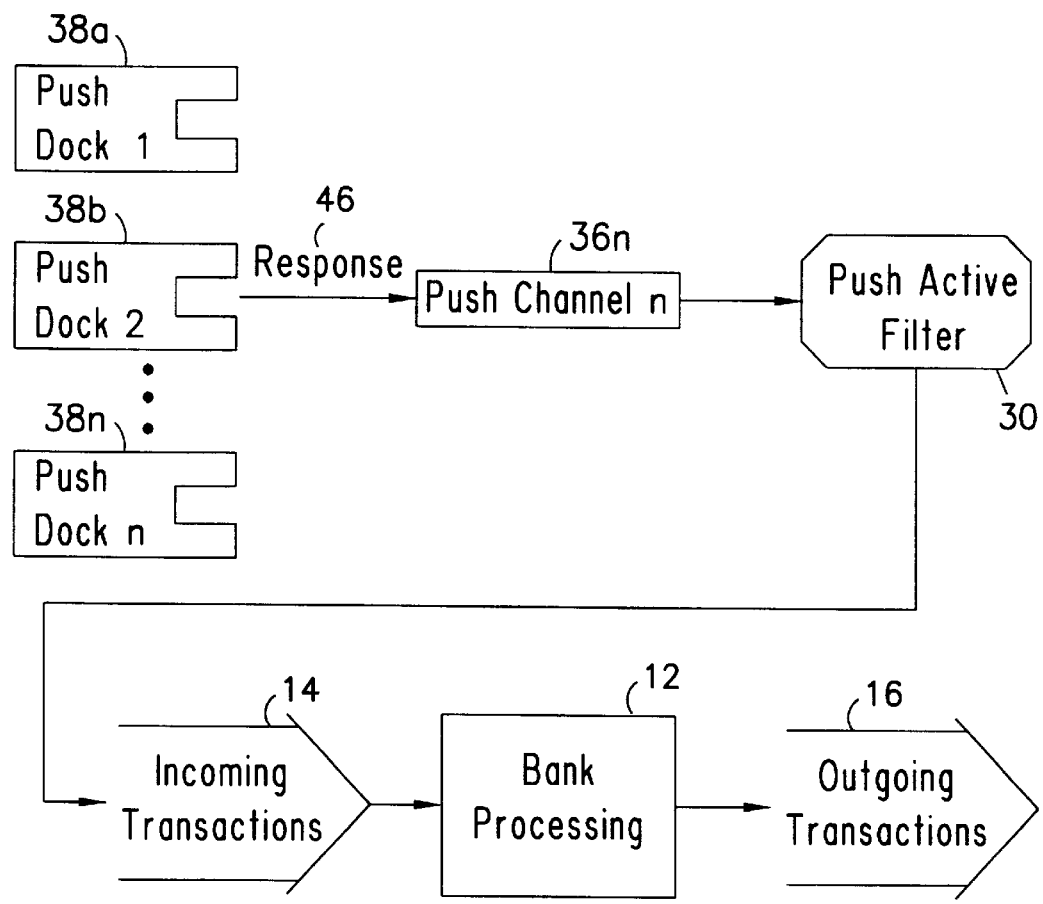
FIG. 4B is a block diagram showing the Push Active Filter of the present invention operating with the Push Dock and Push Channel in a customer response mode of the invention.

As shown in FIG. 4B, the Push Active Filter 30 awaits a response from the Push Docks 38a–38n of the customers from which it expects to receive such a response over any one of the Push Channels 36n. The Response 46 is communicated over the appropriate Push Channel 36n so that it may be received by the Push Active Filter 30. This information is then transferred to the existing banking system in the form of an incoming transaction 14 which is then processed by bank processing section 12. Any piece of information may be sent over several Push Channels 36a–36n to a customer or several customers. Information received from customers, as illustrated in FIG. 4B, is transformed into standard bank transaction format for input into the bank transaction input stream 14 as its shown in the Figure.

From the perspective of communication with customers or the public, the mode of communication of the present invention differs from the modes of communication used in traditional Push Technology in the ways depicted in Table 1.

TABLE 1

| Push Technology | Present Invention |
| --- | --- |
| tied to the Internet | not dependent on the Internet |
| TCP/IP communications only | virtually all forms of communications incl. TCP/IP |
| unidirectional | bi-directional - includes Response capability |
| low security | security as appropriate to product risk |
| security passive | security active |
| not persistent | persistent |
| one communications channel | flexible multichannel communications |
| single channel configuration | many channels reconfigurable on the fly |
| single target device | many target devices selectable on the fly and simultaneously addressable |
| obsolete messages persist | actively removes/corrects obsolete "Pushes" |
| unaware of message receipt | aware of message receipt |

Figure 5A:
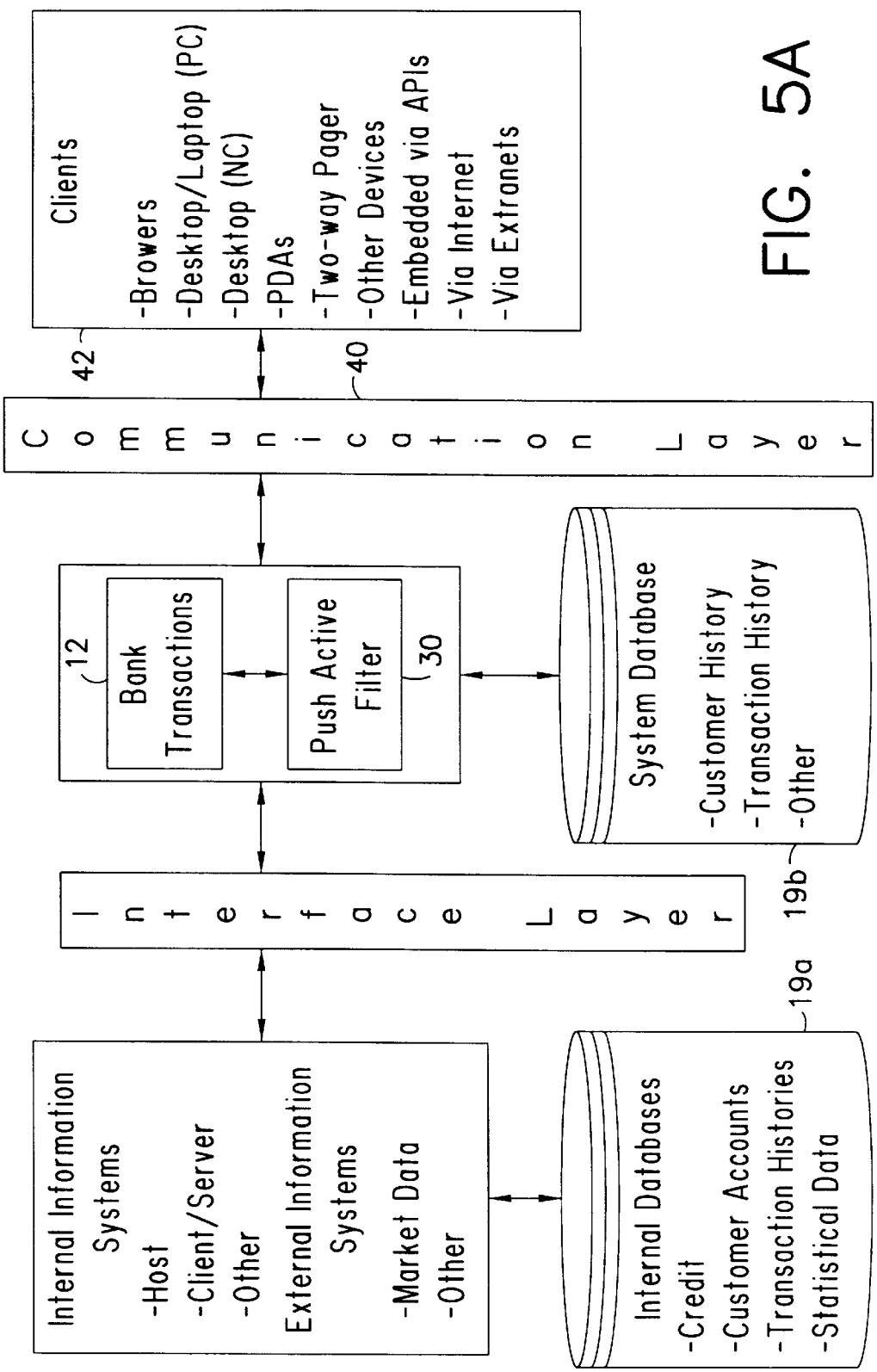
FIG. 5A is a high level block diagram of the Push Banking system of the present invention.

A high-level perspective of the major components and technology architecture of the system of the present invention presented in a different type of layout is shown in FIG. 5A. The system of the present invention includes a system database 19b that includes customer history, transaction history and other data.

Figure 5B:
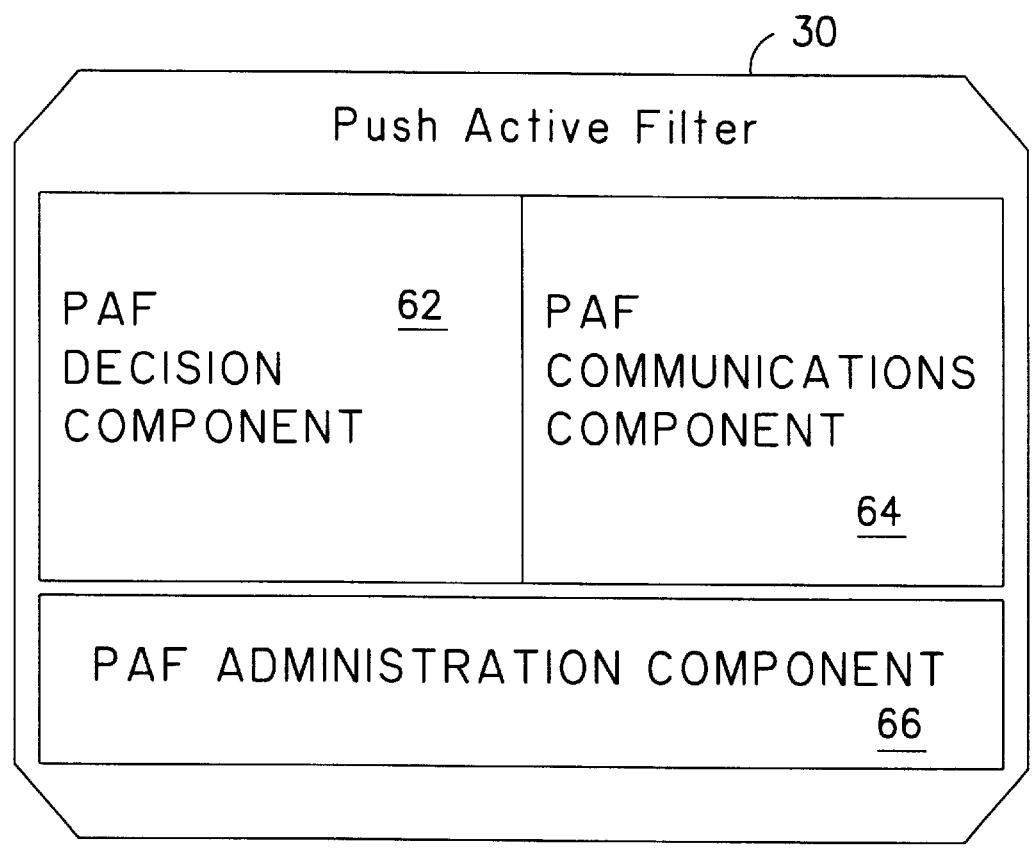
FIG. 5B is a high level block diagram of the Push Active Filter of the present invention.

FIG. 5B depicts from a high-level perspective, the architecture of the Push Active Filter 30 of the present invention. Push Active Filter (PAF) includes three major components: the Push Active Filter, Decision Component 62 (PAFDC), the Push Active Filter Communications Component 64 (PAFAC), and the Push Active Filter Administration Component (PAFAC) 66. The PAFDC 62 consists of a Bank Transaction Monitor and supporting components which monitors bank transactions and then based on a set of rules creates a "Push". The PAFCC 64 pushes information across a variety of channels to the push Dock and is responsible for communication with the customer in the case of a "Push Response". It is also responsible for determining which channels to use and depending on the customer profiles. The PAFAC 664 administers the customer profiles, customer interest profiles, the Push transaction history, the error message files, the system reports and statistical files.

Different models for PAFDC 62 and PAFCC 64 correspondence are possible. This section speaks to one possible model, a one-to-one correspondence of PAFDC 62 and PAFCC 64. In this model, every PAFDC 62 instance communicates with to one and only one PAFCC 64 instance.

The basic principle is that a given PAFDC 62 instance operates on a definite set of the total customer list. A customer is never shared between PAFDC 62 instances. This is possible because customers do not interact directly: information about customer A is never required for making decisions about customer B. (If the customers in fact do interact directly, as by customer A buying an instrument that customer B is selling, this fact is reflected outside the Push Banking system.)

The set of customers processed by a given PAFDC 62 instance must be made small enough so that: 1) the PAFDC 62 program can process all the information about all the customers in the set in a reasonable time; and 2) the corresponding PAFCC 64 instance will be able to process all the downstream and upstream messages to and from the docks in a timely manner.

PAFDC 62 and PAFCC 64 instances can be distributed across multiple host machines as seems appropriate and desirable. A shared directory or other means of interprocess communication as required by a specific implementation must be provided for each pair.

Business unit systems within an organization (e.g. a bank) are presumed to provide information about customers as a database accessible to all PAFDC 62 instances. It is the responsibility of a particular PAFDC 62 instance to search all accessible databases across all business units to gain the necessary information to process its set of customers, possibly employing intelligent agents located at the databases. The PAFDC 62 is also responsible for keeping a profile on each customer, identifying the Push Banking wide customer ID with business-unit-specific account numbers or other indicatives.

Some business units may wish to export a stream of alerts reflecting critical business events. In this case, the alerts are sent directly to the customer's PAFDC 62 for immediate entry into the outbound queue.

Figure 6A:
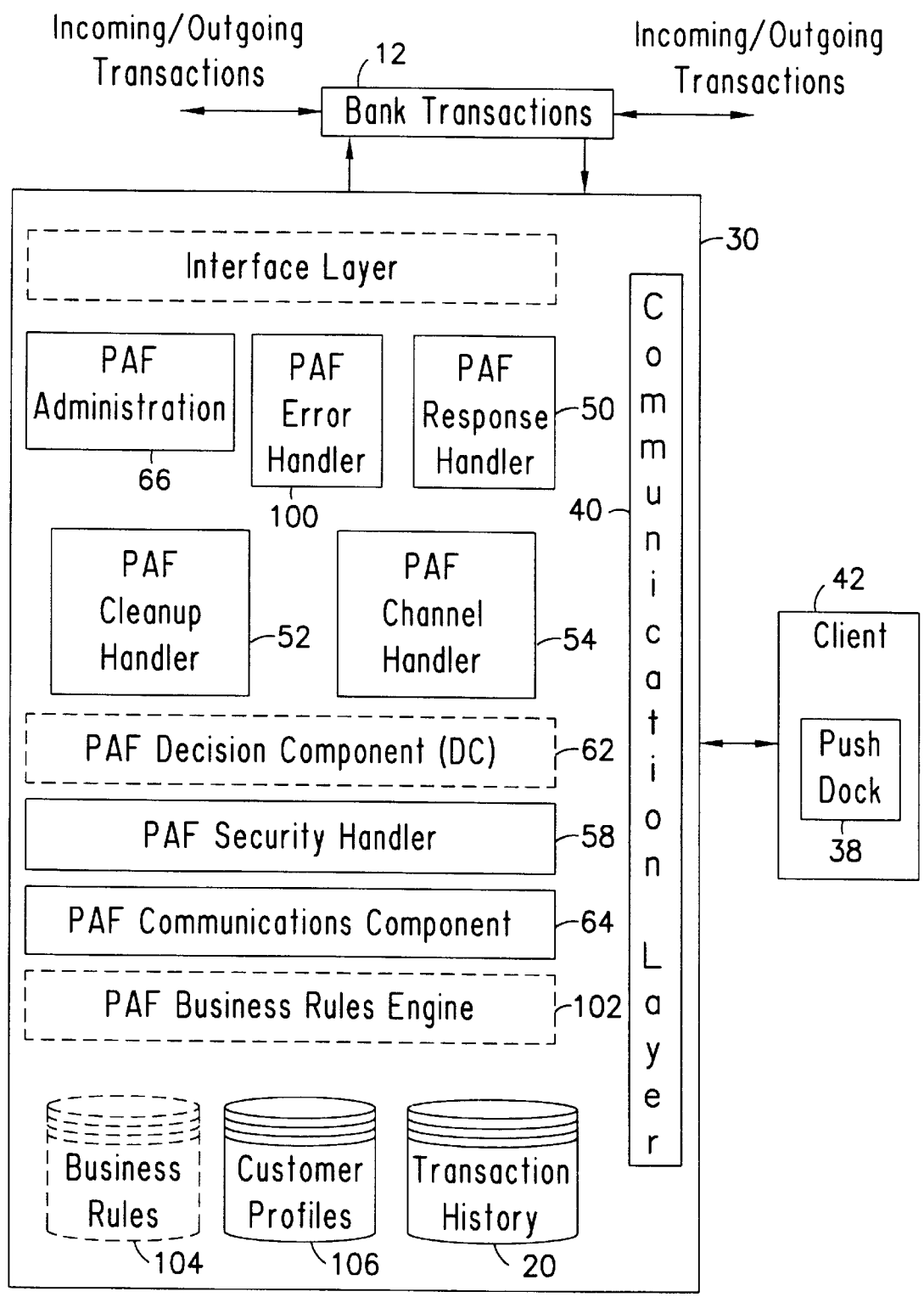
FIG. 6A depicts the architectural components of the Push Active Filter of the present invention.

FIG. 6A depicts the main architectural component of Push Active Filter 30. One of the functions of Push Active Filter 30 is to monitor bank transactions and based upon a set of rules, decide if a customer needs to be contacted, and if so, creates a "Push".

The Push Active Filter Communication Component 64 serves to push information across a variety of channels to the Push Docks 38 and is responsible for communication with the customers 42 in the case of a Push Response. It is also responsible for determining which channels to use depending on the customer profiles. The Push Active Filter Communication Component 64 (PAFCC) performs the following main functions:

1) Receiving a Push from the PAF Decision Component 62;
2) Selecting Push Channels based on customer channel profile, time of day and, if desired, customer location; and
3) Formatting messages appropriate to customer chosen target device(s) and issuing a Push on the chosen Push Channels; receives preliminary Acknowledgments from Push Dock (i.e., arrived at Dock).

If required by network congestion, truncating messages to a lowest common denominator designed to make the customer aware of a Push situation.

Part of each customer's PAFCC 64 profile will include a list of code numbers representing topics which are not to be sent via certain docks or at certain times. In addition, the PAFCC 64 profile may specify for each dock the lowest priority message that this dock may accept. This allows the system to avoid sending lower-priority messages via intrusive docks such as pagers.

Customers may elect to implement the following features:

Send-Also profiles, which include a list of persons (and their associated devices) to which messages will also be sent;

Send-On-Failure profiles, which direct a message to another person in the event that a communications failure is detected either from the communications channel or an end device;

Send-Instead profiles, which allow reassignment of messages from Customer Jones to Customer Smith, based on Smith's Do Not Send profile; and Send-Escalated profiles, which send messages to persons on the list in the event that a response has not been received within a specified period of time.

The PAF Administration Component module 66 is primarily responsible for:

1) Maintaining Customer Communication Profiles;
2) Maintaining Push Transaction history files;
3) Reporting on Push Banking Message Traffic and Transactions Generated; and
4) Reporting on Error Situations, Pushes Outstanding and Lapsed Pushes (Pushes which were not responded to before they became "stale.").

Figure 12:
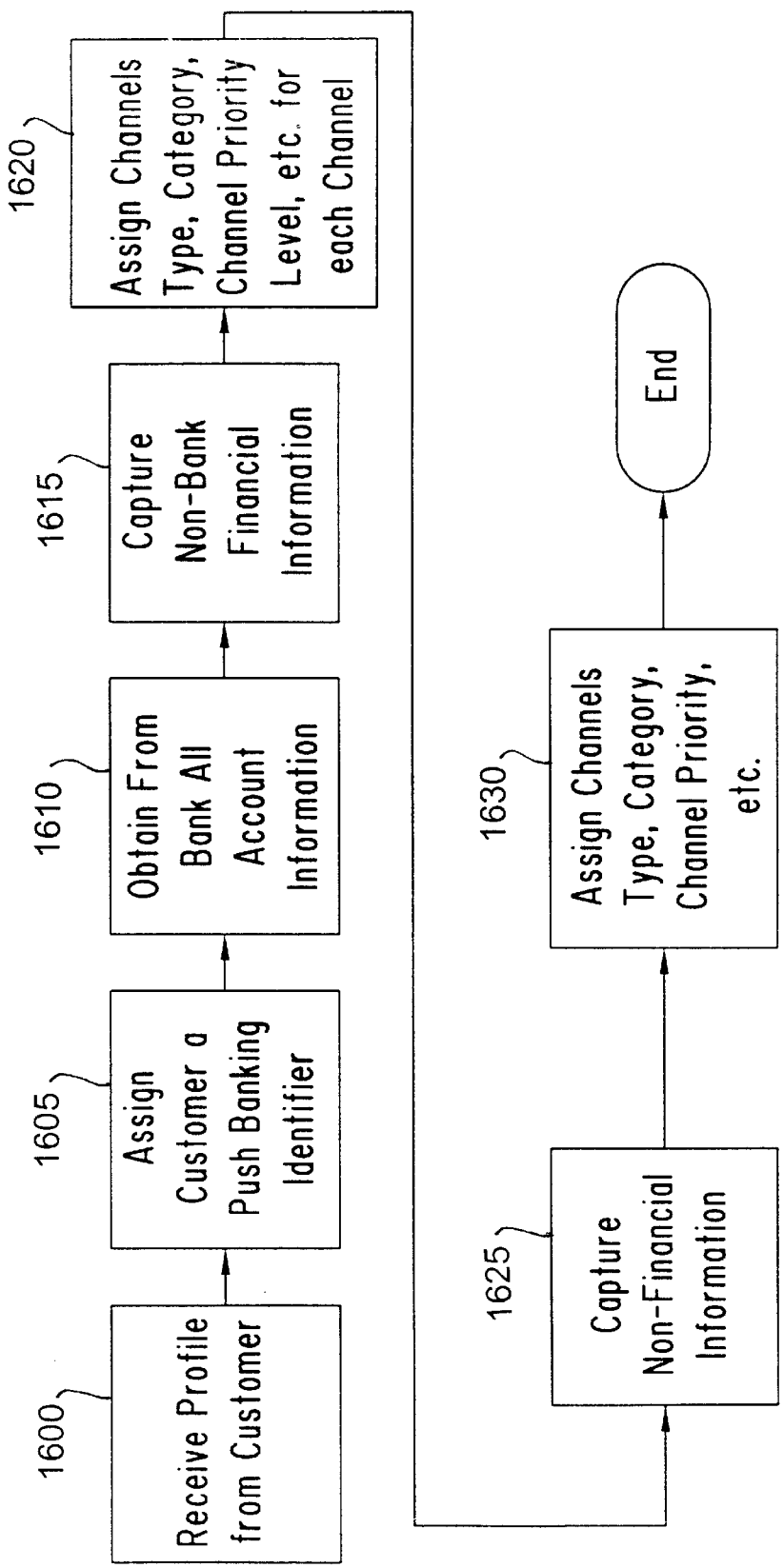
FIG. 12 shows the process for capturing customer profiles.

The process flow of capturing a customer's profile by the PAF Administration Component Module 66 is depicted in FIG. 12.

The PAFCC 64 employs databases that not only maintain these profiles but also serve to consolidate customers' accounts with a single identifier. The PAFAC 66 also utilizes Push Technology to detect incoming, customer-originated profile updates, issue a challenge-and-response communication and register the updated profile information.

The PAF Response Handler 50 is responsible for processing acknowledgment codes and for formatting responses.

The PAF Error Handler 100 is responsible for resolving errors and assigning error codes.

The PAF Channel Handler 54 is responsible for determining through which channel(s) information should be pushed through. It determines the appropriate channels based on the customer's profile 106.

The PAF Cleanup Handler 52 is responsible for maintaining the status of the various Push Docks 38 by modifying (i.e., adding, deleting, or updating) them as needed as Pushes are responded to, become superseded or become stale.

The PAF Security Handler 58 is responsible for ensuring that an appropriate security mechanism level is used for each active channel.

The PAF Cleanup Handler 52 removes or cancels all messages passed on alternative channels after the customer has successfully responded via one of the channel. When a device's Push Dock becomes full, it initiates Push Message Cleanup which examines the messages in the Dock and removes stale messages first. Should none be found, it removes the oldest, lowest priority and responded to messages first.

The PAF Communications Layer 40 is responsible for the physical reception and transmission of information on the various channels. This module is part of the PAF Communications Component 64.

The Security Component 58 of Push Active Filter 30 is an integral design element of the system. Not only does Security Component 58 address all of the well known challenges of the Internet, but also the additional challenges of open wireless and landline communications. From a banking point of view, Security Component 58 preferably may include any of the following security features.

Mutual Authentication. The customer and the bank are mutually authenticated using the techniques specified in the Federal Information Standards Publication 196 —Entity Authentication Using Public Key Cryptography. (This is the standard recommended to X9, the Standards Committee for Financial Services accredited by the American National Standards Institute (ANSI), as an approved X9 standard).

Total Confidentiality. The confidentiality of all messages/ data communicated between Customer and Bank are protected by encryption using symmetric-key cryptography as specified in relevant ANSI standards.

Message Integrity. The integrity as well as non-repudiation of messages/data communicated between the customer and the bank are protected by digital signature using public key cryptography as specified in relevant ANSI standards.

Key Management and Certificate Management. Key management and certificate management for the above-cryptographic services must use methods specified in the relevant ANSI standards. Also, the Push (the message to the customer) and the Dock are each signed (e.g. as a "signed applet" or by other means) and each checks the signature of the other.

In addition to these standard techniques the Security Component 58 provides for an active defense of the system against attempts to hack or tamper with it. This method called Push Active Defense (PAD) is an innovation in the area of messaging security. The objective of PAD is to make potential malefactors totally uncertain relative to the success of their efforts versus the possibility of their detection. Any of the following three basic techniques may be used in the preferred embodiment.

1) Decoy Transmissions. This technique transmits decoy test messages to decoy Docks 38. Here, the present invention discerns attempted spurious Push transactions. Unauthorized personnel can get access to Docks 38 by monitoring Push traffic and transmitting to a Dock 38 directly. A significant amount of traffic is directed at Bank maintained "dummy" Docks 38, so that a unauthorized personnel could be as likely to attempt to remotely penetrate the dummy Dock 38 as a real one and in doing so immediately set off an alarm at the Bank and a series of defensive measures designed to identify and capture the unauthorized personnel.

2) Transparent Transmissions. This technique transmits "transparent" test messages to active Docks 38. Here the present invention silently discerns any tampering with existing valid Docks 38. Unauthorized personnel can get to Docks 38 by obtaining access to one from the customer's side (e.g. stealing a PDA). Push Security component 58 sends test validation messages transparently (i.e. without revealing the message to the Dock operator) on a periodic basis to valid Docks 38. These test messages require the Dock 38 to respond correctly. If it does not, the system immediately sets off an alarm at the Bank and a series of defensive measures designed to identify and capture the unauthorized personnel or to identify a failed Dock 38.

3) Push and Push Dock 38 Mutual Synchronization. This technique establishes a mutual authentication/synchronization process between the Push and the Dock 38 which is specially designed to reveal tampering, replay, or denial of service attacks.

Each Push and each Push Dock 38 has three unique numbers: a is a 256 bit identification number, b is a 16 bit selection number, and c is a 256 bit result number. A Dock 38 is initially seeded with all three numbers, a, b and c.

When a Push arrives, the Dock 38 selects from the Push's signature number 16 bit blocks based on whether the digits of the Dock selection number is one or zero. If the selection bit is 1, the block is chosen, if it is 0 a block of zeros is chosen. The result is then XORed with the Dock's pre-seeded result number. The Push then performs the same operation on the Dock's numbers. The Push and the Dock 38 exchange result numbers. The Push returns the new result to the Push Server in the initial acknowledgment and the Dock 38 stores its new result in place of the old pre-seeded result number. The Push selection number becomes the new Dock selection number.

The following is a formulaic representation of this process where PID is the Push identification number PSEL is the Push selection number, PRES is the Push result number, PDID is the Push Dock identification number, PDSEL is the Push Dock selection number, and PDRES is the Push Dock result number:

Temp1=PDSEL(PDID) XOR PDRES

Temp2=PSEL(PID) XOR PRES

PDRES=Temp1

PRES=Temp2 (used in Push Ack)

PDSEL=PSEL

All initial numbers are randomly generated. PIDs and PDIDs, while randomly generated, are made unique to each Push and Push Dock respectively (i.e. a randomly generated repeat of a previously used number is discarded and a new random number is generated). The Transparent Transmissions described above resynchronize each Dock 38 just as if they were actual Pushes.

The Push Banking Server has knowledge of the true current and future states of all six numbers. If someone were to attempt to create a valid Push or Dock 38 by copying or replaying and did not have access to all six numbers, he or she would have virtually no chance of computing a good result number. A replay would simply produce a message with an already used result number. In either case, the present invention would not "fail" the message because of bad authentication but rather would begin to initiate PAD countermeasures while lulling the unauthorized personnel to think that the attempt was successful.

This method has the additional unanticipated benefit of being completely effective in an environment where Pushes could be received in an order different from which they were sent. The Server immediately realizes what has happened and resynchronizes on the fly. This provides a flexible alternative to standard message serial numbers.

The length of the numbers a=256, b=16, c=256 may be increased or decreased to create more assurance or accommodate a more limited environment respectively. In all cases, a must equal c and b must divide a and c without remainder.

In the present invention, security is applied selectively depending on the risk associated with a particular message (i.e., a Push or a Response), the channel and the Dock.

The PAF Decision Component 62 is the part of the system which decides if and when some piece of information must be pushed to a customer. The Decision Component 62 performs at least the following functions:

1) Monitoring accounts, transactions, etc. versus general Push profiles and customer supplied Push profiles (e.g., account is about to go overdraft—do a Push, customer wants to be pushed any debit greater than $100,000, etc.).

2) Deciding if a Push is required (i.e., meets one or more profile criteria).

3) Examining all other available customer information to determine possible Push Response options.

4) Passing Push messages and Push Response menu to the PAF Communications Component 64 (PAFCC).

Figure 6B:
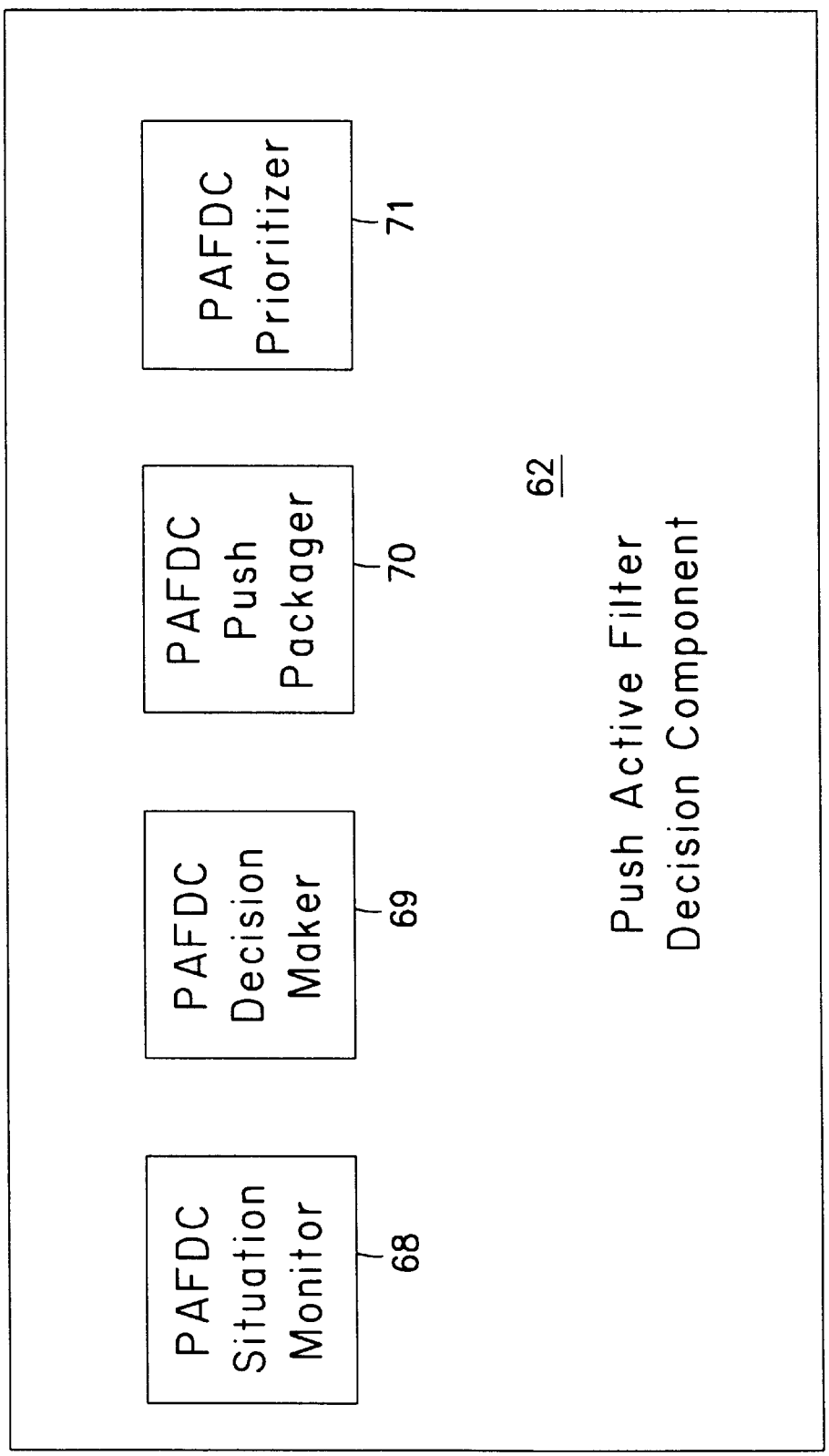
FIG. 6B depicts in more detail the components of the PAF Decision Component of the present invention.

The following section describes in more detail the PAF Decision Component 62 in reference to FIG. 6B. The PAFDC 62 consists, at the highest level, of four main components: the PAFDC Situation Monitor 68 which scans for or receives from sources of information for items of data relevant to a possible Push; the PAFDC Decision Maker 69, the decision making component which decides if a Push should be made; the PAFDC Push Packager 70 which formats the Push in a way compatible with the transmission requirements of the PAF Communications Component for a customer's device or list of devices to which a Push is to be sent; and the PAFDC Prioritizer 71, which assigns a relative priority to a Push based on the context of current Push messages that have not been responded to.

The PAFDC Situation Monitor 68 includes an Interface Handler which manages access to existing bank files and records.

PAFDC Decision Maker 69 also includes a Rule Acquisition subcomponent which a) enables it to scan previous days' data and other information to create new decision rules through machine learning and b) accepts operator entered rules (e.g. customer specified Push preferences). PAFDC Decision Maker 69 works in conjunction with the PAF Business rule engine 102 and the business rules database 104 (FIG. 6A) to implement business decision rules.

The Rule Acquisition subcomponent could be represented by a person who maintains the rules and integrates new trends and resolves conflicts with current assumptions.

The PAFDC Situation Monitor 68 is responsible for scanning data available from or received from: 1) customer account files; 2) transaction files; 3) bank-maintained statistical and analytical files; 4) consolidated files and alerts from other banks which relate to the Push Banking System as a concentration bank for a particular customer; and 5) external information sources. When monitoring external data sources, linguistic processing engines may be useful to ensure that messages are triggered in the context the customer intended.

The PAFDC Situation Monitor 68 scans the Bank's files as transparently as possible—ideally without interacting directly with the underlying Bank systems or without requiring modification of those systems.

All information received from consolidated files and alerts from other banks which relate to the Push Banking System as a concentration bank for a particular customer are be maintained by the Situation Monitor 68 until it is superseded by fresh information or end of day/beginning of day conditions.

External Information sources are monitored through a traditional Push Technology system under a profile supplied by the Push Banking system administrators. The profile criteria of Push Technology (PT) system is synchronized with the set of external information items available to the Situation Monitor 68. As information appears from the PT system, a subroutine posts it to the appropriate internal data item. For instance, if unrest appears in an emerging nation, an indicator and a pointer to a brief descriptive text is posted to that nations' data item. Market pricing data is also posted.

All information sources are scanned on a regular basis. Higher volume, more volatile or more critical information is scanned at a higher frequency than other data or communicated through immediate alerts. Frequencies of scans are synchronized so that each lower frequency divides evenly into the next higher scan frequency. For example the lowest scan frequency might be once in ten minutes, followed by every 2 minutes, every minute and every half-minute for various categories of data. After each highest frequency scan (e.g. every half minute in the previous example) all scanned data is posted to the PAFDC Decision Maker 69 on a customer by customer basis.

A second component of the PAFDC Decision Maker 69 is a Rule Acquisition system which a) enables it to scan previous days' data and other information to create new decision rules through machine learning and b) accepts operator entered rules (e.g. customer specified Push preferences).

The PAFDC Decision Maker 69 consists in part of a rule-based Artificial Intelligence system using the concepts disclosed in U.S. Pat. 5,259,066 and in the paper *Neural Nets v. Expert Systems in Real Time Systems* presented at the IEEE Electron/93 International Conference or, depending on the specific implementation, other decision making processes such as database stored procedures or application logic. Scanned data from the Situation Monitor 68 is posted to the Decision Maker 69. The data item is called an attribute in a rule based system and its content is called its value. The output of a rule based system is called an action. Actions are input to the PAFDC Push Packager 70.

Decision processing in the preferred implementation of the invention is rule-based. Each function requiring decision processing is characterized as having a specific set of attributes with defined values that uniquely determine what action the function must perform. As these attributes take on different values, they match one of a set of rules in the function. A rule that matches the set of attribute values is said to "fire", and a rule that "fires" causes the action associated with the rule to be performed.

Each rule is defined as having the form: $A*B*C \ldots *K$, where $A,B,C,\ldots K$ represent the attributes that may take on one of two or more discrete values. The operator * represents the logical "AND" function such that the rule is "true" (fires) only if every attribute in the rule simultaneously equals the value specified for the attribute in the rule. Each rule contains only those attributes necessary for the definition of the rule. Thus, attributes omitted from a rule can not influence the firing of a rule.

Attributes that must reflect the effect of continuous values are assigned discrete values based on which segment, within the allowable range of values, that the value lies. For example, if the attributes are to represent in which of eight segments a bank balance lies, three binary attributes could be assigned to represent the eight segments with the standard 000, 001, . . . ,111 binary encoding or decimal equivalent.

The rules in a function are mutually exclusive. That is, by design each rule differs from every other rule in the rule set for that function. As long as at least one attribute value in a rule differs from the value of that attribute in another rule, the two rules can not "fire" at the same time. Thus, each rule in the rule set must have at least one attribute in common with each other rule of the set, but with different values for the attribute in common. It is therefore assured that only one action will be performed by the function at any particular point in time. The decision process always makes a uniquely defined decision as to which action should be taken.

Although the rules are mutually exclusive, more than one rule may specify the same action. This provides the logical "OR" function implicitly. Contextual interpretation of the attributes is provided by defining contextual attributes that are set by certain rules and reset by other rules. Incorporation of these contextual attributes in rules provides contextual interpretation of the other attributes contained within those rules.

The decisions made by Decision Maker 69 are made synchronously with a timing signal so that the attributes may change values asynchronously between decision time points with no effect on rule firing. Rules are only permitted to "fire" at the designated decision time points.

The interface of a generic decision processor within a function consists of the attribute value inputs, timing signal, and action output signal.

In a preferred embodiment, the rule set is implemented as a decision tree in order to avoid searching through the rule set for a match. Since the rule set contains only mutually exclusive rules, a single tree can be constructed with no ambiguity. The order of occurrence of the attributes in the tree is selected in the order of increasing generality so that the most efficient tree is built. The attribute occurring most often in the rule set is placed first, at the root of the tree. This process is repeated for the remaining attributes, placing the next most frequently occurring attribute next in order, until the order for all attributes is established. When more than one attribute occur the same number of times in the rule set, they are placed in the tree sequentially in arbitrary order following the previously selected attributes in the order established above. The terminus of each branch (leaf) designates the action to be performed by the function.

An Automated Rule Acquisition System of Decision Maker 69 operates in batchmode against the previous period's information (e.g. day, week, month) as it appears today in the attempt to find Push opportunities that were missed in regular Push Banking processing.

Further envisioned in the preferred embodiment is self-evolution of the rules. This is implemented as a set of meta rules that recognize inconsistency between prior experience and current occurrences. The meta rules embody reasonableness tests to detect aberrant behavior and the forming of new trends. As new trends are confirmed, the meta rules provide the instructions for modification of the decision tree that performs the day-to-day decision processing. The meta rules themselves are also implemented preferably as a decision tree. The actions invoked by the meta rule tree cause insertion and deletion of attributes into the day-to-day decision tree, and edit existing action procedures or create new action procedures that are selected by the day-to-day decision tree leaves.

The meta rules are particularly sensitive to manual override of the generic decision processor. This enables the automatic incorporation of changes introduced on a regular basis by the system operator. Since manual correction normally signals a change in procedures or other system modification, this automatic adaptation reduces the required maintenance efforts usually needed for automated decision processing.

A Manual Rule Acquisition system of the Decision Maker 69 allows direct input of rules by a duly authorized operator. Such rules are generated prior to the first operation of Decision Maker 69 through customer submitted Push requirements and at the introduction of new Banking or Push Banking products and services.

PAFDC Decision Maker 69 checks any Push recommendation against those already transmitted. Any new Push will be given to the PAFDC Push Packager 70 for processing.

The PAFDC Prioritizer 71 is responsible for assigning a relative priority to each Push based on the other Pushes being generated now and the outstanding Pushes that have not been responded to.

It is possible that a customer has been sent from 1 to n Push messages that may or may not refer to the same topic. In order to ensure that the most urgent messages reach a customer first, the PAFDC Prioritizer 71 examines the list of messages that are currently outstanding (those that have not been responded to) and associates them by topic and ranks them by priority. It then examines the topic and priority of the message currently being constructed and assigns a priority to the new message. This is performed by employing decimal fractions, wherein a priority of 0 (not used) means a message should never be sent at all and 1 (not used) means it should have arrived yesterday. Thus, to insert a message in the priority queue between a 0.7 message and a 0.8 message, a value of 0.75 is assigned; to insert between 0.7 and 0.75, a value of 0.725 is used, etc. The PAFDC Push Packager 70 formats the push decision in a way compatible with the transmission requirements of the PAF Communications Component 64. It does this using the "Action" pointers designated by the PAFDC Decision Maker 69 for text message components for the various Push situations. The Push Packager 70 takes the text message components, the customer identification information, and the scanned data and composes a full Push message, which is then passed to the PAF Communications Component 64 for further formatting and transmission in priority order. The Push Packager 70 performs analogous formatting when a Response is translated into a Bank transaction 12. (See FIG. 6A).

A significant aspect of the present invention is its bidirectional form of communication as compared to the unidirectional nature. (i.e. server to client) of traditional Push technology The present invention is not unidirectional (i.e. server to client) as is Push Technology. Accordingly, an integral part is the Push Response. A Push Response is the component that allows the customer to react in a timely and effective fashion to the information received through Push. The Push establishes a Push Response mechanism that is enabled by the Push Dock. A Push Response from the customer is answered through a Push Response Acknowledgment from the Push Active Filter 30. Subsequently other acknowledgments or advices produced in fulfillment of the instructions of the Push Response can also be Pushed back to the customer as required.

Another feature of Push Response is that it leverages all security features of the device that received the Push. The most sophisticated devices will send three acknowledgments:

First, a machine acknowledgment shows only that the customer's dock has received the message. This may consist, for those docks using TCP connections, only in a successful TCP socket close action.

Second, a customer acknowledgment shows that the user of the dock has successfully decrypted the message (if it was encrypted) and has displayed it. It is presumed that if the message has been displayed, the customer has read it.

Third, a message response is sent when the customer has decided what action to take.

If all three acknowledgments cannot be sent by the device, the customer will be sent (at their option) 1) a simple message that directs them to call Customer Service, which will then verify the customer's identity, or 2) a message that directs them to call Customer Service but also contains code words that the customer has registered as indicating given scenarios. An example of the use of code words is: a customer registers that code word "Tomato" with the topic "Asian Markets" and the code word "Burning" with the action "fallen ten percent". When a Push condition indicating that Asian markets have fallen ten percent has occurred, the customer will receive a message stating "The tomato is burning —please call your Customer Service representative". Code words need not be restricted to words and phrases; in the above example, a customer could have chosen the string "423" with "Asian Markets" and "001—0" with "fallen ten percent", resulting in a message consisting of "423 001— 00—please call your customer service representative".

Further expanding the notion of bi-directionality, customers are able (depending on the capabilities of their devices) to self-administer their user and interest profiles in a safe and secure manner. Examples of user profile administration include the customer's ability to change its preferred registered device (for example, from pager to PDA) and contact order (for example, send first notification to PDA, second notification to pager, etc.). Examples of interest profiles include the customer's ability to change the topic and relative importance of items of interest (for example, never contact if checking account becomes overdrawn, send highest priority message if Asian markets fall by a given percentage, etc.).

The following section describes the high-level application functionality of the PAF Communication Component 64.

The PAFCC 64 is capable of sending the following message types: Standard messages to the end user; Process ACK messages to the end customer; and Requests for message status.

In response to any of these message types, docks can return: Standard replies from the end customers; Customer Initiated Messages; and Message status information.

Figure 6C:
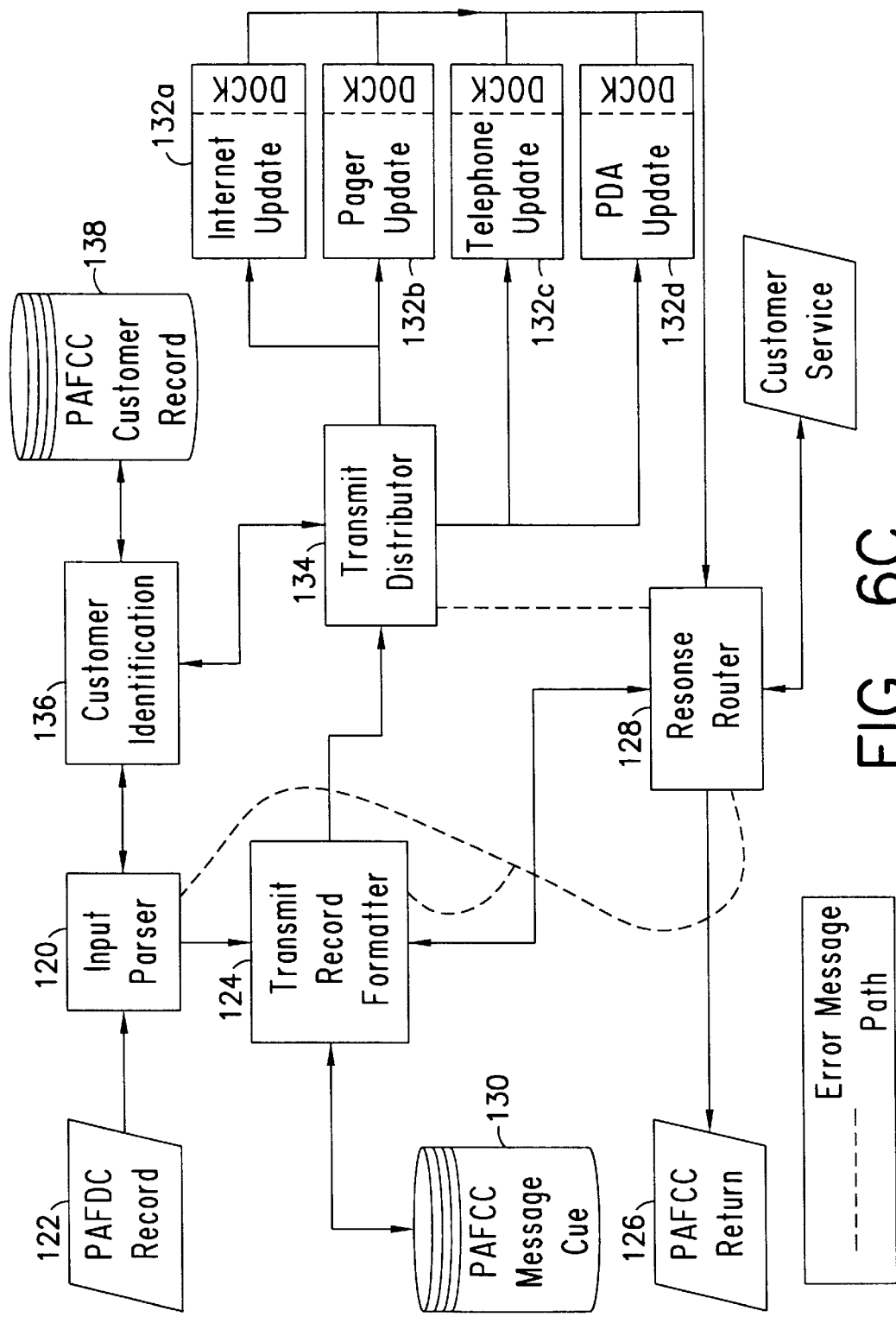
FIG. 6C illustrates the architectural components of the PAFCC.

As shown in the block diagram of FIG. 6C, the PAFCC's 64 first task in sending a message is to use its Input Parser to retrieve pending messages, in the form of a record 122, for example, from its paired PAFDC 62, and validates them. For example, to pass as a valid XML communication, a PAF message must have: A valid start (<PAF>) and end (<\PAF>) tags; One currently unique message identification (<ID>); One valid customer to send to (<TO>); and A valid priority (<PR>) value; and a non-null message to be sent.

If a message does not pass through the validation procedures for its format either in Input Parser 120 or the Transmit Record Formatter 124, an error is returned 126 to the PAFDC 62 via the Response Router 128, with the problem or problems fully detailed.

Validated messages are next logged, with their status, in a persistent data store 130 for transmission. Messages that have a response or have gone stale are moved to the PAFCC activity log. At this point a return 126 is sent to the PAFDC 62 with the message status. The PAFCC 64 automatically performs clean up on those Docks 132a–132d that support it. After a response has been processed, docks 132a–142d whose status indicates the customer hasn't read the message can remove them from the docks queue. If the message has already been read on another than the responding dock, the return values are hidden and a value of "Responded To" is set in its place. Lower level docks will only receive an acknowledgment at the end of processing. Second responses and post stale date responses generate an error message to the PAFDC 62 and a PAFCC 64 log entry.

Priority, as logged from the PAFDC 62, plays a role when there is competition for limited resources. At any point that the PAFCC 64 sees a collection of records to process, it reorders them by the criticality that they be transmitted immediately. In addition to priority, the PAFCC 64 knows the origination time and data of the message, its current status and its lifetime. Each message has a stale date that can be qualified to the second. Criticality is based on all of these factors. A lower priority message with a short stale date could be processed before a higher priority message with a much longer valid time.

The PAFDC 62 sends messages in bursts after scanning its entire customer list. All the messages in the burst are processed by the Input Parser 120. Then the Record Formatter 124 sends them in criticality order. As each message is processed it is mated in the Transmit Distributor 134 with customer transmission data 136 from the Customer Records 138. Since these new messages have a new or not-sent condition they queue up immediately for transmission. This makes any particular customer's messages transmit in priority order.

The type of dock 132a–132d controls how messages are handled from the time it is received by a channel to the time it is cleaned up. All processing calls (for example, send, status, return and so forth) are modified by the dock 132a–132d according to its type. The highest level docks 132a–132d have a client side component that can fully interact with the PAFCC 64 to support update and change functions. These docks can actively tell us 1) what they've received, 2) if the customer has viewed the message, and 3) the customer's responses. If messages haven't been responded to, an update can be applied at the dock and displayed when the customer is available. The message can be canceled, if it hasn't been displayed and another channel has responded.

At the next level are docks that support two-way communications and guaranteed delivery. PAFCC 64 can tell if the device has received the message, but not if the client physically has the device. Usually the dock 132a–132d must be polled for status. The order of display is the order of actual transmission. There is usually a service (e.g. a telecommunication system) between the Push system and the dock. Depending on the complexity of the service interface, messages may be canceled or otherwise manipulated. These docks may require new transmissions to keep the customer up-to-date. This is especially true if a response is received after its stale date has been reached.

If a one-way dock is used, the responses are handled by the customer service system. The Customer Service (CS) representative must be able to call up a historical and current view of the message while conversing with the customer. When CS closes a message they have a higher validity than dock messages. For all types of communication, the only way a customer can change its decision is through CS. Docks that cannot guarantee delivery may be retransmitted at a rate determined by an algorithm in the PAFCC 64 distribution system.

For more capable docks, the PAFCC 64 receives acknowledgments and sends three kinds of responses back to the PAFDC 62: 1) response received but the Push is stale, 2) response received, 3) response received and transaction processed.

The PAFCC 64 has a reprioritization function which is responsible for re-ordering messages based on current priority and their nearness to their stale dates.

The PAFCC 64 also detects logjams in the sending stream. If, over a period of time, messages cannot be sent optimally fast, the PAFCC 64 will construct new and shorter messages and try to send these to their destinations.

If the service standard for message transmission continues to be sub-optimal, the PAFCC 64 will alert the system operator or carrier personnel automatically and proactively and direct them to begin tracking down the cause of the logjam.

Figure 7:
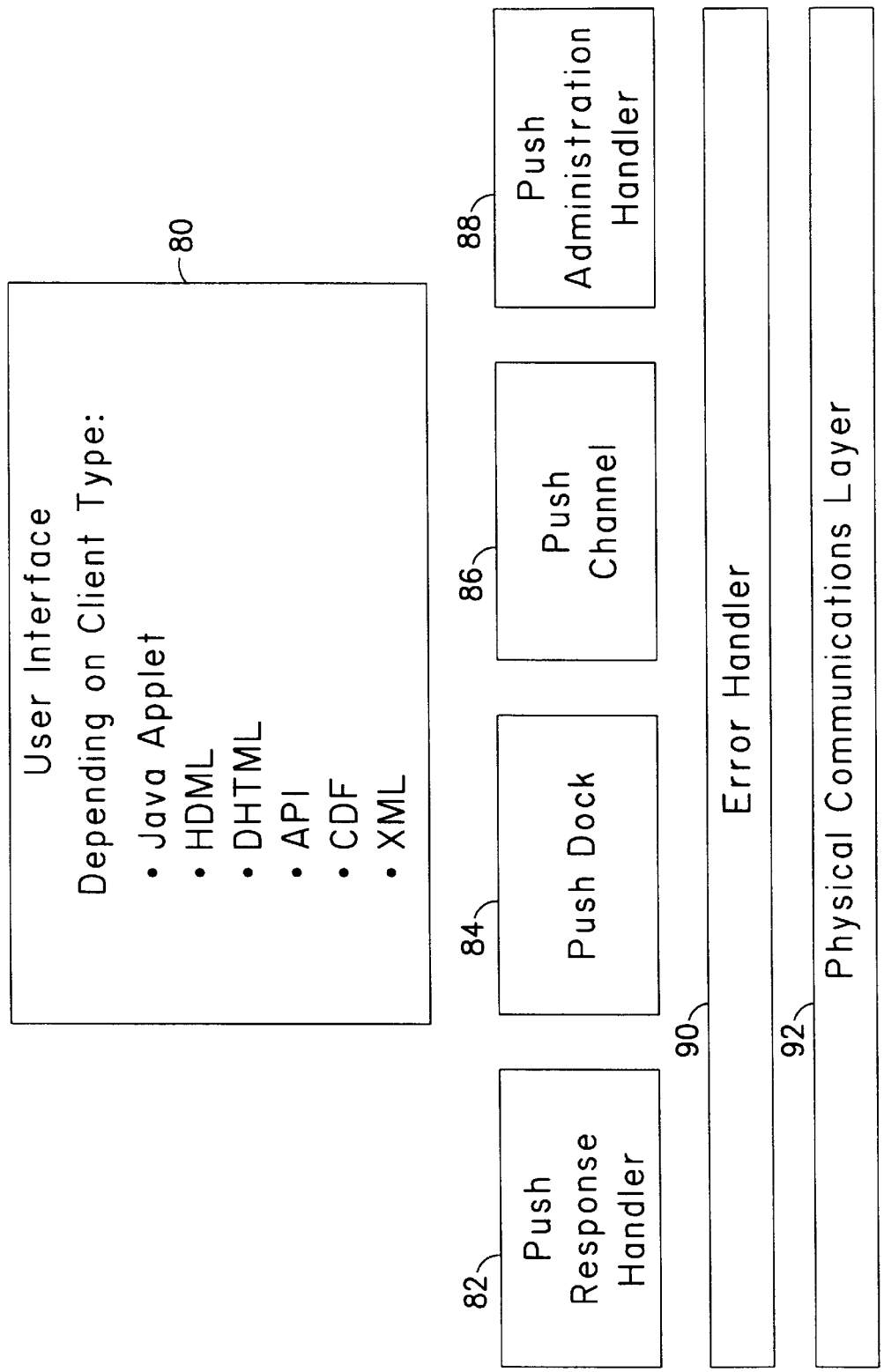
FIG. 7 illustrates in block diagram format the architecture of the customer components of the present invention.

The following section describes the functionality of the present invention at the customer end. FIG. 7 depicts the various components of the customer end architecture. Each component is described below.

In addition to supporting a multiple user interfaces for each platform (physical device), new services will constantly be introduced which will require modular construction of the system.

The architecture of the customer side of the present invention enables a customer to receive information via a Push from the bank and then be able to respond. The types of physical devices which can be used by a customer include, but are not limited to: Desktop Computer, Laptop Computer, On-line Terminal, Network Computer, Personal Digital Assistant, Programmable Cellular Phone, Programmable Two-way Pager, Interactive Cable TV, and Interactive Satellite TV.

In addition to the wide range of physical devices that must be supported, the present invention is also not dependent on one topology. The system works over the following: Internet, Intranet, Extranet, Telephone networks, Wireless Networks, IP, Networking Protocols, Satellite Protocols, and Cable Protocols. The above list is not exhaustive and is intended to include new programmable devices and channels of communication as they become available and as support for combinations of devices and channels evolve.

Additionally, the present invention is intended to be accessible via a dial-in response to the bank customer service system by the customer once they are contacted. These services consist of the bank system contacting the customer via one of the following methods: telephone, telegraph, fax, beeper, one-way cable TV, one-way satellite, dial-out terminal, on-line terminal, Internet, Intranet or Extranet, SmartPhone, 2-way beeper, Personal Digital Assistant (PDA), Personal Computer (PC), express mail delivery, commercial express delivery and various systems-of the type mentioned above. The list above is not exhaustive and is intended to be expanded as new programmable devices become available.

The following table briefly describes the form the Dock may take for each delivery mode.

| Push Channel | Push Dock |
|---|---|
| mail express delivery | enclosed 2-way beeper or PDA |
| commercial express delivery | enclosed 2-way beeper o PDA |
| *telephone | online voice or tone response |
| *fax | dial in response |
| *beeper | dial in response |
| **one way cable TV | dial in response |
| **one way satellite TV | dial in response |
| ***dial up terminal | interactive response |
| ***Internet, Intranet or Extranet client | interactive response |
| ***Smartphone | interactive response |
| ***two-way beeper | interactive response |
| ***personal digital assistant (PDA) | interactive response |
| ***interactive cable TV | interactive response |
| ***interactive satellite TV | interactive response |

With reference to FIG. 7, there are shown various software blocks for use at the customer side of the communication path. These include the aforementioned user interface 80 and software which implements such functions such as Push Response 82, Push Dock 84, Push Channel 86, Push Administration 88, Error Handler 90 and a Physical Communications Layer 92.

The user interface module 80 is only applicable to programmable customer devices. Depending on the target device, the user interface ranges from displaying a simple text message (e.g. beeper text messages) to a complex graphical interface (e.g. Web browser). As much as possible, common standard technologies are employed to implement the user interfaces. These technologies include, but are not limited to, Java, HTML and HDML (the hand-held markup language from Unwired Planet).

Personal Computers (PCs), Personal Digital Assistants (PDAs) offer the most functionality and complexity of any devices. Due to amount of available memory and storage capacity, these devices preferably employ a memory resident program which monitors incoming Pushes; and use a display large enough to display messages with a minimum of scrolling.

Two-way Pagers and SmartPhones are categorized by their ability to send responses back to a server. Additionally, some devices have the ability of storing applications. For the present, these devices are limited to responding to a series of Pushes in a serial fashion.

The Push Dock module 84 is responsible for receiving, validating and storing messages from the Push Active Filter 30 (see FIG. 3). Push Dock 84 and Push Response 82 (which also contains executable code) together enable the customer to view messages and make an appropriate response. This storage functionality is local if the physical device supports persistence storage. Two options exist for available docking space at the Customer end. 1) pre-allocated size—meaning a fixed amount of space for Pushes and Cleanups; or 2) an amount of available space signaled by system—meaning a variable but not infinite number of Pushes and Cleanups can be accommodated. Either situation can require a "Dock Full" message from the Dock 84 to the PAFCC 64 (see FIG. 5A and FIG. 5B).

The Push Channel 86 in FIG. 7 is the logical and physical communications media between the Push Active Filter 30 (FIG. 3) and the customers' Push Dock 84. The channel 86 is analogous to a telephone line and network, where the line transmits the call and the network routes it. The Internet is a Push Channel 86 as are two way wireless communications networks and interactive cable TV networks. Multiple channels may be supported for a single customer. As new telecommunications services are introduced, they may be accommodated by a separate Channel 86.

Figure 8:
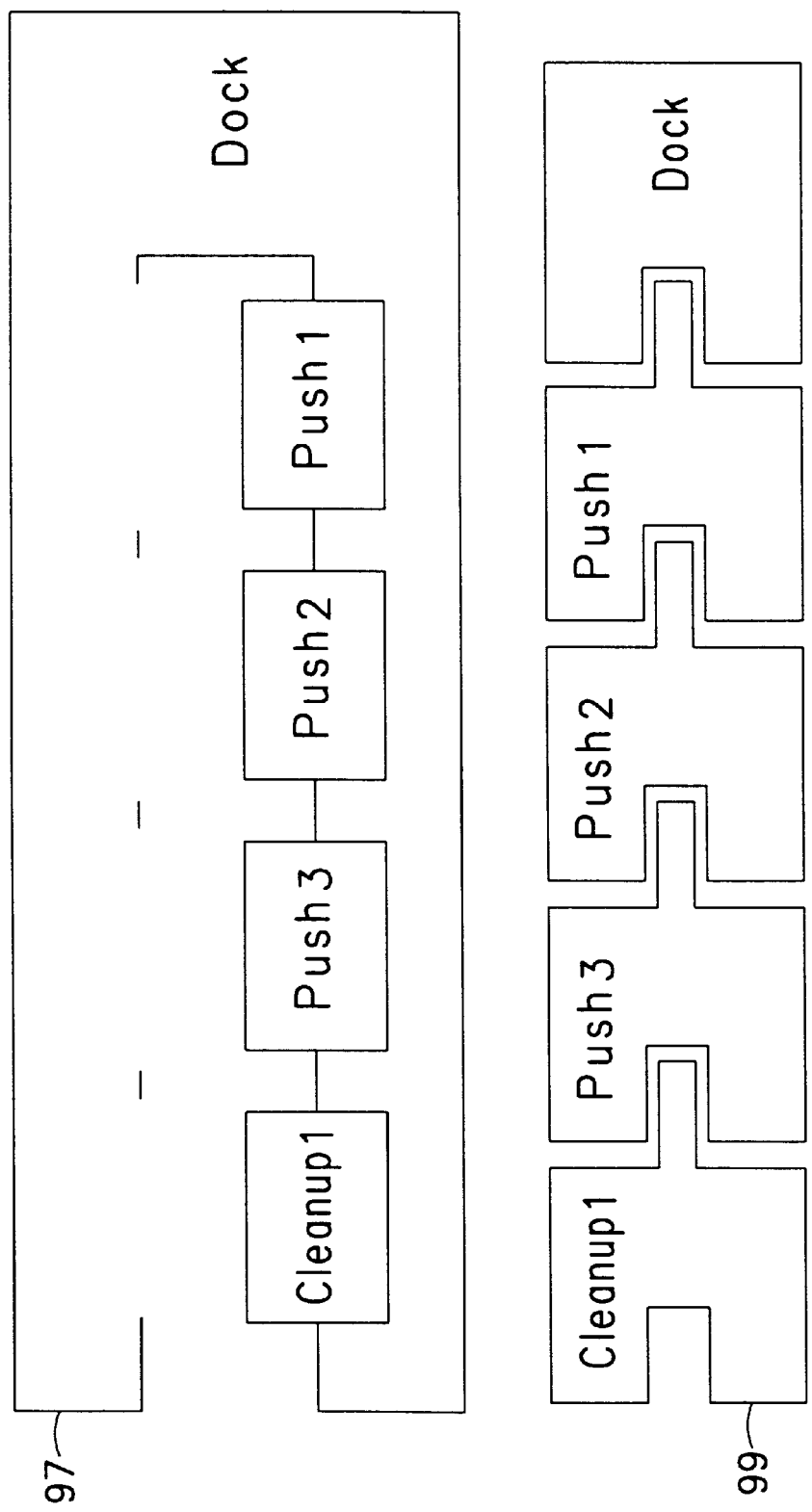
FIG. 8 illustrates two types of dock models.

FIG. 8 illustrates the two types of Dock memory models, where 97 designates a fixed memory, multibay type of Dock and reference numeral 99 indicates variable memory, single bay, "piggyback" type of docking.

Figure 9A:
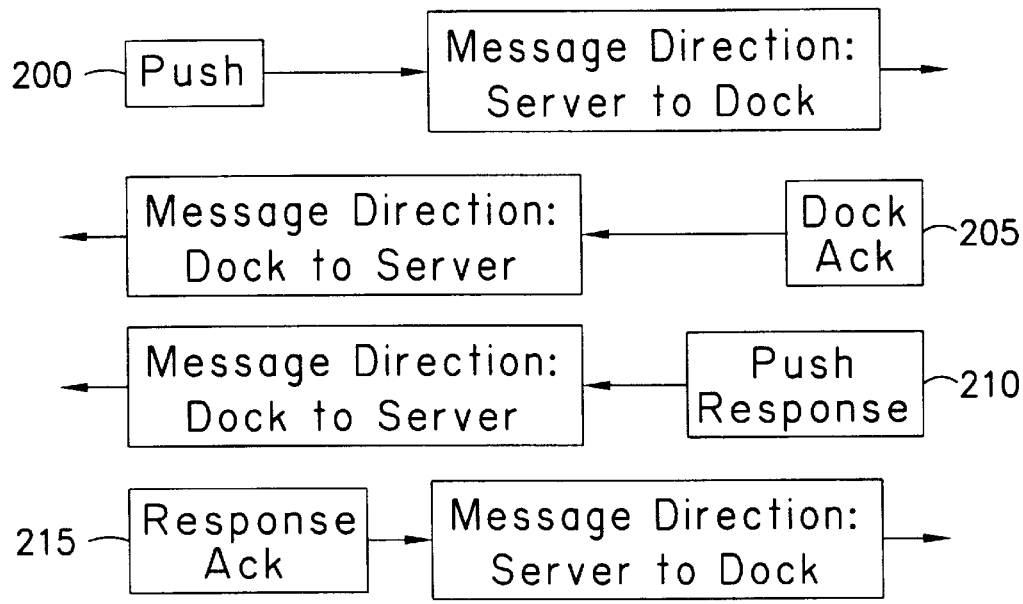
FIG. 9A illustrates the information flow during a Push operation.
Figure 9B:
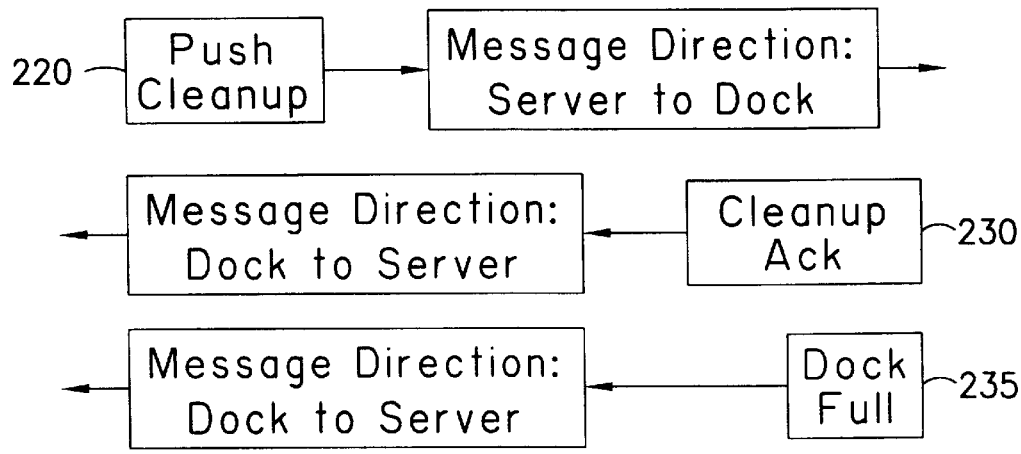
FIG. 9B illustrates the "clean-up" and "dock full message" operations.

FIGS. 9A and 9B contain illustrations of some of the types of possible messages on a Push Channel 86 including their direction (PAFCC to Dock or Dock to PAFCC).

Figure 10:
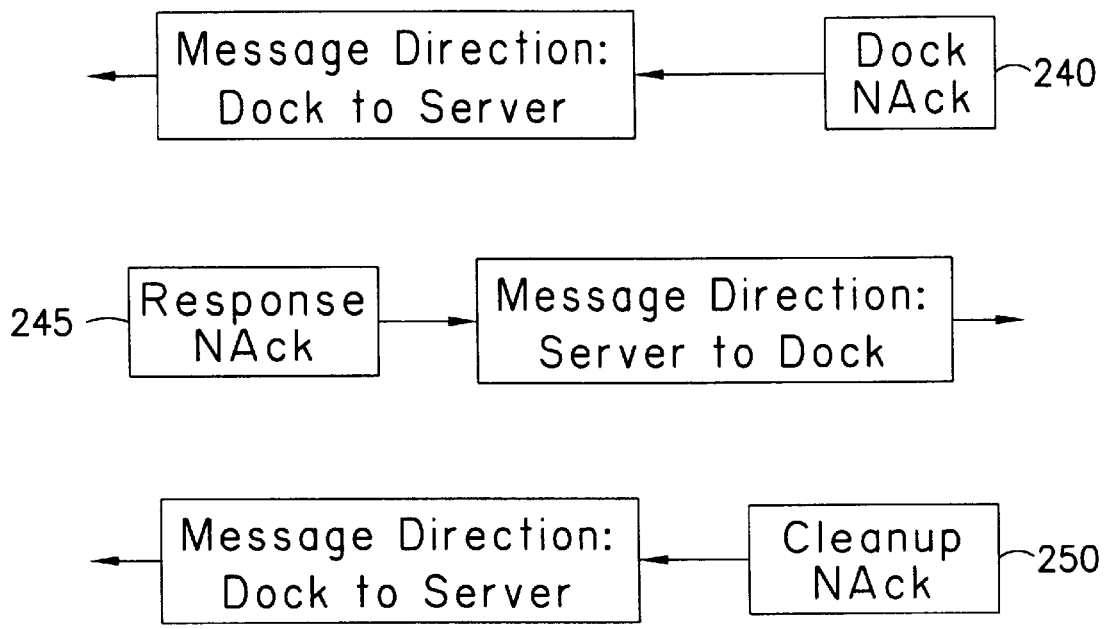
FIG. 10 illustrates the acknowledgment procedures of the present invention.

As shown in FIG. 9A, several types of messages are possible relating to Pushes including a Push 200, from the server (bank) to the dock (customer); a dock acknowledgment 205 of the receipt of Push (from the dock to the server); a Push Response 210; and a Response acknowledgment 215. FIG. 9B shows messages related to cleanups, 220, 230 and a Dock Full message 235. Similarly, FIG. 10 depicts possible Nack negative acknowledgment messages 240, 245, 250, on a channel including their direction.

Table 2 below is a list of possible states of a Push Dock relative to Dock and Channel type:

TABLE 2

| Push Channel | Push Dock | Dock States (Push) | Dock States (Cleanup) |
|---|---|---|---|
| interactive satellite TV | set top +SW | 1-2-3-4 | 1-2-3-4 |
| interactive cable TV | set top +SW | 1-2-3-4 | 1-2-3-4 |
| personal digital assistant (PDA) | PDA + SW | 1-2-3-4 | 1-2-3-4 |
| two-way pager | two-way pager +SW | 1-2-3-4 | 1-2-3-4 |
| smartphone | smartphone +SW | 1-2-3-4 | 1-2-3-4 |

TABLE 2-continued

| Push Channel | Push Dock | Dock States (Push) | Dock States (Cleanup) |
|---|---|---|---|
| Internet, etc. customer | Internet, etc. customer +SW | 1-2-3-4 | 1-2-3-4 |
| online terminal | online terminal +/−HW/SW | 1X-NA-3-4 | 1-2-3-4 |
| dial up terminal | dial up terminal +/−HW/SW | 1X-NA-3-4 | 1-2-3-4 |
| one way satellite TV | set top +HW/SW | 1X-NA-NA-NA | 1-NA-NA-4 |
| one way cable TV | set top +HW/SW | 1X-NA-NA-NA | 1-NA-NA-4 |
| one way pager | pager | 1X-NA-NA-NA | 1-NA-NA-4 |
| fax | fax | 1-NA-NA-NA | 1-NA-NA-4 |
| telephone | none or answer machine | NA-NA-NA-4 | 1-NA-NA-4 |
| Possible Dock States (Push): 0) no Push, 1) no ack, 1X) some systems provide ack, some do not, 2) no receipt, 3) no response, 4) response | | Possible Dock States (Cleanup): 1) Push, 2) no cleanup ack, 3) cleanup, 4) cleanup explain | |

Referring back to FIG. 7, Push Administration Handler 88 is responsible for general administration of the customer profile. It is specifically responsible for: cleaning up a Push after it has been transmitted, administrating multiple responses, binding the Push and Dock, and sending the response.

The Push Response Handler 82 is responsible for processing the appropriate acknowledgment codes and formatting the response. The response uses a security algorithm and a Push specified communications protocol.

The Error Handler 90 is responsible for resolving errors and assigning error codes.

The Physical Communications layer 92 is responsible for the actual reception and transmission of information on the customer side.

Spontaneous upstream messages are messages sent by a dock (at the customer's request) to the PAF 30 that are not in response to a Pushed downstream message. These messages can be used to communicate the customer's desire to change a PAFDC 62 or PAFCC 64 profile element.

The PAF 30 does not act upon the request immediately. Instead, the PAFDC 62 or PAFCC 64 (whichever is responsible for maintaining the particular attribute being changed by the customer) generates a normal downstream message with text "You have requested changing (attribute) from (oldvalue) to (newvalue). Confirm?" and responses "Yes" (code=1) and "No" (code=0). Only if and when the customer responds with a normal (non-spontaneous) upstream reply saying "Yes" is the profile change actually made. The PAFDC 62 processes profile updates before or during its next firing cycle, to ensure that the PAFDC 62 is acting on correct instructions.

Figure 11A:
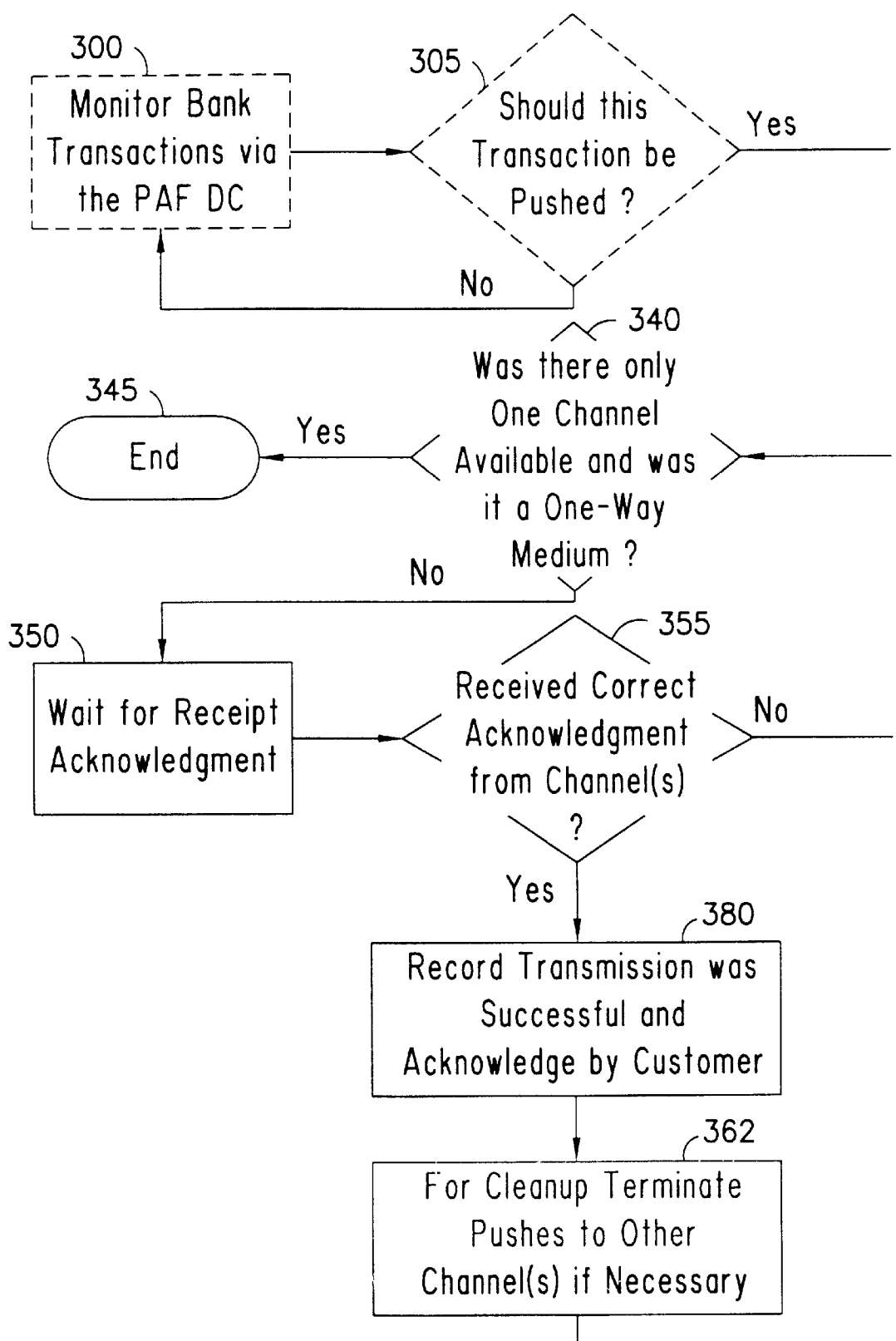
FIGS. 11A and 11B show the PAF Communication Component (PAFCC) process flow.
Figure 11B:
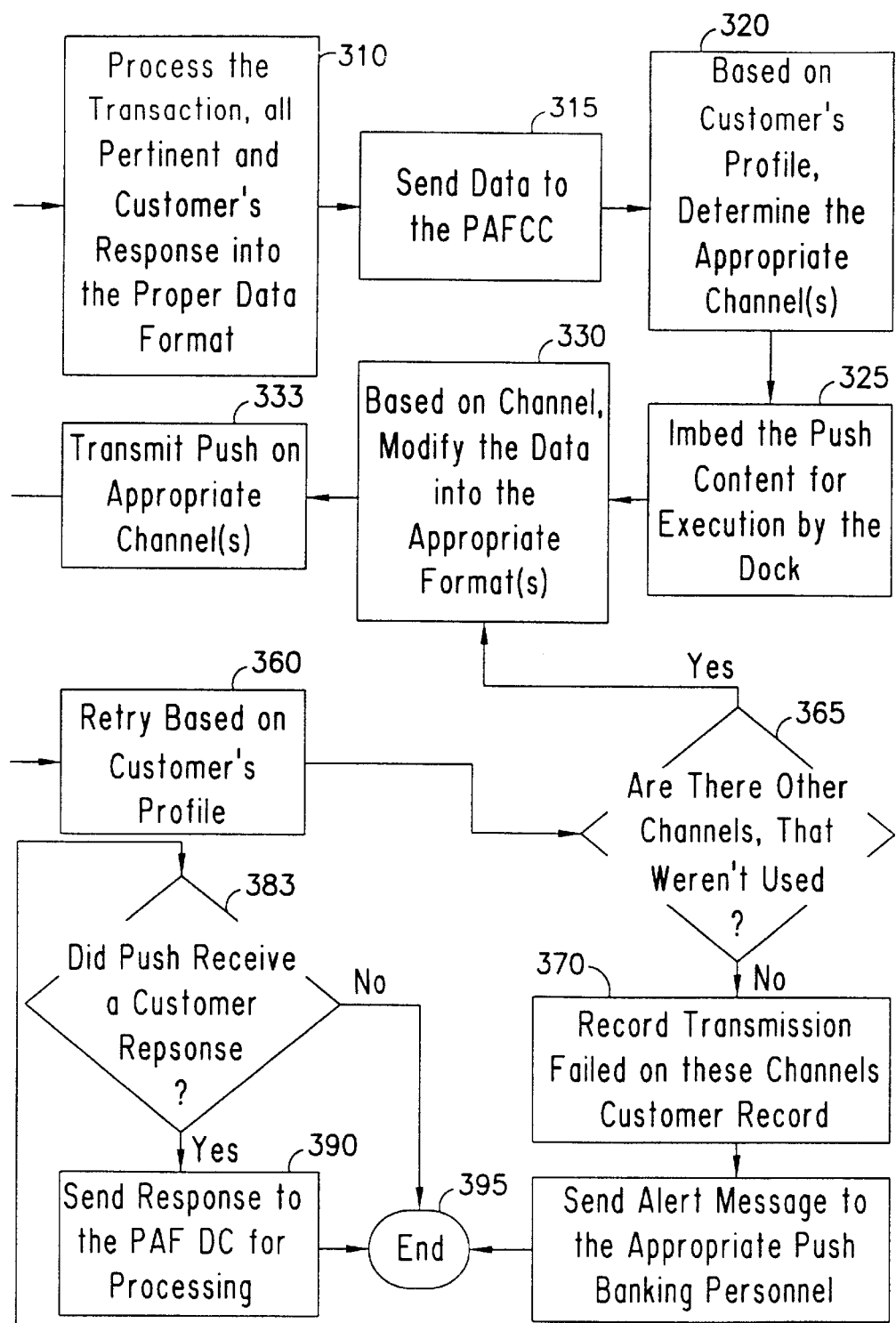

The following section will describe the process of pushing a Push to a customer with reference to FIG. 11. Assumptions for process depicted in FIGS. 11A and 11B are that the process flow is generic for any channel and that a Push is sent over multiple channels (e.g. beeper, Internet, etc.)

In block 300, the PAFDC 62 (FIG. 6B) monitors bank transactions, balances, derived analytical data, public and private data and data supplied to the system by other banks in its role as the customer's concentration Bank.

In decision block 305, if the PAFDC Decision Maker 69 determines that a situation satisfies a customer or general Push profile, a Push will be sent. If no push is necessary, the PAFDC continues to monitor band transactions in step 300.

In block 310, the PAF DC 62 assembles the Push content (i.e., Push statement detail and user responses scripts). The Push content is then handed over to PAFCC 64 (FIG. 6C) in block 315.

In block 320, PAFCC 64 chooses the channel(s) based on the customer's profile. Based on the customer's Channel and Dock capabilities, the PAFCC 64 in block 325 imbeds the Push content in a "Push" which in the ideal case is an applet or piece of code executable by the Dock.

In block 330, the Push is formatted based on the channel(s)' transmission protocols, and in block 335, the Push is transmitted on the appropriate channel(s).

Decision block 340 determines if the channel is a one-way medium (e.g., pager, fax). If so, the customer's Push transaction is recorded in that channel and the process ends in block 345. In this case, the Push consists of "content" only and has no associated applet. These Pushes ask the customer to reply to a "1-800-" customer service center with a Push Code. The customer service center automatically signals the PAFCC 64 that a valid response has been made to that Push. If the customer does not respond to the Push within a previously agreed time, the information is re-transmitted. Retransmission stops when the Push goes stale.

If there is more than one channel available for the push, and the channel on which the push was sent was a one way medium (No out of step 340) in block 350, the system waits for responses from the Push Dock. Possible normal responses are, in expected order: 1) the Push Dock acknowledges a Push as received and valid; 2) the Push Dock acknowledges that the customer has received message; and 3) the Push Dock transmits customer response. Possible error messages are: 1) the Push failed message authentication; 2) the Push Dock is full and can accept no more Pushes; and 3) the Push Dock is full and has replaced this Push with one received because a new Push had higher priority.

Decision block 355 decides if an acknowledgment is received from the Push Dock, and if the acknowledgment is valid, invalid or indicates an error condition. If a correct acknowledgment is received, the process moves to step 380 (YES out of block 355). In the acknowledgment is invalid or indicates an error, the process proceeds to step 360 (NO out of block 355). In block 360, depending on the response condition determined in block 355, the response is accepted or the Push is re-transmitted or an error is logged.

Decision block 365 determines if other channels of transmission can be used. In the case where no valid response can be obtained from a channel and the customer has indicated more than one channel option and has requested being pushed channel by channel in serial order, the system checks if another channel is available for the customer. Pushing in serial order means first trying Channel 1, then Channel 2, etc. Broadcast Push sends out the Push on all available Channels substantially simultaneously. If there other channel options, then the process beginning at step 330 is repeated. In the case where no valid response can be obtained from a channel and there isn't another channel available and the Push becomes stale, then the Push is discontinued in block 370 and recorded as a failure.

In block 375, a message is sent to the PAF Administration Component 66 (FIG. 6A) alerting of the failed Push and the process ends in block 395.

In block 380, if the Push Resp e is accepted then the Push was successful and the Pushes on other chanelsare terminated in block 382.

In decision block 385, if the Push did not require a customer response, then the process ends in block 395. Otherwise, the Response is handed back to the PAFDC 62 (FIG. 6B) for formatting as a standard bank transaction in block 390. The PAFDC 62 then enters the transaction into the standard Bank input stream.

FIG. 12 illustrates the process for capturing the customer profiles maintained in database 106 (FIG. 6A). In step 1600 the profile is received from the customer. In step 1605, the system assigns the customer a push banking identifier. In step 1610, all of the customer's account information is retrieved. In step 1615 non-bank financial information is captured (e.g., accounts at other institutions). In step 1620, the system assigns channels type, category, channel priority level, etc. for each channel designated by the customer. In step 1625, the system capture non-financial information, and in step 1630 assigns channels type, category, channel priority, etc.

Various scenarios for use-cases are possible and envisioned for the system of the present invention. The table below summarizes these scenarios and indicates the drawing corresponding thereto.

Figure 13B:
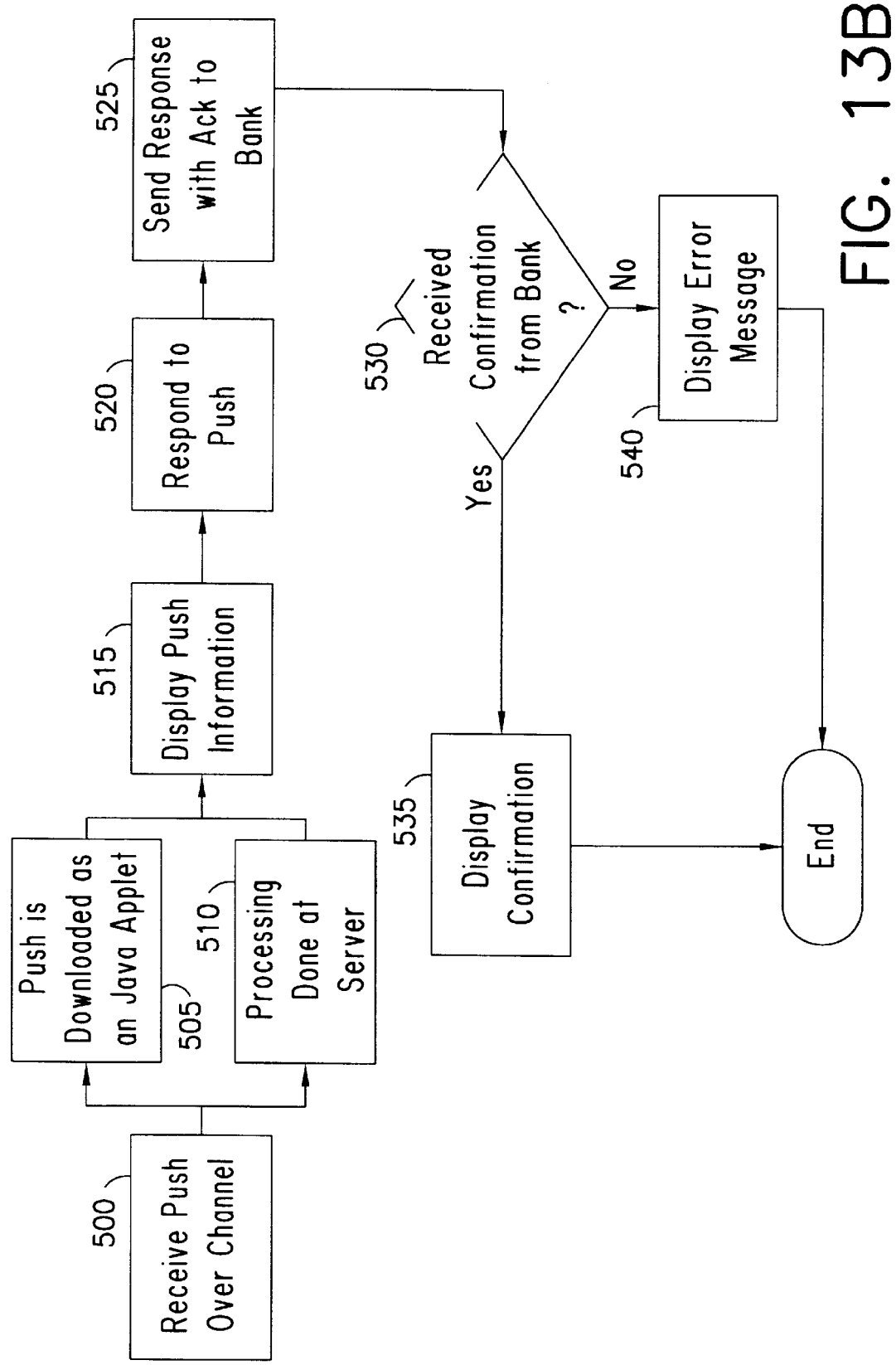
Figure 13C:
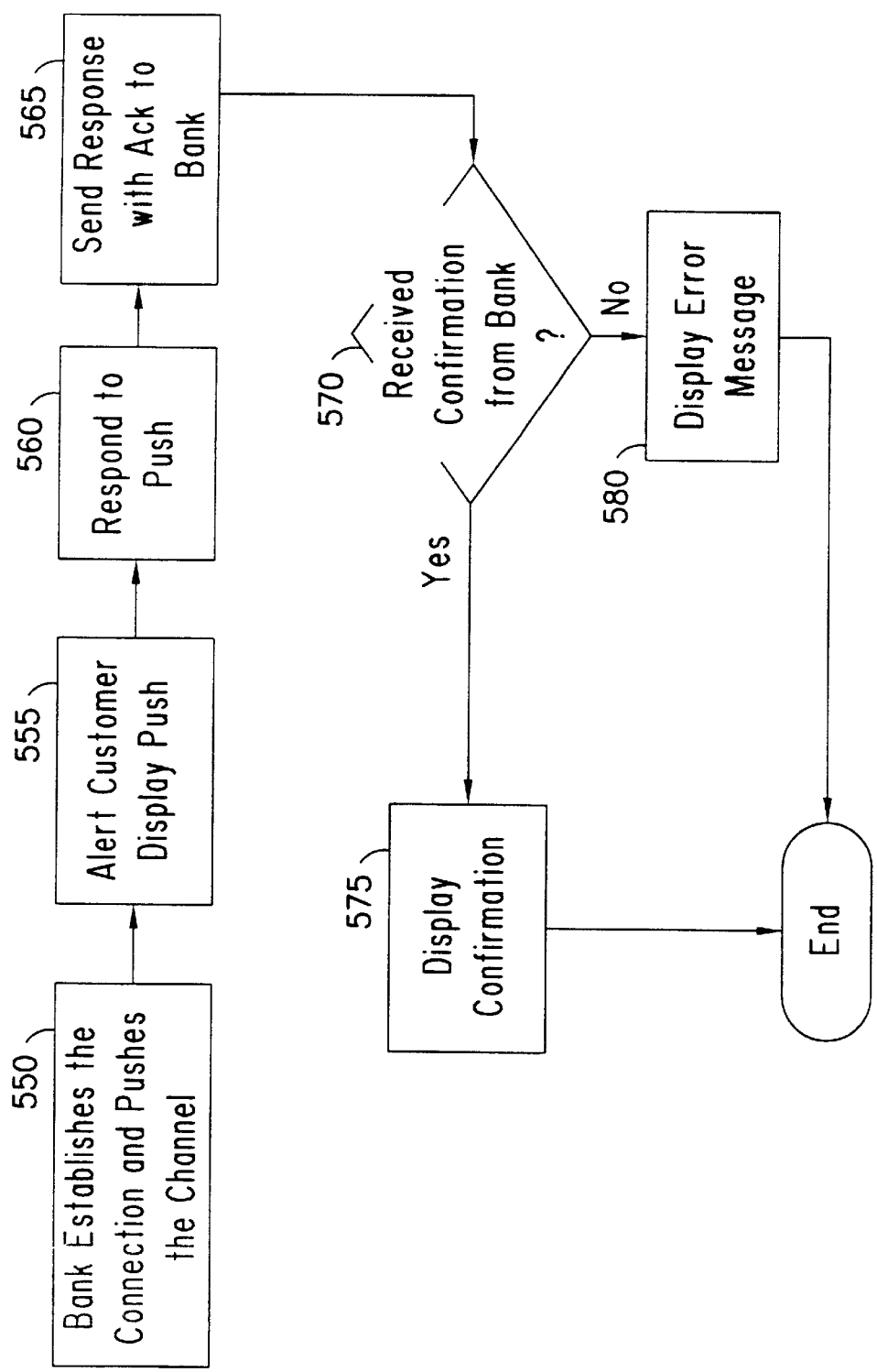
Figure 13D:
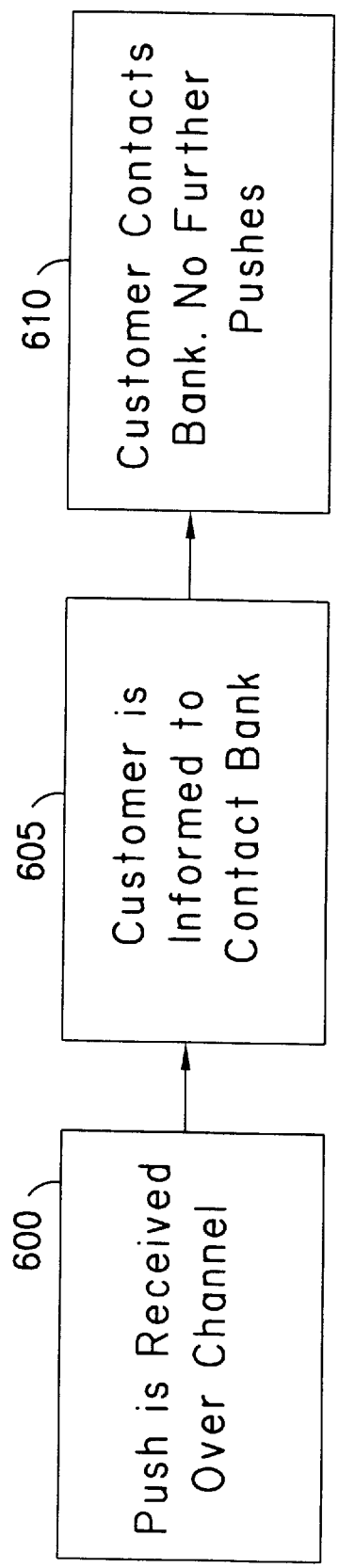

|  | Figure Number |
| --- | --- |
| Customer Receives a Push for Personal Computer or a PDA device | FIGS. 13A-1 and 13A-2 |
| Customer Receives a Push for On-line or dial-in Terminal or a Smartphone | FIG. 13B |
| Customer Receives a Push for a Programmable Pager device, an Interactive Cable TV or interactive satellite cable TV | FIG. 13C |
| Customer Receives a Push via Telephone, Fax, Pager, One-way Cable TV, or One-way Satellite Cable TV | FIG. 13D |

FIGS. 13A–1 and 13A–2 detail the receipt of a Push and the process of responding to it for a Personal Computer or a Personal Digital Assistant (PDA). In this scenario, the Personal Computer can be either a desktop or laptop computer. Assumptions for this scenario are as follows: communication is via Modem or similar device which is active; the protocol is TCP/IP; multiple responses can be processed at one time (for some PDA's, only one response can be processed); only one channel is available (e.g., Internet); dynamically assigned IP for an inactive connection and a statically assigned IP for an active connection; and if an error occurs during this process, the information is resent until either the bank stops the transmission or transmission is successful.

In block 400 of FIG. 13A–1, the Push Dock program, which was previously installed on the customer's Personal computer or PDA and runs in the background, monitors the channel for incoming information. If the program detects a Push, then the process proceeds to block 405, otherwise it keeps monitoring the channel. A Push is identified by the proper header. For example, the system could detect an incoming Push by monitoring incoming e-mails for the proper combination of a return e-mail address and Subject.

In decision block 410, the program and the incoming Push mutually validate each other as per the ANSI security standards. If there is no validation of security of the Push, the invalid Push and the corresponding error code is sent back to the bank for processing in block 415.

Once the Push and Dock are determined to be valid (i.e. mutually authenticate one another), they are bound in block 420 (i.e., combined to form the message and the active process). Binding the Push and Dock adds another level of security to the present invention, since it requires both a valid Channel and Dock.

In block 425, the customer is alerted to the Push and decides if he/she wants to view or ignore the Push in decision block 430. If the customer ignores the Push, the process continues to step 455 after the response is sent with an acknowledgment code (NO out of block 430).

If customer elects to view the Push (YES out of block 430), the customer authentication process is initiated in decision block 435, requiring the customer to enter a PIN or password. If this process is successful (YES out of block 435), a "Customer Received" acknowledgment is sent back to the bank in block 440. If the Customer fails after three attempts to enter the correct password (NO out of block 435), then a "1-800-" customer service number, or the like, the Push's serial number and a message informing of a possible security breach are displayed. The Push Dock disables itself and destroys any local confidential data. All that remains of the Dock is a repeat warning at each subsequent system startup of the possible security breach.

After processing the Push in blocks 436 and 438, the customer chooses a Push Response which is transmitted by the joined Push and Dock programs back to the bank in block 440.

In decision block 445, if the Response by the customer was not received or is incorrect (negative acknowledgment from the bank's server), the system attempts to retransmit the Response in block 450.

If the Response transmission is unsuccessful, then the Dock displays a message to the customer in block 455, including information about alternative methods of responding (e.g. 1-800 like response option). The Response is then temporarily stored for later transmission in block 460.

Once the correct Response Acknowledgment is received from the bank, it is displayed to the customer in block 465. In block 470, the Push is deleted from the customer Dock.

The process depicted in FIG. 13B details the receipt of a Push and the process of responding to it for an on-line or dial-in terminal or a SmartPhone.

Assumptions for this scenario are: customer's online terminal is on a secure network; for a dial-in terminal, the customer must dial-in through modem or similar device to connect to system and it is assumed connection is not secure; for a smartphone, the system calls the customer; if encrypted, the connection is secure, otherwise it is not; the protocol for an online terminal is SNA or any terminal emulation supported protocol for a dial-in terminal; for a dial-in terminal the protocol is TCP/IP; only one response can be processed at a time; only one channel is available; statically assigned IP for an online terminal, dynamically assigned for a dial-in terminal; no persistent storage; the terminal may support Java applications; and if an error occurs during this process, the information is resent until either the Bank stops the transmission or transmission is successful.

In block 500 of FIG. 13B, a Push is received over the channel. If the terminal supports a Java Virtual Machine), then a Java application or applet, or the like such as Active X™ components, is downloaded in block 505 which displays the Push information, as well as processing the customer's responses.

If the terminal does not support a JVM, then in block 510, only the information is displayed and all processing is done at the server.

In block 515, the Push information is displayed to the customer. Message authenticity and client/server mutual authentication are delivered through the underlying security protocols. For a dial-in terminal session, Financial Industry and ANSI Secure Sign On standards are operational during the session. For some channels and/or Docks certain transactions may require agreement from the customer, or may not be available for security reasons.

In block 520, the customer decides to respond to the Push and appropriate responses are displayed.

In block 525, the response and appropriate security codes are then sent to the bank. (Security in this situation can be established by the use of a onetime password or challenge response password device token in the possession of the customer). The response from the customer is then processed on the bank's server and an acknowledgment from the server is sent to the customer.

In decision block 530, it is determined if the appropriate confirmation message was received from the server. A confirmation message is then displayed in block 535, if no problems were found (YES out of block 530). The original Push information is then deleted.

If an error was generated (NO out of block 530), then an error message is displayed in block 540. The original Push information is then deleted.

FIG. 13C details the receipt of a Push and the process of responding to it for a two-way pager, an interactive cable TV set top or an interactive satellite TV. Assumptions for this scenario are: the bank pages the customer; the connection may either be encrypted or non-encrypted; if encrypted the connection is secure; if non-encrypted, the connection is not secure; the only difference between encrypted and non-encrypted transmissions is the content that is transmitted; only one response can be processed at a time; only one channel is available; no persistent storage; and if an error occurs during this process, the information is resent until either the bank stops the transmission or transmission is successful.

In block 550 of FIG. 13C, a Push is received over the channel. The Push information is displayed to the customer in block 555. The Push is assumed to be valid.

The customer responds to the Push in block 560, and the appropriate responses are displayed.

In block 565, the response and appropriate acknowledgment codes are sent to the bank or to a paging company which routes it back to the bank. The response is then processed by the bank's server and an acknowledgment from the server is sent back to the customer.

In decision block 570, the confirmation from the bank's server is evaluated. If no problems are found, a confirmation message is displayed in block 575. The Push is then deleted from the customer's device.

If an error was generated, then an error message is displayed in block 580. The original channel information is then deleted from memory or cache.

A programmable two-way pager, a programmable interactive CATV set top or a programmable interactive satellite TV set top can all follow the PDA model described with respect to FIG. 13A, provided that they have sufficient storage and functionality. Furthermore, a programmable interactive CATV Set Top can follow the PDA model, provided it has sufficient storage and functionality.

FIG. 13D illustrates the receipt of a Push and the process of responding to it for several non-programmable devices such as a phone, a fax, a one-way pager, a one-way cable TV or a one way satellite TV.

The assumptions for this process are: the bank contacts the customer; channels are land-base or cellular phone, fax, pager, one-way interactive cable TV, or one-way interactive satellite cable TV; the customer only has the option of contacting the bank in response to the Push; and, depending on the customer profile, the customer is continually pushed until he/she responds In block 600, a Push is received over one or all of the above channels.

The customer is informed in block 605 to contact the Push Banking department.

The customer then calls Push Banking in block 610 Once Push Banking has been reached, no further transmissions are sent.

A programmable device or one with encryption capability may allow for more detailed Push message content.

FIGS. 14A–14H illustrate several examples of "screen shots" of the various screens as seen by the customer on its devices and as seen by the screen monitoring the PAF Administration Components 66 (FIG. 6A).

Figure 14A:
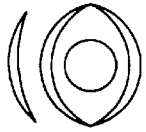

FIG. 14A depicts the delivery of an alert message to a customer using a personal computer. The message indicates to the customer that a Push has been received from the bank.

FIG. 14B depicts a screen on a customer's PC which displays all of the available push messages. The customer will subsequently be provided the appropriate functionality to complete the transaction.

Figure 14C:
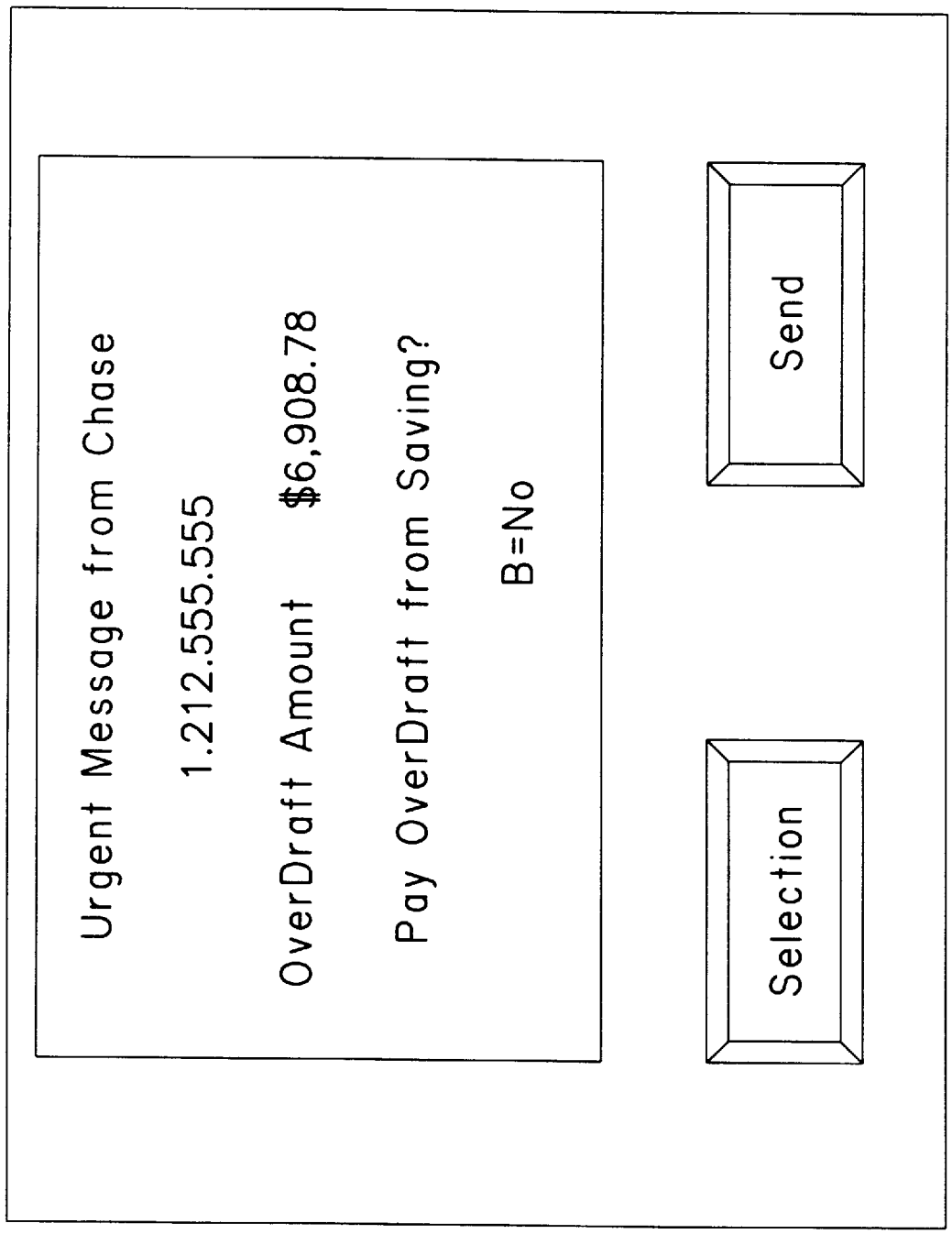

FIG. 14C shows the screen of a customer's two way pager. The pager is displaying a message from the bank. Again, the customer will subsequently be provided with the appropriate facility to respond to the push.

FIG. 14D is an illustration of a customer information screen as displayed by the PAF Administration Component 66 (see FIG. 6A) at the bank's facility. This particular screen, and subsequent screens, are used to capture a customer's profile. (See FIG. 12). FIG. 14E is a PAF Administration Component 66 screen which displays details concerning a particular customer. Similarly, FIG. 14F depicts various account information concerning a customer, while FIG. 14G displays a customer non-financial channel profile.

Figure 14H:
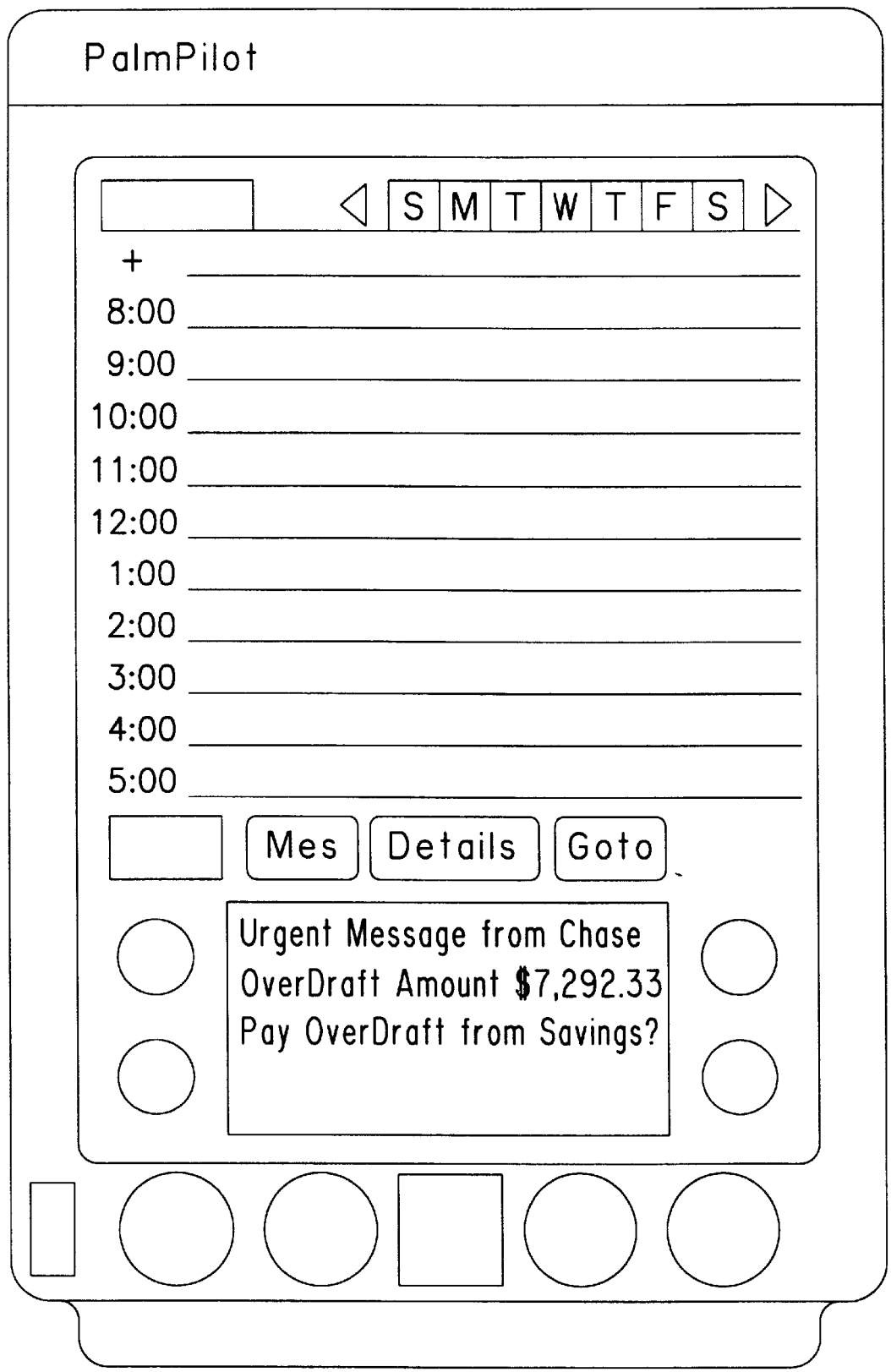

FIG. 14H illustrates a message from the bank being displayed on a U.S. Robotics Palm Pilot. After receiving the message, the customer will have the ability to respond to the message.

This following section discloses some of the real world business situations which benefit from the present invention. Each of the examples below can use the notification and response processes described with respect to FIGS. 13A–13D.

EXAMPLE 1

Early Advising on Trade Fails

The trade purchase and settlement business process entails a number of steps done alternately by the buyer, the seller, and their respective intermediaries. The final step in the process is the receipt of the trade on the settlement date by the custodian. The process has been automated and standardized across most major markets. However, the sheer volume and complexity of trade processing steps results in the failure of a percentage of trades. A trade fail is costly to all parties involved in the trade—the investment manager, the broker and the custodian. When there is no fault in the failed trade, compensation for the days lost may make the investment manager "whole" on an asset basis, but it does not pay for the administrative effort to reconstruct a trade or the opportunity cost loss.

Today, a custodian acts as an information and ultimately a value repository. They are paid to accept, transmit and store information about trades. With respect to trade settlement, their responsibility entails the matching of all of the specifications of the investment manager's trade with the broker. Multiple data fields are required: 1) a CUSIP number; 2) description; 3) currency; 4) rate; 5) counterparty; 6) settlement date, and so on. Today's automated systems will "fail" a trade that does not have a perfect match between information about the trade from the investment manager and the information provided by the broker. Failed trades are not reported until the end of settlement date, after which there is no opportunity for the investment manager to change the outcome.

Using the present invention, each investment manager could set up a profile, by type of security, of essential match characteristics. If these fields match with respect to a particular trade, and other less essential fields did not match, the custodian would notify the investment manager that a trade would potentially fail.

The relevant information about theunmatched trade would be forwarded to the investment manager. This would give the investment manager the opportunity to contact the broker to clarify the discrepancy and resolve the fail prior to close of business on the settlement day.

All parties to the trade transaction would benefit from the early remedy approach. The custodian, the investment manager, and the broker would avoid handling an exception case.

EXAMPLE 2

Credit Card Risk Advising

Today, Credit Card Issuers bear the majority of the risk of lost and fraudulently used credit cards. Consumers are not liable for unauthorized transactions over $50, and merchants are not liable unless they fail to use online authorization systems.

In order to reduce their exposure, many Credit Card Issuers have instituted notification and "stop" procedures. The notification procedure can be helpful to the consumer, but frequently it is implemented in a way that is embarrassing, not useful, or in some instances, actually damaging to the consumer. As a result, there can be a net negative result on the overall customer relationship. In a highly competitive market, this is not a desirable outcome.

In a system employing the present invention, customers could proactively establish notification relationships with the Credit Card Issuer based on a more specific AI type of assessment. The most frequent unwanted notification situation arises when consumers travel on a vacation. This takes them out of their normal geographic spending area and also can increase the frequency of card usage. To remedy this, customers could be offered a "VACATION PROTECT" service. The customer would notify the Credit Card Issuer of their travel plans, and essentially block these locales from the early warning procedure.

Second, Credit Card Issuers could offer expanded notification services. Today, they typically leave voice mail messages on the home phone of customers. To travelers, this is not helpful. A broader array of notification media could remedy this lack of service.

Finally, customers would be allowed to notify the Credit Card Issuers in advance, presumably through an itinerary of certain planned shopping excursions. The customer could choose "Back to School" shopping spree, "Holiday" shopping spree, etc. In this way, a customer could be protected from embarrassing and time wasting interruptions at the shopping center.

With these proactive capabilities in place, the Credit Card Issuer could retain their other fraud protection alerts and activities, since these protections would have a higher probability of signaling detrimental card activity.

EXAMPLE 3

Credit Overrides

Banks maintain credit facilities for corporations and financial institutions. In general, numerous transactions flow through the bank's clients' accounts during the day. Although the bank would prefer that all credits would arrive during the earlier part of the day, and debits would be executed during the later part of the day, this isn't how the real world works. What the bank tries to do is to essentially control the flow of funds. The bank executes as many payments as possible within the allowable intraday and overdraft facilities. As the end of day approaches, and debits are held up and credits aren't in the bank, it becomes imperative for the bank to contact its customers. Today the bank calls its customers. This occurs either through the sales force or the client executive. Hopefully, the bank reaches the customer, and depending on the circumstances, the customer wires additional funds or advises the bank of other transactions that are in the process of being executed. Sometimes, the Bank can't reach the customer and payments aren't executed.

The present invention allows the bank to go on a relentless search of the customer. First to contact it, then to receive a reply. Push Banking creates new improved methods of funds control and cost savings.

EXAMPLE 4

Fraud Control

Checks that have suspicious signatures are called into a client's bank for approval. The window for acceptance of the signature is quite short. If a customer can be contacted with information or even an image of the check, the issue may be resolved immediately. The present invention allows such immediate contact and response. A certified authorization to pay the check may or may not be issued by the customer once contacted.

EXAMPLE 5

Controlled Disbursement

Today, a bank advises its customers via phone and PC of the amount of money they need to fund their controlled disbursement account. Many times the calls go unanswered and the funds notifications do not occur. Using the present invention, various methods as described herein can be activated until the bank reaches the customer and notification occurs.

EXAMPLE 6

Unanticipated Deposits

Occasionally large deposits arrive late in the day. If customers are fortunate and happen to be logged onto one of the bank's same day facilities they will be able to invest the funds in the overnight market. More likely, the customer will not be able to execute the transaction.

Using the present invention, the bank is able to notify and receive instructions from the customer and invest the funds per customer's instructions.

EXAMPLE 7

FX Decisions

Bank customers may want to wait for a FX rate before executing an FX transaction. The customer creates the transaction on the bank's FX system and puts in a wait order for a rate.

By using the present invention, the customer would get notified of the rate and be able to send an instruction to execute the transaction with the preferred rate the customer has selected.

EXAMPLE 8

Advising (Including Advise to Receive)

Sometimes a customer receives significant value into its account, either in one large receipt, or from the accumulation of several credits, perhaps unexpectedly. The customer may wish to do something with the funds, including investing, paying down a debt or paying off a vendor.

A second case could include the receipt of a credit that might also mean that a major collection concern is now completed, and the customer can focus on other things (or call off litigation, or inform/thank his counterparty that the funds have been received).

The present invention enables each customer to establish a global profile (covering all accounts, world-wide). The profile can include a size-driven threshold for customer notifications and can in concept bridge accounts, even banking domiciles. One record per customer (or account) can be established for the notification of large single credits or cumulative credits which can have value information and keywords about the remitter and/or the remittance. The customer can enter an exact amount or a value range, and provide some key words to look for. These records would last for a set period of time, perhaps established by the customer when he sets up the keywords. Keywords can be added using the bank's existing cash management electronic banking system.

These records could be part of the advising process, which resides on the back end of the real time posting system. Each of the advising systems around the world would, as part of the advising process, determine if the customer was set up for special handling (i.e., an advice), in which case, the appropriate message would get sent by the Push Banking engine of the present invention.

EXAMPLE 9

Changes in Market Conditions

Some bank customers are exposed in currencies and countries to changes in market conditions, e.g. rapidly evolving conditions in Asia. The bank using a global balance monitoring system, which tracks on a real time basis, positions by currency and domicile. As changes occur in market conditions in a country or currency, customers with significant exposure could have their positions become at risk. The only issue really is what constitutes the appropriate conditions (such as civil war, a terrorist attack, market fluctuations, etc.)

In the present invention, customer profiles are created as part of the Push Banking System. Each time a major event happened, the news service (including currency movements) would feed the Push Banking System, which would seek out customers with country/currency exposure above levels indicated in their profile (established by each customer, either at an account level, or across accounts). A message would be sent by the "Push Banking" engine advising the customer of the situation/exposure.

EXAMPLE 10

Corporate Actions

Corporate customers as well as Private Banking customers hold investment positions that may require attention from time to time. The most significant event is response to a tender offer to buy, convert debt into equity or merge. There are other events of lesser import such as the annual proxy statement.

Custodians that fail to notify their customers of these events subject themselves to legal liability, particularly if an opportunity is "first-come, first-serve" (e.g. tender for a portion of the outstanding shares).

This could be extended to reflect significant movement in the value of positions on a percentage basis (but the movement must be greater than a minimum value, say two points, otherwise every fluctuation would generate excessive customer notifications).

In operation of the present invention, each time a news event hits, or each time the stock moves significantly a certain percent, the positions data base will be searched, and affected customers identified. The Push Banking engine of the present invention would search for the customer profile, and trigger the appropriate message to sent to the customer for his/her action.

The Push Active Filter Decision Component 62 is responsible for processing information relating to all clients which are part of the PAF30 system. The processing covers all accounts for those clients, as well as other information of importance to the client that becomes known to the PAFDC 62. The PAFDC 62 must assimilate this information and send appropriate messages to the client via the PAFCC 64. In the event that there are too many clients for one physical processor, the list of clients may be split into as many lists as necessary to reach a list size that a processor can cycle through in the time compatible with a promised level of service. Each list would then be processed by its own processor. If processors of different capabilities are to be used, the lists can be sized accordingly, since the system places no requirement for uniform size. The clients in separate lists must not require any consideration of interrelationships. When there is a requirement for considering interrelationships between clients, the interrelated clients are treated as an independent group appearing in one of the lists. The PAFDC 62 process is organized as shown schematically in FIG. 15.

The following section, describing the flowcharts in FIGS. 15–19, 20A, 20B, 20C and 21, relates to an example of the PAFDC 62.

Figure 15:
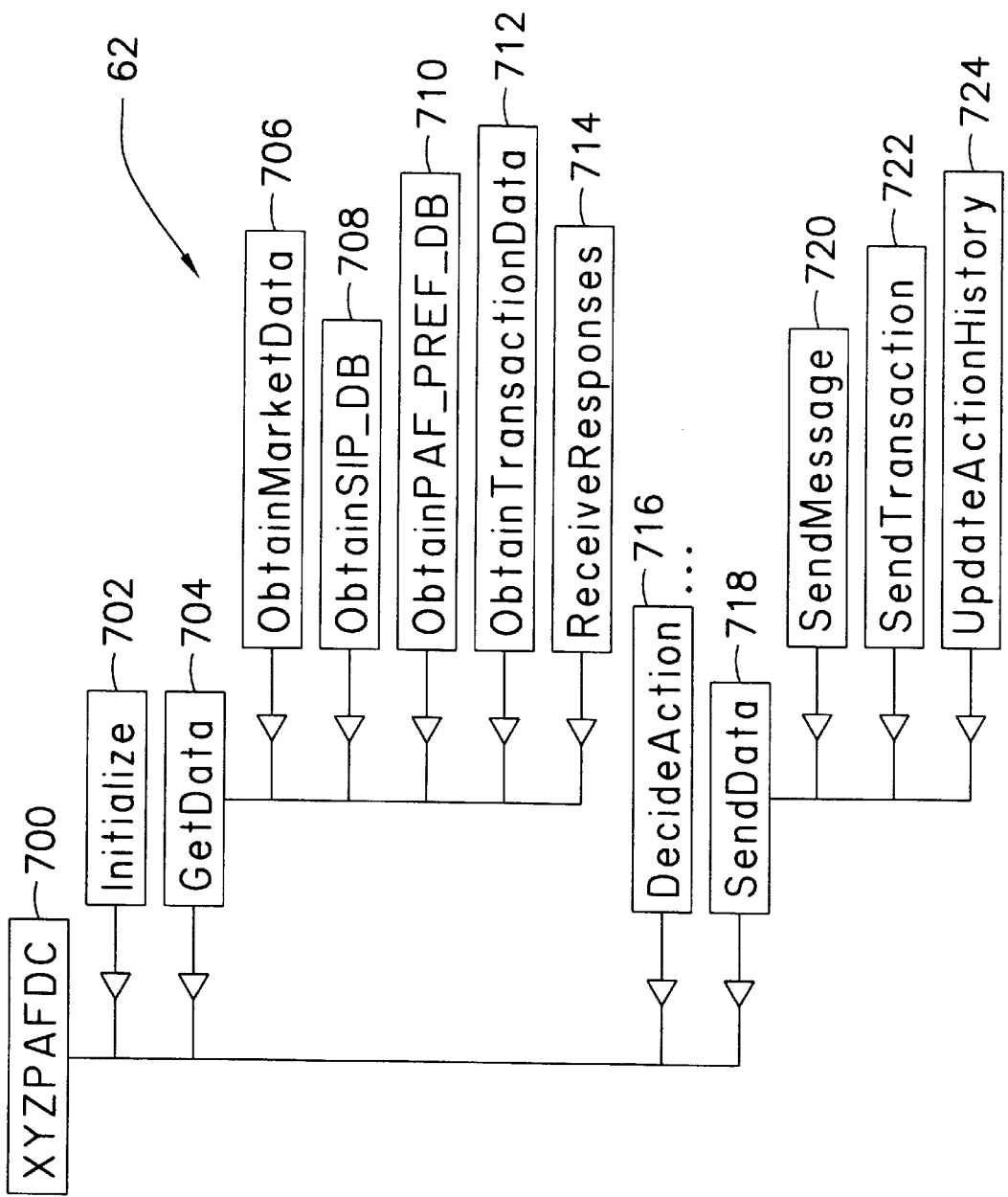

As shown in FIG. 15, the main task XYZDC 700 of the PAFDC 62 has four subtasks: Initialization 702, GetData 704, DecideAction 716, and SendData 718. Initialization 702 runs prior to each scan of all clients assigned to the PAFDC 62. The other three subtasks are contained in a loop that cycles through once for each client or related group of clients. The subtasks GetData 704 and SendData 718 have their subtasks shown in FIG. 15.

Figure 16:
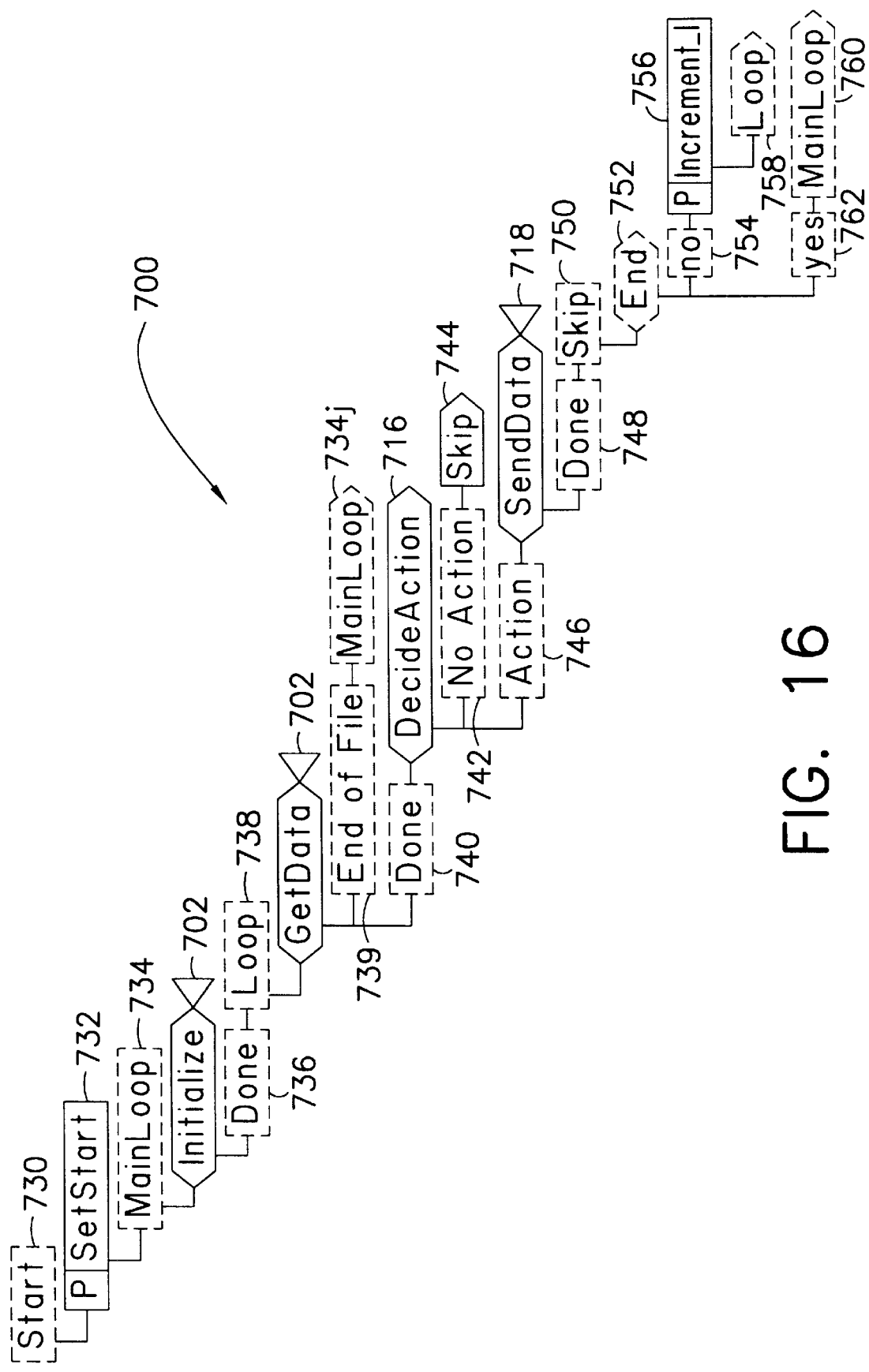

The main task 700 of the PAFDC 62 is expanded in FIG. 16 illustrating the flow of actions in the preferred embodiment.

Start 730 is a label indicating the beginning point of the process which flows from there to procedure SetStart 732.

SetStart initializes variables that must be set when the process first starts. In particular, start flags are set that are reset by processes that need to be informed when the first pass is made. MainLoop 734 is a label used by the process for reentry on looping after completely processing all the clients to repeat all the processing. Done 736 is the normal outcome path of task Initialize 702. Loop 738 is a label used by the process for reentry on looping for each client or client group. Task GetData 704 obtains all the data on a client or client group needed to decide if a notification is required.

Done 740 is the normal outcome path of the task 704, however if the end of file is encountered, the path End of File 739 is followed going to the MainLoop 734j; jump directive that brings the flow back to label MainLoop 734. Normal flow from Done 740 proceeds to task DecideAction 716 which examines all the data for the client and determines if a message should be sent and what the message content should be. If no notice is required, the flow proceeds via outcome No Action 742 to jump directive Skip 744, which brings the flow to Skip 750 label. If a message has to be sent to the PAFCC 64 (FIG. 6C) for conveyance to the client or as a special instruction to the PAFCC 64, or a transaction has to be initiated, flow proceeds via outcome Action 746 to task SendData 718. SendData 718 transmits the message, if any, to the PAFCC 64, initiates a transaction if needed, and stores the activity in a historical file. Flow then continues from outcome Done 748 to label Skip 750 from which a decision is made on variable End 752 to direct flow via value no 754 to procedure Increment_I 756 or via value yes 762 to MainLoop 760 jump directive that brings the flow back to label MainLoop 734, the latter path signifying the completion of processing of the client list and time to repeat the process, forming an endless loop. Increment_I 756 adds one to the value of variable I that serves as the index for accessing client data in the client list. Flow then proceeds via Loop 758 jump directive that brings the flow back to label Loop 738 to process the next client in the list.

The flow of processing in task Initialize 702 is shown in FIG. 17.

Processing in this task sets the default starting values for the client loop processing that begins with label Loop 738 (see FIG. 16). The task also enables operating personnel to interpose process modifications if desired. Procedure InitSystem 770 sets the default values for processing. FileSelect 772 is a process that provides a graphical interface computer display to the operating personnel, enabling them to alter the processing if desired. The process modifies the default values, if changed by the personnel, but does not interrupt the processing unless directed by the personnel. Procedure InitSystem2 774 then uses these default values to initialize all variables to begin the client processing loop. Flow then passes to outcome Done 736 of task Initialize 702.

Figure 18:
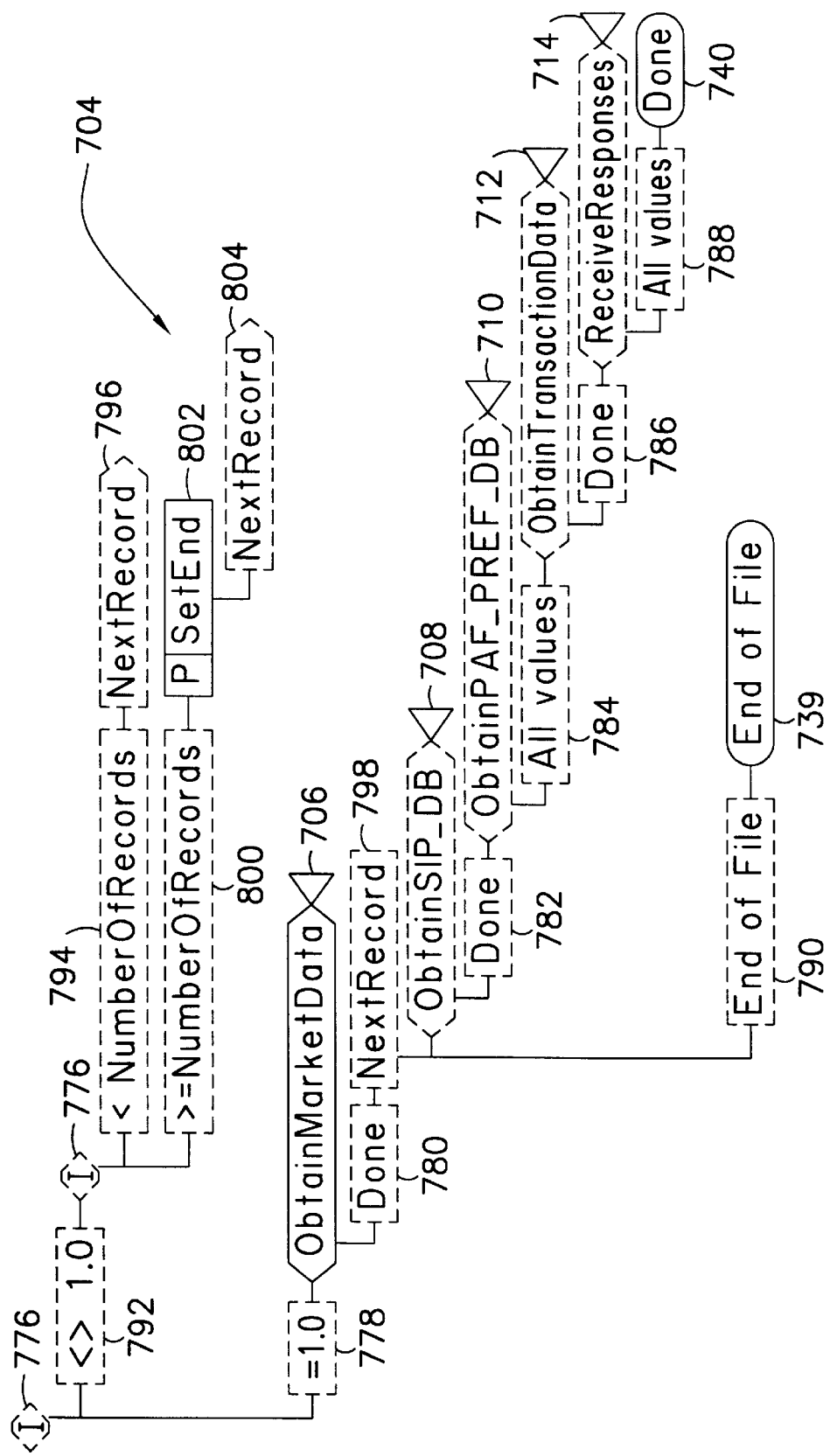

The flow of processing in task GetData 704 is shown in FIG. 18. Task GetData 704 performs the function of PAFDC Situation Monitor 68 described in connection with FIG. 6B.

The GetData process 704 obtains external data that is generally applicable to all the clients prior to starting the list of clients and thereafter just obtains client specific data. As seen in FIG. 18, the process begins by checking the value of index variable I 776. Each time the client list processing loop is started, InitSystem2 774 (see FIG. 17) sets I to 1 and flow proceeds along value path=1.0 778 to task ObtainMarketData 706. This task reads data from all sources external to the institution employing the PAFDC-PAFCC pair that may have an effect on the decisions to be made by the PAFDC 62 on all clients. Flow then proceeds via outcome Done 780 to label NextRecord 798 and then on to task ObtainSIP DB 708. Task ObtainSIP_DB 708 reads in all traditional data available internally in the institution on one client selected by the index variable I 776. Flow normally proceeds via outcome path Done 782 to task ObtainPAF_PREF_DB 710 which reads in the profile set up by the client (also selected by I) describing what accounts are to produce notifications, how those notifications are to be triggered (notification criteria), and any special notification instructions. ObtainPAF_PREF_DB 710 makes preliminary recommendations about notifications. Flow then proceeds via outcome All values 784 to task ObtainTransactionData 712 which reads in responses to any transactions for the client initiated by the PAFDC 62 at an earlier time if any are pending for the client. Flow then proceeds via outcome Done 786 to task ReceiveResponses 714 which reads in any responses received via the PAFCC 64 from the client or generated by the PAFCC 64 (the PAFCC may send a response indicating it did not receive a response within the allotted time and has cleaned the pending messages out of all channels). Flow then proceeds via outcome All values 788 to outcome Done 740 of task GetData 704. If task ObtainSIP_DB 708 reads an end of file indication then the abnormal outcome End of File 790 path is followed to task GetData 704 outcome End of File 739.

If the value of index variable I 776 is not equal to 1.0, then flow proceeds via path<>1.0 792 to a second check on the value of index I 776. If the value of index I is less than the NumberOfRecords, a variable equal to the number of client records to process set by InitSystem2 774, then the flow proceeds via path<NumberOfRecords 794 to jump directive NextRecord 796, which brings the flow to the NextRecord 798 label. If the value of index I equals or exceeds the NumberOfRecords value, then the flow proceeds via path>=NumberOfRecords 800 to procedure SetEnd 802. SetEnd 802 assigns variable End 752 (see FIG. 16) to yes. Flow then proceeds to jump directive NextRecord 804, which brings the flow to the NextRecord 798 label.

The flow of processing in task DecideAction 716 is expanded in FIG. 19. Task Decide Action 716 performs the functions of the PAFDC Decision Maker 69 and the PAFDC Prioritizer 71 (see FIG. 6B).

This task is responsible for taking into consideration all the current data obtained on a client in conjunction with the past actions taken. This is accomplished by breaking the decision process into steps. The first step is to examine the responses received, if any. FlagR 810 is set to a value of 1.0 by the ReceiveResponses 714 task if a response is received for the client. If FlagR is not equal to 810 the process flow follows path<>1.0 812 to jump directive Skip 814, which brings the flow to the Skip 816 label. If FlagR 810 equals 1.0 the process flow follows path=1.0 818 to task ProcessResponses 820. ProcessResponses 820 provides any special processing needed to organize the response data for making decisions. Process flow then proceeds via outcome path All values 821 and label Skip 816 to task DecideRecommendation 822. DecideRecommendation 822 reads in the prior actions still pending for the client and further processes the client data to improve on the preliminary recommendations made by ObtainPAF_PREF_DB 710 (see FIG. 18) if needed. Process flow then proceeds via outcome path NoAction 824 to task outcome No Action 742 (see FIG. 16) if no notification to the client or instruction to the PAFCC 64 is required in consideration of the market data, client profile, responses from the client or PAFCC 64, transaction responses, and pending prior actions.

When task DecideRecommendation 822 finds there is information that must be considered, process flow proceeds via outcome path Action 826 to task CheckOldActions 828, which makes a comprehensive assessment of all the data on the client for each account of the client for which data is present.

Figure 20A:
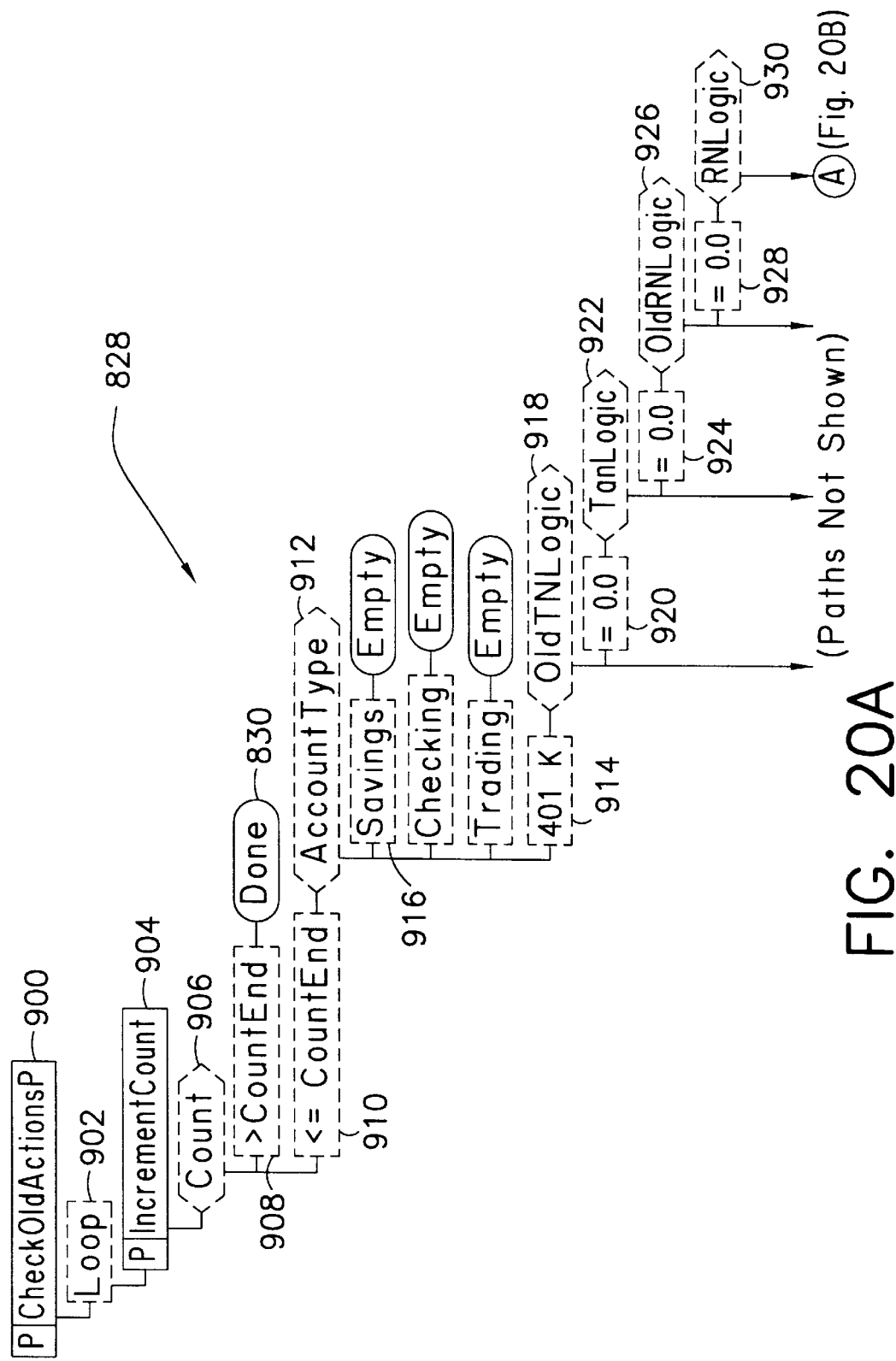
Figure 20B:
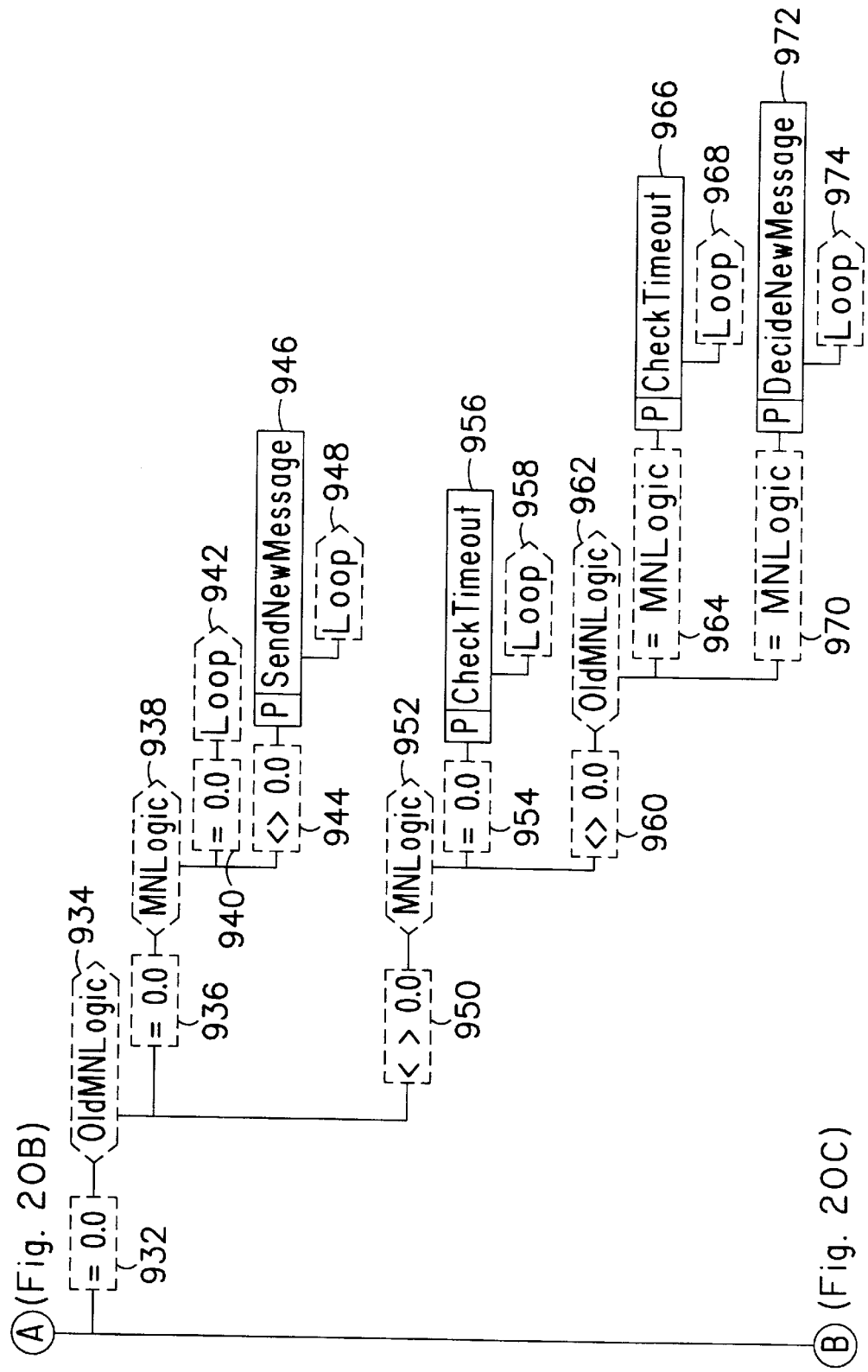
Figure 20C:
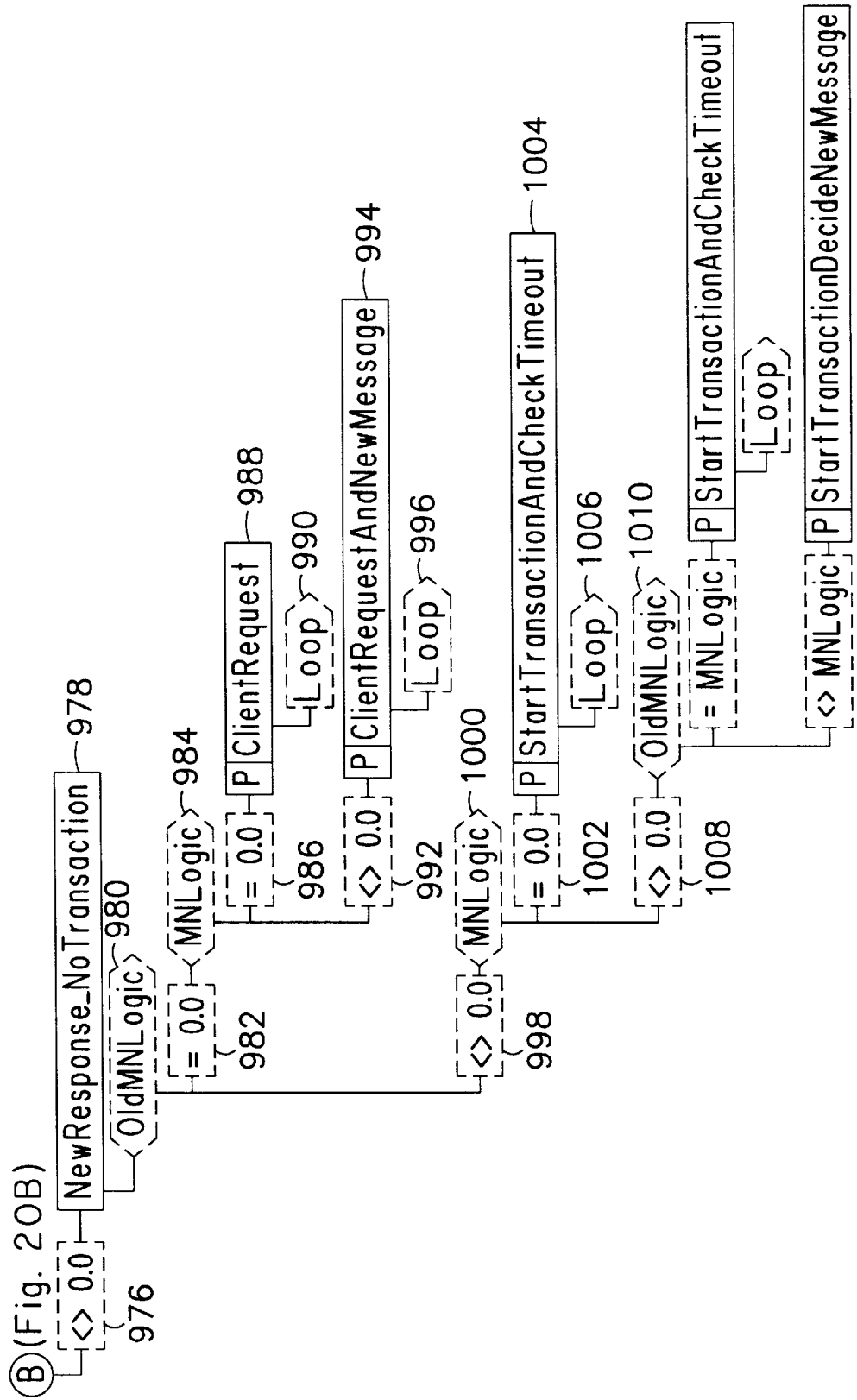
Figure 21:
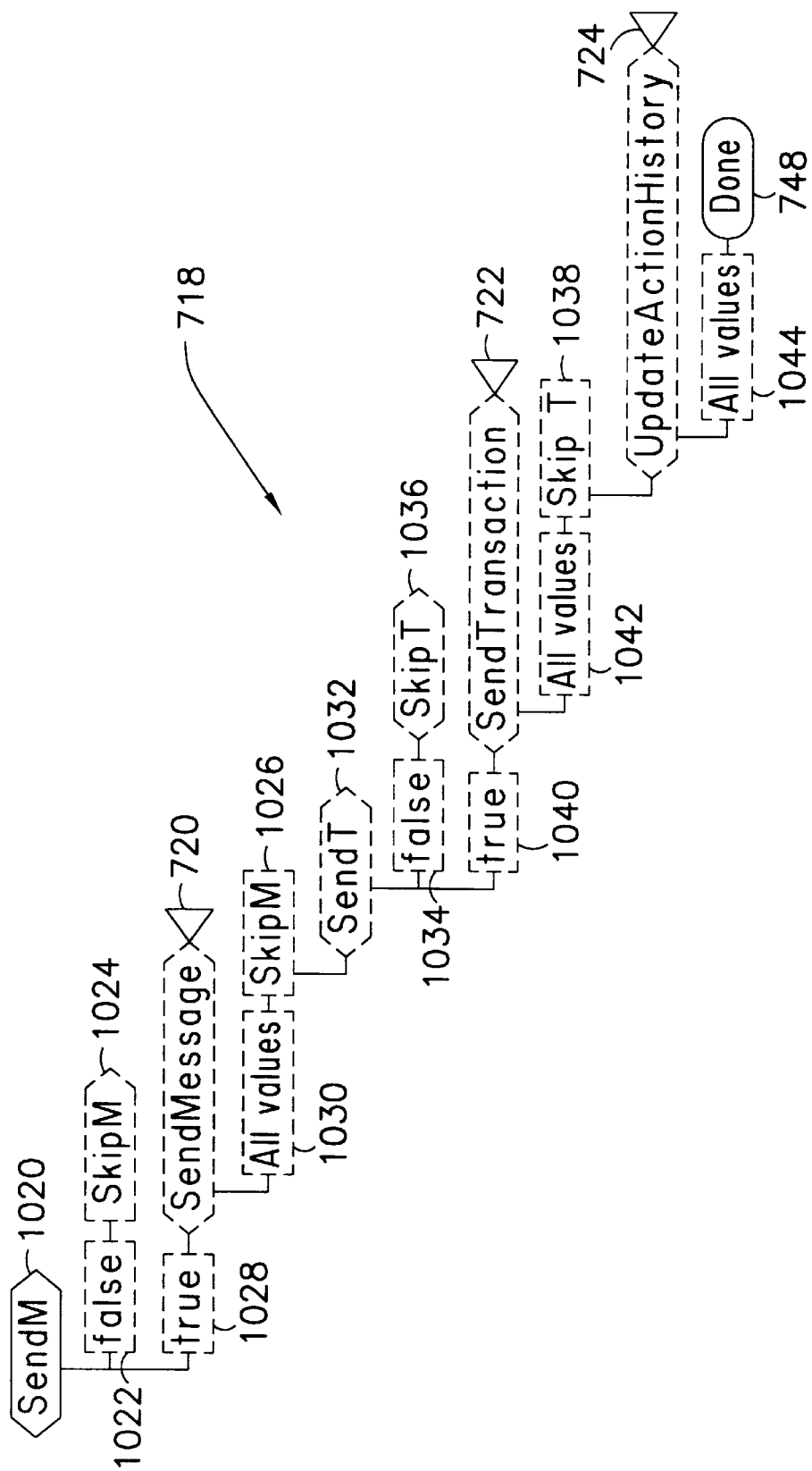

An example of a portion of the logic of task CheckOldActions 828 is shown in FIGS. 20A through 20C.

Procedure CheckOldActionsP 900 in FIG. 20A initializes variables for the decision loop of task 828. Process flow then proceeds to label Loop 902 and then to procedure IncrementCount 904 which loads the variable AccountType with the next account type to be processed for that client, loads the variables to be tested, and adds one to the loop counter Count 906 which is tested against the value of variable CountEnd. When Count becomes greater than CountEnd, processing is complete and processing flow passes via path>CountEnd 908 to outcome Done 830 of task CheckOldActions 828. Otherwise processing flow passes via path<=CountEnd 910 to test variable AccountType 912. Processing then flows out one of the paths provided by AccountType 912 such as 401 K 914 or Savings 916 to a decision logic tree tailored to that type of account, a portion of which is shown for the 401 K type. The other account types (e.g. Savings 916) have similar logic associates with them.

The first variable tested in the 401 K tree is OldTNLogic 918 which contains a code representing the type of transaction that had been previously initiated and for which the PAFDC 62 is expecting an acknowledgment (it should be noted that string values could be used instead of the numeric values shown, depending on the nature of the information). In this example 0 represents no transaction had been initiated for which an acknowledgment is expected. If the value of OldTNLogic 918 is 0, then processing flow passes via path=0.0 920 to test variable TANLogic 922 which represents the transaction acknowledgment. TANLogic 922 has a value of 0 when no acknowledgment is received. If TANLogic 922 has a 0 value processing flow proceeds via path=0.0 924 to test variable OldRNLogic 926 which contains a code representing the type of response that had been previously received and for which the PAFDC 62 has not completed processing. In this example 0 represents no prior response is pending completion. If the value of OldRNLogic 926 is 0, then processing flow passes via path=0.0 928 to test variable RNLogic 930 which represents a response just received. RNLogic has a value of 0 when no response has been received. If RNLogic has a 0 value processing flow proceeds via path=0.0 932 on FIG. 20B, to test variable OldMNLogic 934 which contains a code representing the type of message that had been previously sent and for which the PAFDC 62 has not completed processing.

In this example 0 represents no prior message is pending completion. If the value of OldMNLogic 934 is 0, then processing flow passes via path=0.0 936 to test variable MNLogic 938 which represents a message recommended to be sent. MNLogic 938 has a value of 0 when no message is recommended. If MNLogic 938 has a 0 value processing flow proceeds via path=0.0 940 to jump directive Loop 942, which brings the flow to the Loop 902 (see FIG. 20A) label to process the next account to be processed for the client. If MNLogic 938 has a non-zero value processing flow proceeds via path<>0.0 944 to procedure SendNewMessage 946 which places the recommended message into a list of messages to be sent. Processing then proceeds to jump directive Loop 948, which brings the flow to the Loop 902 (see FIG. 20A) label to process the next account to be processed for the client.

If the value of OldMNLogic 934 is not 0, then processing flow passes vi a path<>0.0 950 to test variable MNLogic 952. If MNLogic 952 has a 0 value processing flow proceeds via path=0.0 954 to procedure CheckTimeout 956 which determines if a response is overdue. The PAFCC 64 should clean up this message and send a response to the PAFDC 62 confirming its action, therefore if an excessive time has passed this procedure places an instruction into the list of messages to be sent to the PAFCC 64 to correct this error condition. Processing then proceeds to jump directive Loop 958, which brings the flow to the Loop 902 (see FIG. 20A) label to process the next account to be processed for the client. If MNLogic has a non-zero value processing flow proceeds via path<>0.0 960 to test variable OldMNLogic 962. If OldMNLogic 962 equals the value of MNLogic processing, no new message has to be sent, therefore flow proceeds via path=MNLogic 964 to procedure CheckTimeout 966 which has been described at 956. Processing then proceeds to jump directive Loop 968, which brings the flow to the Loop 902 (see FIG. 20A) label to process the next account to be processed for the client. If OldMNLogic 962 does not equal the value of MNLogic processing flow proceeds via path<>MNLogic 970 to procedure DecideNewMessage 972 which places the recommended message or a modified message into the list of messages to be sent, depending on the relationship of the new message to the old (For example the prior message may have advised that an account would be overdrawn if $1000 weren't immediately transferred to it. New information indicating that now $2000 would have to be transferred into the account would produce a message to that effect.). Processing then proceeds to jump directive Loop 974, which brings the flow to the Loop 902 (FIG. 20A) label to process the next account to be processed for the client.

If RNLogic 930 (see FIG. 20A) is not equal to 0, then a new response has been received (since OldRNLogic=0), and processing flow proceeds via path<>0.0 976 (see FIG. 20C) and label NewResponse_NoTransaction 978 to test variable OldMNLogic 980.

If the value of OldMNLogic 980 is 0, we can conclude that this response is not related to a pending message, and processing flow passes via path=0.0 982 to test variable MNLogic 984. If MNLogic has a 0 value, no new notice message is recommended, so processing flow proceeds via path=0.0 986 to procedure ClientRequest 988. The procedure determines if the PAFCC 64 has generated the response, or the client has initiated a request and acts accordingly by initiating a transaction, message, and/or update of its state information. Processing then proceeds to jump directive Loop 990, which brings the flow to the Loop 902 (see FIG. 20A) label to process the next account to be processed for the client. If MNLogic 984 has a non-zero value processing flow proceeds via path<>0.0 992 to procedure ClientRequestAndNewMessage 994 which, in addition to performing actions similar to those done by ClientRequest 988, must consider the new notice message content in formulating its action. Processing then proceeds to jump directive Loop 996, which brings the flow to the Loop 902 (see FIG. 20A) label to process the next account to be processed for the client.

If the value of OldMNLogic 980 is not 0, then processing flow passes via path<>0.0 998 to test variable MNLogic 1000. If MNLogic 1000 has a 0 value processing flow proceeds via path=0.0 1002 to procedure StartTransactionAndCheckTimeout 1004 which verifies that the response is timely and relates to the pending message that had been sent (OldMNLogic 980<>0). Then depending on whether the response indicates a PAFCC 64 instruction, client initiated request, late response, or timely response to the message sent, the procedure provides the appropriate action, such as initiating the transaction solicited by the message sent. Processing then proceeds to jump directive Loop 1006, which brings the flow to the Loop 902 (see FIG. 20A) label to process the next account to be processed for the client. If MNLogic 1000 has a non-zero value processing flow proceeds via path<>0.0 1008 to test variable OldMNLogic 1010. Processing now proceeds in similar manner as described above at OldMNLogic 962 (see FIG. 20B) only now taking into account the fact that a response has been received (RNLogic 930<>0). First it must be verified that the response doesn't indicate a PAFCC 64 instruction or client initiated request, Next if not a late response, then a transaction most likely should be initiated.

In similar manner the paths for OldTNLogic 918 (see FIG. 20A), TANLogic 922 (see FIG. 20A), and OldRNLogic 926 (see FIG. 20A) are processed for all possible combinations. Likewise, other account types such as Savings 916 (see FIG. 20A) has its own logic tree for processing clients with actions appropriate to that type of account. When all accounts for a client have been individually processed without regard for interactions between accounts, processing exits task CheckOldActions 828 via path Done 830 and proceeds to task CheckCommonality 832 on FIG. 19. CheckCommonality 832 uses a similar tree structured logic to examine the interrelationships of multiple transactions, responses, and messages within and between accounts for the client if more than one are currently being processed. Where conflicts are discovered, they are resolved via predefined business rules and the transactions and messages modified accordingly.

Processing then proceeds via path Done 834 to task StoreActions 836 which places the results in non-volatile memory. Processing then proceeds via path Done 838 to outcome Action 746 (see FIG. 16) of task DecideAction 716. When processing proceeds along path Action 746 to task SendData 718, we go to FIG. 21 to see the steps within that task. The task SendData 718 performs the function of the PAFDC Push Package 70 described with respect to FIG. 6B.

Variable SendM 1020 is set true in task DecideAction 716 if a message is to be sent, otherwise it is set to false. If SendM's value is false, processing proceeds via path false 1022 to jump directive SkipM 1024, which brings the flow to the SkipM 1026 label. If SendM's 1020 value is true, processing proceeds via path true 1028 to task SendMessage 720 which queues up the messages to be sent to the PAFCC 64. Processing then proceeds via path All values 1030 and label SkipM 1026 to test the value of variable SendT 1032 whose value is also set in task DecideAction 716. If no transactions are to be initiated, SendT will be false and processing proceeds via path false 1034 to jump directive SkipT 1036, which brings the flow to the SkipT 1038 label. If SendT's value is true, processing proceeds via path true 1040 to task SendTransaction 722 which initiates the transactions determined by DecideAction 716. Processing then proceeds via path All values 1042 and label SkipT 1038 to task UpdateActionHistory 724 which stores all actions taken in non-volatile memory. Standard transaction processing (as known in the art) is used throughout, so that if any processing can not be completed, the process is rolled back so that an accurate record of the current state is always known. Processing then proceeds via path All values 1044 to outcome Done 748 (see FIG. 16) of task SendData 718.

Although the preferred embodiment as described uses scanning of the list of subscribers at prescribed intervals, it is appreciated that asynchronous event triggering and asynchronous scanning of subscribing clients is equally included within this invention. Likewise the separation of deciding on each account separately for notifications and then reviewing those notifications collectively to remove conflicts, ambiguity, or any other nuance that produces a less than desired effect, rather than combining these operations does not limit the scope of this invention. Sending all notifications generated up to the time of an interrupting immediate notice requirement is also just a variation on implementation. It is within the scope of the invention to send just the interrupting notice with or without any generated notices for that client, and then continue the normal processing.

Communications Components, decision making components and caches are applicable at many points in the overall PAF 30 system. Combining these discrete functional units into component-like units may provide some benefits. This section discusses and expands upon this concept.

Figure 22:
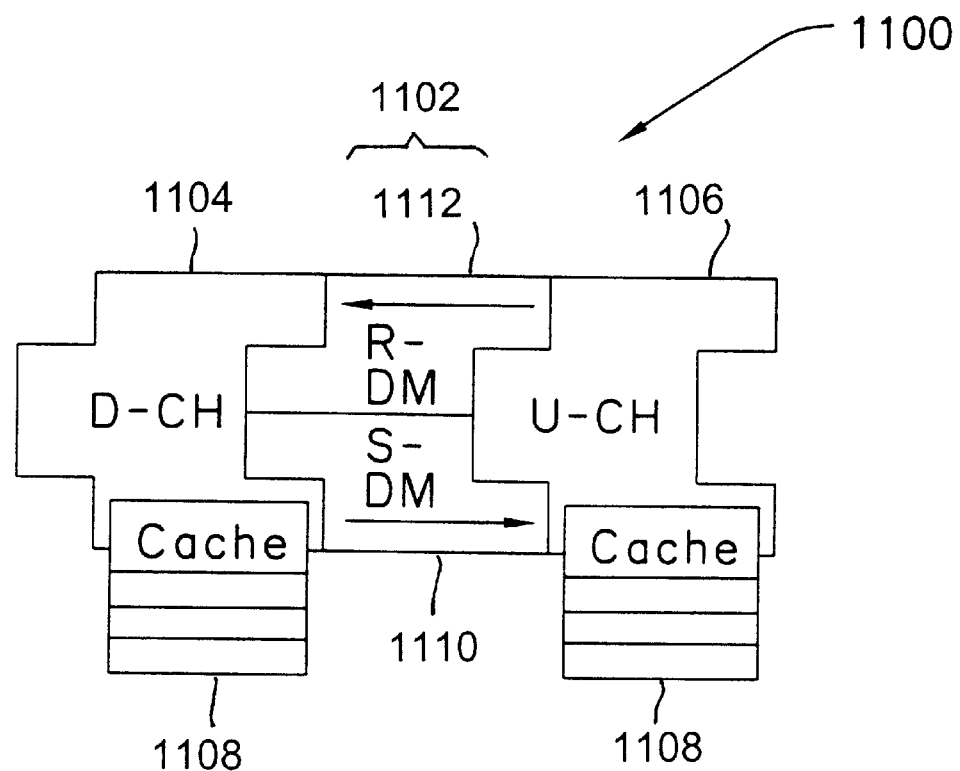
FIG. 22 illustrates a Communications, Decision Making & Caching Component.

FIG. 22 depicts a Communications, Decision Making & Caching Component 1100, or CDMC. A CDMC 1100 is composed of a logical decision component 1102 surrounded by communications handlers 1104, 1106, and caches 1108.

The logical decision making component 1102 is divided into a Sending Decision Maker 1110 (S-DM) and a Receiving Decision Maker 1112 (R-DM). The S-DM 1110 is responsible for sending data to other CDMCs 1100 and the R-DM 1112 is responsible for receiving data from other CDMCs 1100. ("Data" is used loosely here to encompass business data as well as updates to information used by CDMC's 1100 upon which they make decisions, and various kinds of profile information).

A decision making component—S-DM 1110 or R-DM 1112—is intended to make decisions appropriate to its context in the "CDMC network" and may rely on a variety of technical implementations to make these decisions. For example, an S-DM 1110 might use a database trigger and embedded SQL logic and/or external rules contained in another database to determine if "interesting" data has been updated, inserted or deleted from the database it monitors. R-DM's 1112 might be responsible for distributing updates to databases based on destination. An S-DM 1110 responsible for deciding over what channel to send an Push would read customer profiles. An S-DM 1110 responsible for evaluating and reconciling customer interest profiles and potentially Pushable data might employ an AI engine.

Caches 1108 are provided for caching of items intended to be sent in either direction. (Caches 1108 are depicted in FIGS. 22 as associated with communications components in order to illustrate that 1) they need not be physically attached to the CDMC 1100 as well as 2) they need not be totally external to the CDMC 1100).

CDMCs 1100 are intended to be connected by various means. For example, CDMCs 1100 can be connected to each other on an internal network, to data sources such as 1) databases via native database APIS, ODBC, JDBC, etc., or 2) news feeds via dial-up or whatever method supported by the feed, to network file systems for file access, etc.

Figure 23A:
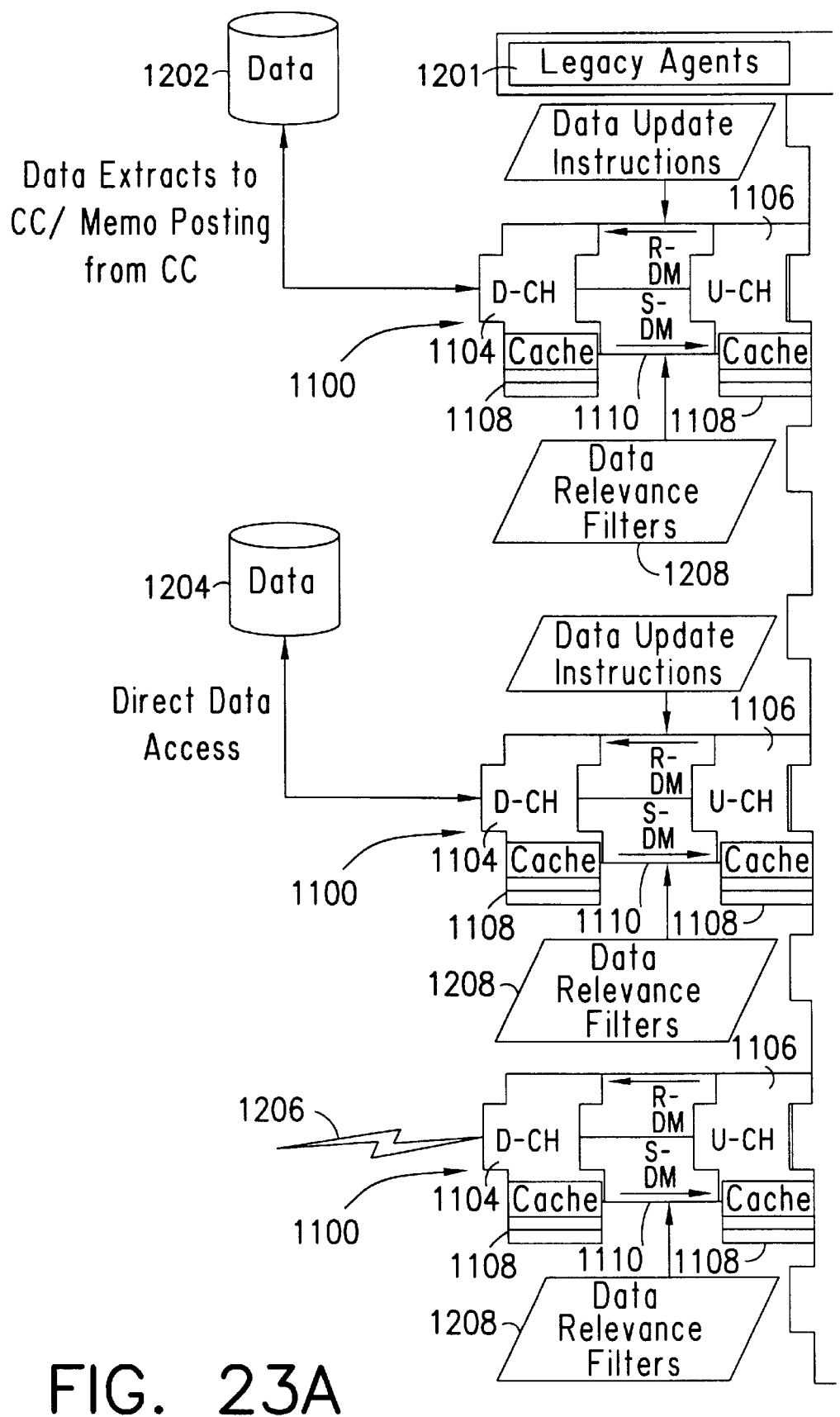
FIG. 23 depicts a plurality of CMDCs and used in a network environment.
Figure 23B:
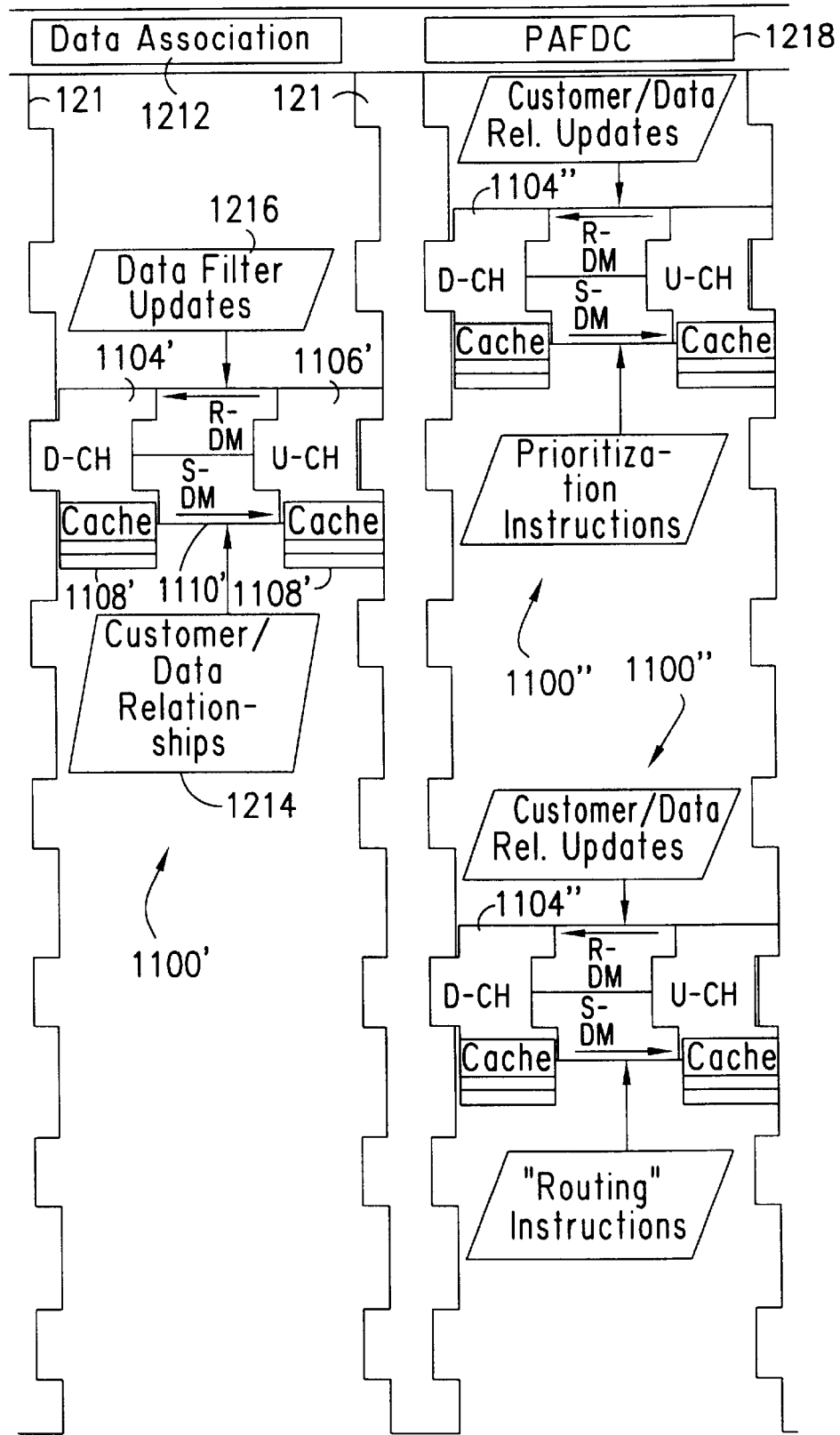
Figure 23C:
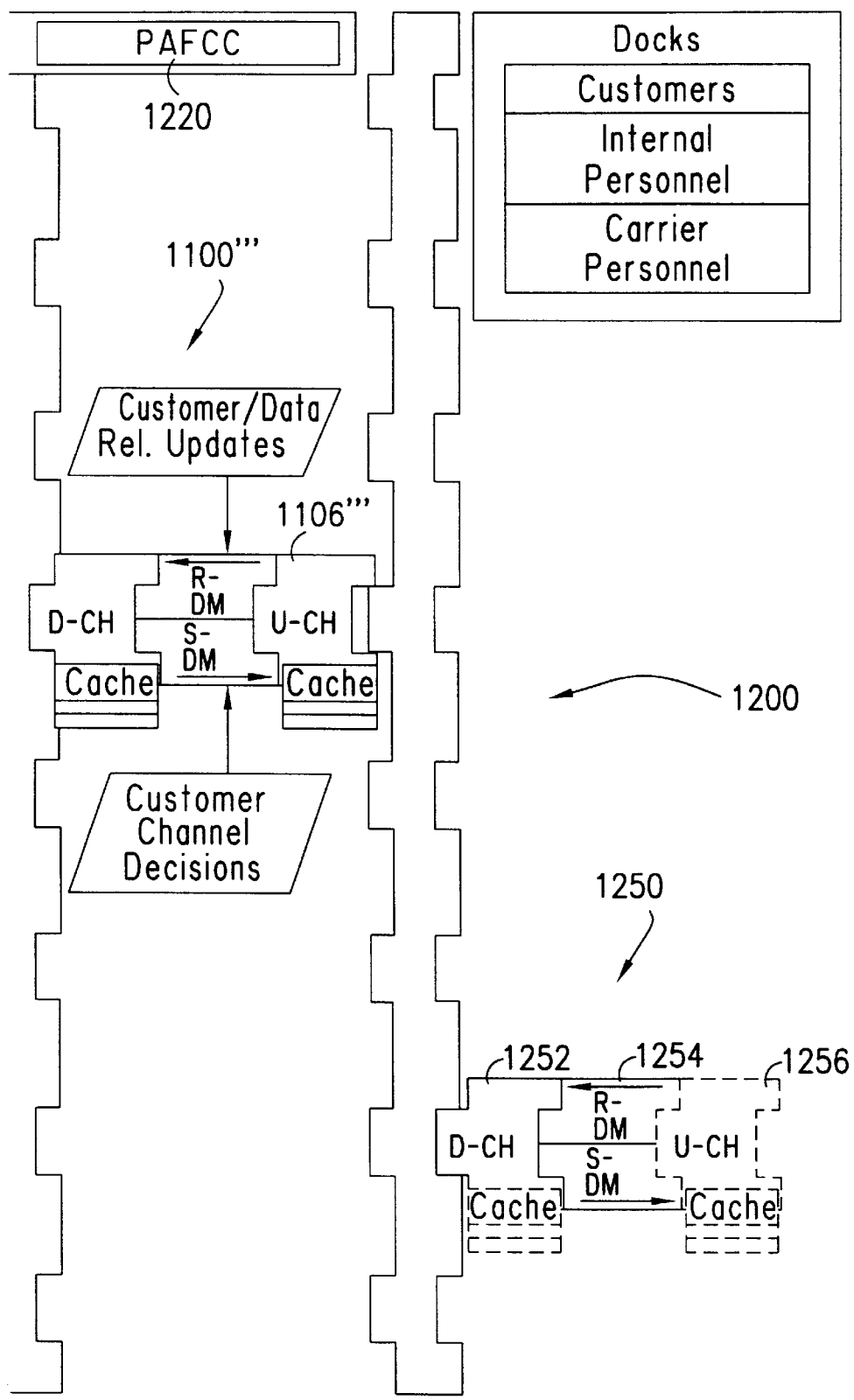

By defining context and responsibilities for CDMCs 1100 and connecting them using appropriate channels, a "network 1200" of CDMCs 1100 might result, as depicted in FIGS. 23A–23C.

The following is a brief example narrative of how messages are constructed, sent, responded to and acted upon in the CDMC network 1200 as illustrated in FIG. 23A–23C.

Three kinds of data sources are depicted in the column labeled Legacy Agents 1201, data extracted from line of business database 1202, direct access to line of business database 1204 and a data feed 1206. In all of these cases, each D-CH 1104 provides the connectivity between the CDMC 1100 and the data source. For example, perhaps the data extract is a flat file located in the networked file system and is read line-by line and parsed; perhaps the directly-accessed database-base has 1) a native API installed in its corresponding CDMC's 1100 D-CH 1104 or 2) uses a database-based trigger to detect updates; perhaps the data feed sends information to the CDMC 1100 via TCP/IP.

In all three cases, the S-DM 1110 in the CDMSc 1100 are configured with data relevance filters 1208, perhaps an AI engine perhaps a full-text indexing system that counts the number of times specific phrases occur over a given period of time coupled with application logic to detect high occurrence and notify downstream processes.

If a CDMC 1100 becomes too busy to handle the incoming information, the Cache 1108 is employed to cache the-data. Alternatively, a CDMC 1100 could direct another CDMC 1100 to handle part of its load, CDMCs 1100 could also conceivably serve as pure "routers" of data.

Data that passes through the filters 1208 are sent through the sending U-CH 1106 onto the internal network 1210. A Cache 1108 is also available here to cache data; data could also be routed as described in the previous paragraph.

The next three steps in the round-trip describe a potential way of breaking the problem into smaller steps that could be separately administered:

Data Association 1212 could be a next step in the round-trip. Here, a CDMC 1100 is responsible for receiving data from the internal network 1210 and applying customer/data associations 1214-linking customers' preferences with the available data. The receiving D-CH 1104' serves to link the CDMC 1100' onto the network 1210. The description of the roles of S-DMs 1110' their data filters 1216, the caches 1108' and U-CH 1106' in the previous paragraph also apply here.

In the PAFDC 1218 step, priorities are assigned to the data passed from the Data Association 1212 step. The receiving D-CH 1104" serves to link the CDMC 1100" onto the network 1210. Again, the description of the roles of S-DMs, their data filters, the caches and U-CH in the Legacy Agents 1201 paragraph also apply here.

The PAFCC 1220 step decides over channel(s) to send customers' Push message. Group and surrogate association could also be done here in CDMC 1100'" or in a previous and separate CDMC. The outgoing U-CH 1106'" could consist of one or many channel interfaces; additional CDMCs could also implement specific channel interfaces.

The Push message is sent to the customer (or to internal or carrier personnel as administrative alerts). The customer's device has an appropriately configured CDMC 1250 consisting minimally of the D-CH 1252 that provides incoming and outgoing connectivity and a decision component (e.g. the person receiving the Push message). If the device is sophisticated enough, an intelligent/automated R-DM decision component 1254 could respond to messages; and additional U-CH 1256 could allow storing messages on devices other than the receiving device itself, caches could also be implemented for message storage.

The customer responds to the Push message and his response returns to the system through his device's D-CH 1252, and the designated channel, arriving at a CDMC configured as a PAFCC that accepts responses. (The customer could also phone a CSR. This CDMC's R-DM determines the nature of the message (for example, response to the Push message, profile update requested by a customer) and routes the data (through the CDMC network for a response or initiating the challenge-and-response message for profile update requests). Based on rules associated with the R-DMs along the chain, the response is ultimately sent to the CDMC responsible for effecting the transaction, being cached and routed as necessary. Profile updates can also be sent along the CDMC network according to the type of update—customer channel updates, group and surrogate information, customer/data relationships.

The basic CDMC design could also be used to provide message truncation, intended to truncate messages for transmission across overloaded channels.

The following section describes the information contained in a PAFCC 64 profile. It speaks of a dock address, meaning a name identifying a type of dock plus dock-specific addressing information. A string with the general format "Dockname/Addressing-info" specifies a dock address. The following dock address strings are standardized here:

Browser/aaa.bbb.ccc.ddd: describes the address for an Internet browser running on a PC accessible at the given IP address.

PalmPilot/aaa.bbb.ccc.ddd: describes the address for a PalmPilot with CDPD accessible at the given IP address.

Skytel/nnnnnn: describes the address for a Skytel two-way pager with the given PIN.

NumPager/ccc-aaa-pppppppppp: describes the address for a numeric-only pager accessible at the given phone number (ccc=country code; aaa=area code or city code;pppppppppp=local number; total length of c+a+p=18 digits maximum) The PAFCC 64 profile of a customer contains at least three fields: Docks, Send-Also, Send-On-Failure. Each contains one or more dock addresses. There is also an auxiliary field called Failure-Timeout.

The Docks field lists the dock addresses at which this customer can be reached. The PAFCC 64 uses these addresses first, sending the message in parallel to all.

The Send-Also field lists the dock addresses at which someone other than the customer (spouse, secretary, lawyer, broker, etc.) can be reached. The PAFCC 64 transmits in parallel to these Send-Also dock addresses after Dock transmissions are complete or have failed.

The Send-On-Failure field lists dock addresses to be tried in parallel if transmissions to the Dock or Send-Also dock addresses fail. Failure is defined as either hard failure as reported by the dock driver, or the absence of a useful response after Failure-Timeout seconds. Send-On-Failure dock addresses may be associated either with the customer (in which case they probably represent less desirable transmission paths) or with third parties.

The following section describes one way that the PAFDC 62 and PAFCC 64 could exchange information and depends on the example XML specification detailed in the following section. In general, the two systems operate independently, queuing output to each other in files within a shared directory. This can be a local disk directory, if the two systems run on the same machine, or a shared network directory. The only assumption is that the operations of renaming and deleting files in the directory are atomic (uninterruptible).

In general, rendezvous is controlled by the PAFDC 62, which decides when to release a queue of requests to the PAFCC 64 and accept a queue of responses. The PAFCC 64 polls the shared directory to see whether a certain file exists. If so, it injects the contents of that file into its internals. In general, files named DC*.TXT are solely controlled by the PAFDC 62, and files named PAFCC*.TXT are solely controlled by the PAFCC 64. "*" is the usual wildcard symbol, representing any characters whatsoever. The files UP.TXT and DOWN.TXT are shared between the two systems.

The PAFDC process cycle: Reads responses from the file DCRESP.TXT, as well as other sources of information, and write requests to the file DCREQ.TXT.

When the reading of DCRESP.TXT and the writing of DCREQ,txt are both complete, initiate a rendezvous as follows: Close and remove DCRESP.TXT. Close DCREQ.TXT. Rename DCREQ.TXT to DOWN.TXT. Wait until the file UP.TXT exists. Rename UP.TXT to DCRESP.TXT. Re-open DCRESP.TXT and the new DCREQ.TXT. Continue looping.

The PAFCC 64 process cycle includes:

Poll continually for the file DOWN.TXT. If it exists, a rendezvous is required as follows: Rename DOWN.TXT to CCxxxxxxxx.TXT, where xxxxxxxx is a unique value. The simplest choice is an encoded date/time. Serial numbers also work but are harder to make robust in the face of application crashes. Close CCRESP.TXT. Rename CCRESP.TXT to UP.TXT. Re-open new CCRESP.TXT.Continue processing. Otherwise, process requests in CCxxxxxxx.TXT files in priority order, and write all requests to CCRESP.TXT. Processing requests in priority order will involve merging requests from multiple CCxxxxxxx files, in general.

All files must contain one or more complete XML documents, separated by one or more line breaks. This guarantees that the <PAF> tag always appears at the beginning of a line, and the </PAF> tag appears at the end of a line.

Multiple PAFDC/PAFCC pairs should use unique shared directories. In effect, this places the identity of the pair into the pathname of the directory.

The following section provides one method for implementing a Message Dock on a 3Com PalmPilot using the general markup language XML (extensible Markup Language). This section describes what a PalmPilot Dock would look like.

The application will be downloaded to a customer's PalmPilot via the regular HotSync conduit for applications. When loaded on the system, it will monitor the airwaves (via the CDPD modem) for a Push message transmission. When received, it will produce an audible signal but not display anything until the customer selects the application. (The application can be bound to one of the hardware buttons if the customer so chooses.)

When the application is visible on the PalmPilot screen, it will display the current message selected by the customer. If there is no currently selected message, it will display the highest priority message. The hardware UP and DOWN keys allow the customer to step through messages in order of priority: UP moves to the message with next-highest priority, and DOWN to the message with next-lowest priority, relative to the currently displayed message. If the message is larger than the PalmPilot screen, a standard PalmPilot scrollbar will provide access to the portions not currently visible.

By tapping on the message, the available responses will appear in a pop-up menu, along with two standard choices, "Other" and "Act By". Choosing one of the available responses will cause the application to connect to the PalmPilot dock driver (using the CDPD facility again) and transmit the response. The address of the dock driver will be saved from the last received message.

Choosing "Other" allows the customer to enter a response either in Graffiti or using the virtual keyboard. When the response is composed, it can be sent or deleted.

Choosing "Act By" allows the customer to enter a time (relative to the current time zone) by which the response must be acted on. Setting this does not send anything. The value is saved with the current message and is applied when a response is eventually sent.

Tapping on a message that has already been responded to gives an error pop-up.

The following commands will be available in the application menu:

Move:
    Up: same as UP key
    Down: same as DOWN key
    First: the highest-priority message
    Last: the lowest-priority message View:
    Creation Date: shows the creation date of the current message
    Stale Date:
    shows the stale date of the current message Settings:
    Quiet: a checkable option to suppress the alarm
    Features: pops up a Feature dialog box
    Purge: Remove messages that are past their stale dates or have been replied to by the customer.

The Feature dialog box provides customer-friendly names for various entries in the customer's PAFCC 64 and PAFDC 62 profiles, and relevant options for setting them. Choosing OK from this dialog box causes a spontaneous upstream message to be sent from the PalmPilot to the dock driver. If the dock driver has not sent anything, wait for the next heartbeat transmission (see below).

Heartbeat: The dockdriver will send a minimal message with just ID, TO, and CD elements occasionally (how often depends on system and network load). This will serve as an indication to the PalmPilot that the dock driver and the modem are still working, and will allows the PalmPilot to determine the difference between local time and universal time. This offset is always a multiple of 15 minutes, so subtracting the PalmPilot's idea of local time from the time given in the CD element, and then rounding to the nearest multiple of 15 minutes, will give a reliable indication of the offset. The offset can then be added to universal dates to convert them to local ones, or subtracted from local dates to convert them to universal ones.

The PalmPilot application will use UDP/IP datagrams for communication with the dock driver. Exceptionally, heartbeat messages are not acknowledged, because if they are lost it makes little difference.

PalmPilot security follows the general principles of Internet Dock security. The PalmPilot dock driver encrypts and digitally signs all downstream messages using public-key technology before transmission. The messages are decrypted, and the signature verified, just before the message is to be displayed to the customer. Messages that cannot be decrypted or that fail signature verification cause an error message to be sent upstream and the customer to be notified. The PalmPilot database stores the messages only in encrypted form.

In the same way, upstream messages are encrypted and signed before transmission back to the PalmPilot dock driver, which then decrypts them and verifies the signature.

In order to gain access to the private keys kept on the PalmPilot, the customer must provide a PIN. This PIN is used to produce a secret key that encrypts and decrypts the private keys. Without the PIN, the secret keys are inaccessible, so possession of the PalmPilot without the PIN prevents downstream messages from being read (because they cannot be decrypted) and upstream messages from being created (because they cannot be authenticated). Neither the PIN nor the corresponding secret key ever leaves the PalmPilot.

The following XML Document Type Definition (DTD) describes the format of Push message PAF documents. PAF documents are intended to be parsed as if they contained the following declaration:

<!DOCTYPE PAF SYSTEM "paf.dtd">, where paf.dtd has the following contents:

```
<!-- DTD Draft 1.0 for Push Message PAF documents
<!-- These are the element types that can be found.
<!ELEMENT PAF (ID, CD?, TO?, DA?, PR?, SD?, MT?, RT?, AD?, RE?, ER?, CF?)>
<!-- This means that ID is first and is required, and all the
    others are optional but MUST appear in the specified
    order. In particular uses, some of them are NOT optional:
    thus PAFDC 64 output must include SD and MT, and
    dock drivers will be helpless if their input doesn't contain
    DA. -->
<!ELEMENT ID (#PCDATA)>
<!ELEMENT CD (#PCDATA)>
<!ELEMENT TO (#PCDATA)>
<!ELEMENT DA (#PCDATA)>
<!ELEMENT PR (#PCDATA)>
<!ELEMENT SD (#PCDATA)>
<!ELEMENT RT (#PCDATA)>
<!ELEMENT AD (#PCDATA)>
<!ELEMENT RE (#PCDATA)>
<!ELEMENT ER (#PCDATA)>
<!ELEMENT CF (#PCDATA)>
<!-- All of these contain just characters, possibly with
    numerical references like &#nnn; and a few general
    references like < and > mixed in. There are lots of
    specific rules about their format, but XML can't cope with
    those rules, and treats them as plain character data. -->
<!ELEMENT MT (#PCDATA | RT)*>
-- MT elements can contain text and any number of RT
    elements mixed together in any arbitrary way. -->
<!-- These are the attributes that elements can have. Elements that aren't mentioned here don't have any attributes. -->
<!ATTLIST MT xml:lang NMTOKEN #IMPLIED CODE NMTOKEN #REQUIRED>
<!-- MT elements have two attributes, xml:lang (which is
    lowercase because the XML spec defines it) and CODE.
    Both are alphanumeric values, or NMTOKENs in XML
    jargon. If xml:lang is missing, an application-specific
    value is implied.
If CODE is missing, it's an error. -->
<!ATTLIST RT KEY NMTOKEN #IMPLIED>
<!-- RT elements have one attribute, KEY. It's an alphanumeric value (NMTOKEN). If it's missing, an application-specific behavior results (namely, there is no key for this return value). -->
<!-- Declarations needed for XML/SGML compatibility.
    XML systems will work fine without these, but old SGML
    systems may not. -->
<!ENTITY lt "&#60;">
<!ENTITY gt ">">
<!ENTITY amp "&#38;">
<!ENTITY apos "'">
<!ENTITY quot """>
```

The following is a description for the XML document type that describes Push message PAF documents, both PAFDC 62 handoffs and PAFCC 64 handoffs. It is also used by PAFCC 64 to communicate with the dock drivers for individual docks. Some dock drivers may also send this format to the docks themselves. Sample documents can be found at the end.

The following general rules apply to this discussion:

Line breaks may be freely inserted into any PAF document except between < and >; they have no significance. However, when a single file contains more than one document, each document should be separated by one or more line breaks, so that each <PAF> tag is at the beginning of a line and each </PAF> tag is at the end of a line.

The structure of a PAF document consists of elements, which are represented by balanced pairs of start tags and corresponding end tags, with intervening content.

Each start tag looks like <XX>; each end tag looks like </XX>. The XX's must match exactly. Case matters throughout the document.

Some start tags have attributes, which appear between the XX and the >. Attributes are of the form name=value. The XX is separated from the first attribute, and attributes are separated from each other, by spaces.

Content may be text or more elements or both, depending on the particular element in question. PAF elements contain only other elements, MT elements contain text and RT elements, and all other elements contain only text.

Text consists of either printable ASCII characters (with the exception of &, <, and >), which represent themselves; or entities, which begin with & and end with ;. In PAF documents, the following entities are recognized:

& an & character (does not signal an entity)

< a < character (does not signal a tag)

> a > character (does not signal a tag)

&#nnnnn; a non-ASCII character, where nnnnn is the decimal representation (without leading zeros) of its Unicode/ISO 10646 value. Allowing any Unicode character permits the message to be correctly represented regardless of its language. (Note: The Latin-1 character set is a subset of the Unicode character set, so Latin-1 and Unicode character codes in the range 160–255 are the same.)

The entire PAF document is a single PAF element. Therefore, the document begins with a <PAF> start tag and ends with a </PAF> end tag. All the other elements are contained within the PAF element. The MT element can contain RT elements as well as text: all other elements contain only text.

Documents sent by the PAFDC 62 to the PAFCC 64 and on to the dock drivers are called downstream documents. Documents sent by the dock drivers back to the PAFCC 64 and on to the PAFDC 62 are called upstream documents. Some elements are found only in downstream documents, some only in upstream documents, and some in both types.

| Tag | Attributes | Source | Content | Format of text |
|---|---|---|---|---|
| PAF | None | All | All other elements in any order (see above) | None |
| ID | None | All | Text: unique ID of document | Alphanumeric |
| CD | None | All | Text: creation date of document | ISO 8601 (see 1 below) |
| TO | None | Down: PAFDC | Text: customer ID of recipient | Alphanumeric |

-continued

| Tag | Attributes | Source | Content | Format of text |
|---|---|---|---|---|
| DA | None | Down: PAFCC | Text: dock-specific address, including the name of the dock | Dock-specific (see 2 below) |
| PR | None | Down: PAFDC | Text: priority of document (0 = minimum, 1 = maximum) | Decimal fraction |
| SD | None | Down: PAFDC | Text: stale-date of document | ISO 8601 (see 1 below) |
| MT | xml:lang (see 3 below) CODE (see 4 below) | Down: PAFDC RT elements: suggested responses | Text: message being sent | Free format plain text |
| RT | KEY (see 5 below) | Down: PAFDC Up: dock driver | Text: response text | Free format plain text |
| AD | None | Up: dock driver | Text: action date for response | ISO 8601 (see 1 below) |
| RE | None | Down: PAFDC Up: dock driver | Text: unique ID of another document to which this document refers (see 6 below) | Alphanumeric |
| ER | None | Up: PAFCC or dock | Text: error message | An empty content indicates "no error". Otherwise TBD. |
| CF | None | Up: dock | Text: request for configuration change | Component Name = Value (see 7 below) |

Notes to Table 3:

The format of date elements conforms to ISO 8601, and is as follows: yyyymmddThhmmss, where yyyy represents the 4-digit year, mm represents the month number from 1 to 12, dd represents the day number within the month, T represents the fixed letter T, hh represents the hour of the day, mm represents the minute of the hour, and ss represents the second of the minute. This time is always assumed to be UTC (Coordinated Universal Time), also known as GMT. The purpose of using Universal Time is so that stale-dates can be interpreted unambiguously no matter where the Push message components may be located.

The format of a DA element is a dock driver name such as "Browser" or "Skytel", followed by a slash, followed by a dock-specific address, such as an IP address or pager PIN or phone number. This element is not present, or has empty content, in a downstream document as sent out by the PAFDC 62. It is inserted by the dispatching component of the PAFCC 64 for interpretation by the appropriate dock driver.

The value of the xml:lang attribute (a standard XML attribute) is an RFC-1766 language code; for example, the language code for English is en. If the xml:lang attribute is omitted, nothing is assumed about the language of the text.

The value of the CODE attribute is a numeric value corresponding to the content of the message. If the message must be sent over an unsecured channel, it is sent in the form of a telephone number chosen by the PAFCC 64 plus the CODE value. Such a message can be sent over the simplest of channels—a numeric-only pager. This attribute is required.

The value of the KEY attribute is a digit representing which code key (in the pager GUI) this response corresponds to. Multiple RT elements within an MT element must have different KEY values. This attribute is required in a downstream document. In an upstream document containing a response which is free-form (not one of the provided responses), the KEY attribute is not present.

The content of a RE element is always the same as the content of the ID element in some other document. Upstream documents have a RE which links them to the downstream element, which links them to the downstream, document to which they respond. If a downstream document has a RE element, it is meant to supersede the downstream document referred to. This is how cancellations and corrections are sent downstream.

The content of a CF element is of the form Component.Name=Value where Component is PAFDC 62 or PAFCC 64 (and possibly other things) and Name is an element of the specified profile. Value is a new value for that element requested by the customer. This element appears only in spontaneous upstream messages.

The elements within the PAF element must appear in the order specified in the table. Only the ID element is required, but if any of the others appear, they must be in the given order, and at most one element of each type is allowed. These rules do not apply to RT elements when they are nested inside an MT element.

XML Comments: Comments may be placed anywhere in a document except between < and >. They begin with the string <!-- and end with the string --> and may not contain the string -- (for compatibility with full SGML). Support for comments is an XML requirement, but PAF documents typically will not contain them except perhaps for debugging purposes.

The following is an example of a downstream document. This document has already been processed by the PAFCC 64, as it contains a DA element:

<PAF>
<ID>asdfjkl</ID>
<CD>19980201T080500</CD>
<TO>Customer24</TO>
<DA>Skytel/142857</DA>
<PR>.9</PR>
<SD>19980201T090500</SD>
<MT xml:lang=en CODE=125>You have too much money in your 401-K account.
How much should we move?
<RT KEY=1>100%</RT>
<RT KEY=2>50%</RT>
<RT KEY=3>0%</RT>
</MT>
</PAF>

The following is an example of an upstream document:
<PAF>
<ID>qwertyuiop</ID>
<CD>19980201T081000</CD>
<DA>Skytel/142857</DA>
<RT KEY=1>100%</RT>
<AD>19980201T090600</SD>
<RE>asdfjkl</RE>
<ER></ER></PAF>

The following is another version of "asdfjkl" for a Portuguese-speaking customer:
<PAF>
<ID>asdfjkm</ID>
<CD>19980201T080500</CD>
<TO>Customer99</TO>
<DA>Skytel/242993</DA>
<PR>.9</PR>

```
<SD>19980201T090500</SD>
<MT xml:lang=pt> Você tem demasiado dinheiro em
   seu cliente 401-K.
Quanto devemos nós mover?
<RT KEY=1>100%</RT>
<RT KEY=2>50%</RT>
<RT KEY=3>0%</RT>
</MT></PAF>
```

The following describes an XML example using, Internet Protocol (IP). Not all docks speak IP. This discussion refers only to those that do. There are two reasonable IP-based strategies for communicating between a dock driver and its corresponding docks: TCP/IP streams and UDP/IP datagrams. Here, we will speak of "senders" and "receivers". For a downstream message, the sender is the dock driver and the receiver is the dock itself; for an upstream message, the sender is the dock and the receiver is the dock driver. All issues are symmetrical.

When the sender wishes to transmit a PAF document to the receiver, it may employ TCP or UDP. TCP provides reliable transmission, flow control, and a positive indication of transmission (the success of the "close socket" system call). Therefore, no high-level acknowledgment of success is required. The receiver simply reads the entire document and closes the connection.

UDP does not provide any of the above mentioned features of TCP, but it has much lower overhead: a normal PAF document can be transmitted in a single packet. A specific acknowledgement is required, and is defined here. The receiver should return a datagram containing a minimal PAF document as follows:

`<PAF><ID>xyz</ID><RE>abc</RE></PAF>`

The "xyz" represents a newly generated unique document ID, and the "abc" represents the document ID of the document being acknowledged. This minimal document is absorbed by the dock, the dock driver or the PAFCC 64, and is in no case passed to the PAFDC 62.

If the receiver detects an error (a malformed PAF document, for example), then an error document is generated and sent back to the sender. This document would typically look like this:

`<PAF><ID>xyz</ID><RE>abc</RE><ER>error message</ER></PAF>`

Error messages in ER elements are text strings. Error messages include, but are not limited to, "Dock Full" and "Message Authentication Failed".

The following section defines the dock for plain old telephone service POTS. Messages forwarded to this dock make use of commercially available or to-be-built text-to-speech systems.

The customer's phone number is on registry with the PAFCC 64. This can be a cellular or landline phone number. Multiple phone numbers may be available to be used in turn.

When a message is to be sent, the customer's phone is called automatically by the dock driver. The text-to-speech system then reads the message to the customer along with possible replies, in the general form: "To choose <action 1>, press or say One. To choose <action 2>, press or say Two." and so on. Systems that can recognize the ten spoken digits, plus tones generated by keypresses, are readily available.

In addition, the customer may call a toll-free number at any time to play back messages heard but not yet replied to. The * and # keys permit scrolling through the list of messages in priority order, where * means "Skip to next" and # means "Skip to previous". Once a message has been replied to and the customer has hung up, it is purged from the toll-free number.

For international calls, the toll-free number may be supplemented with a regular toll number, since toll-free numbers can typically not be called from outside North America. In addition, the world's telephone companies are starting to define international toll-free service (country code 800), and obtaining such a number might be appropriate. All phone numbers whatever would provide exactly the same service. However, additional phone numbers might be provided that rendered services in languages other than English. The dock driver for the POTS dock would appear much like a pager dock.

Figure 24:
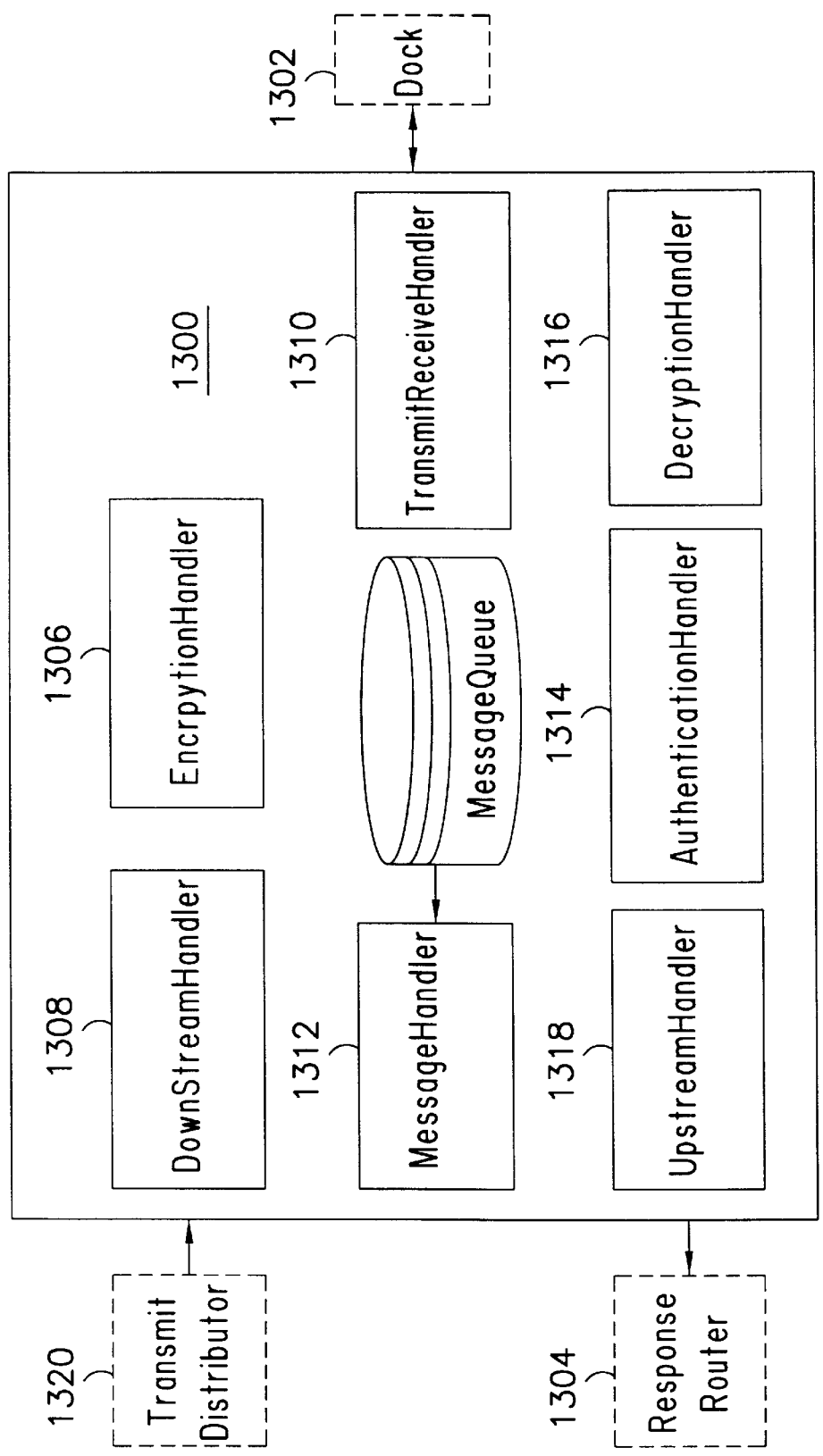
FIG. 24 illustrates the server side of an Internet Dock.

The following describes an Internet Dock example from both the server and client sides. The server side will be discussed first, with respect to the FIG. 24. The Server 1300 is responsible for the transmitting messages to the client, monitoring the status of transmitted messages, and receiving messages from the client. This application, hereafter referred to as Server, is a series of components designed to scale as its use warrants it.

The Server 1300 supports the following services: Format and transmit messages to the client. Receive messages from the client. Encrypt all transmissions. Monitor all transmissions and forward the status to the Response Router. Prioritize outgoing messages. Support the transmission to a wide range of devices.

Once the Server 1300 receives a request to transmit a message, it then determines the destination device transmission characteristics based on the Code Field, formats the message, encrypts and transmits it. After transmission, the Server 1300 waits for a reception confirmation message from the Dock 1302. Once a confirmation message is received, the Server waits for response message.

The Server receives and processes messages from the client (i.e. through Dock 1302). These messages range from status messages to customer initiated messages. Once a response is received, the response (i.e., message) is first virus scanned and decrypted. After it is decrypted, its is authenticated, formatted, and send to the Response Router 128. The Response Router 1304 is response for forwarding the message to appropriate object.

All receptions and transmissions between the Server 1300 and Dock 1302 can be encrypted using the encryption handler 1306.

Once a message is sent downstream, the Server 1300 will monitor for an updated status from the Dock 1302. If a response is not received in a specified time, the Server 1300 either retransmits the message or sends a status message to the Response Router 1304. Retransmission is based on the customer's profile and device. The following are some of the responses the Server 1300 will forward to the Response Router 1304:

When a message(s) was received, along with a time stamp; If customer has viewed a message; The time and date of the customer's computer; Messages that are approaching the stale time threshold and have not been responded to by the customer; Messages who's stale time expired without a response by the customer; Communication error messages; and Customer initiated messages Since the number of outgoing messages may exceed the capacity of the transmitting equipment, the Server 1300 is able to prioritize outgoing message based on criticality level and stale time. The server 1300 can also serve as a repository for messages that, because of device memory constraints, have been deleted from the device. In this event, the customer can view messages upon requesting that they be delivered from the Server 1300 to their device. Should the Server 1300 not be able to transmit a message before its stale date is reached, it will inform the Response Router 1304 of this condition. The Server 1300 then removes the message from its message queue and marks it accordingly.

The Sever must support a wide range of Docks 1302. The Docks 1302 can range from Personal Computers to PalmPilot devices.

The Server 1300 is an integral component of the system. Its function is to concurrently send and receive messages. The Server 1300 consists of several objects, which support these functions. These objects are:

DownstreamHandler 1308; EncryptionHandler 1306; TransmitReceiveHandler 1310; MessageHandler 1312; AuthenticationHandler 1314; DecryptionHandler 1316; and UpstreamHandler 1318

The DownstreamHandler 1308 is responsible for receiving messages from the Transmit Distributor 1302. It is also responsible for resolving any communication errors that may occur during inter-process communications. Upon receiving and validating the message, this object sends the message to the MessageHandler 1312.

Downstream tasks include processing messages for transmission and reprioritizing messages.

For message transmissions, this object determines the destination device characteristics (e.g., IP Address, hours of operation) from the customer's profile and message format. Once the device characteristics are determined, the message is formatted accordingly and sent to the EncryptionHandler 1306.

Reprioritization requires the MessageHandler 1312 to determine when a message should be transmitted. To determine the message's priority, two elements are considered: Message's criticality level and expiration stale date. For example, a message was originally marked as the tenth message for transmission. The MessageHandler 1312 determines it should be the second and then reprioritizes it.

This EncryptionHandler 1306 is responsible for encrypting the XML response document for transmission to the Dock 1302.

The TransmitReceiveHandler object 1310 is responsible for physically transmitting and receiving messages to/from the Dock 1302. The individual Dock 1302 drivers communicated with this object to transfer the message. As new Dock 1302 devices are introduced, their dock drivers only have to interface with the object. This object is also responsible for resolving any communication errors that may occur during communications with the Dock 1302.

The MessageHandler 1312 is responsible for processing downstream and upstream messages.

The AuthenticationHandler object 1316 is responsible for authenticating the incoming messages. If a message fails authentication, the MessageHandler 1312 is informed and an alert is sent to the Response Router 1304. The MessageHandler 1312 then waits for instructions from the Transmit Distributor 1320.

The DecryptionHandler object 1316 is responsible for decrypting the upstream message.

The UpstreamHandler object 1318 is responsible communicating with the Response Router 1304. It is also responsible for resolving any communications errors between the two objects.

Upstream tasks include monitoring the status of messages and sending the messages to the Response Router 1304.

Monitoring of messages requires the MessageHandler 1312 to either determine if a response has been received for "push" message or analyzing responses. If a response has not been received during a specified time, the MessageHandler 1312 will either have the message retransmitted or remove the message from the message queue. In any event the Response Router 1304 is informed of the action. If a response has been received, the MessageHandler 1312 determines if a message should be retransmitted, wait for additional status updates, or remove the message from the message queue. For example, communication errors would require that a message be retransmitted. Status updates, such as "message has been received", simply requires the MessageHandler 1312 to keep waiting for a customer response. Customer responses are formatted (e.g., date and time received are added), forwarded to the UpstreamHandler 1318, and then deleted from the message queue.

Figure 25A:
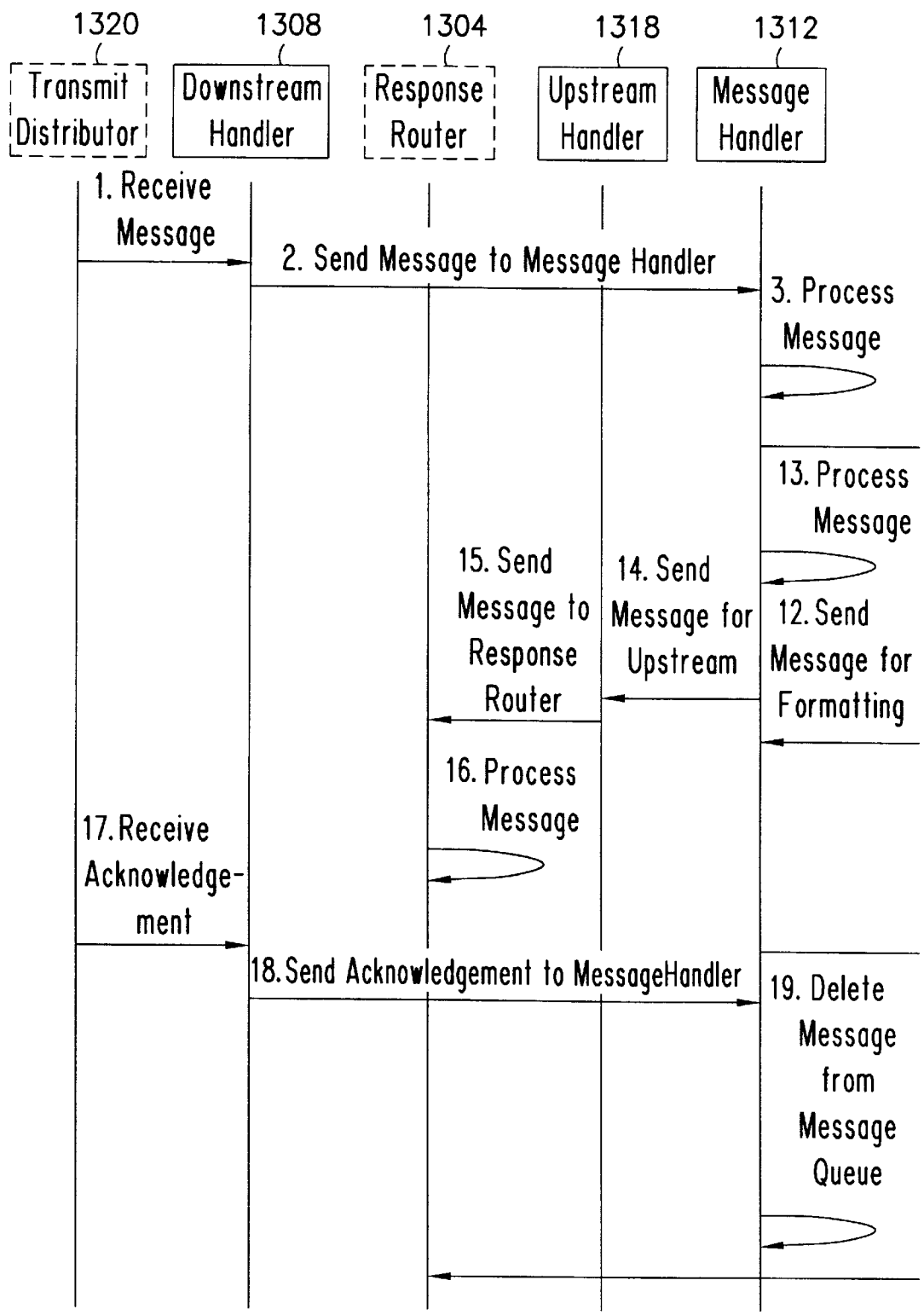
FIG. 25 shows the process flow for an Internet XML message being sent to a customer.
Figure 25B:
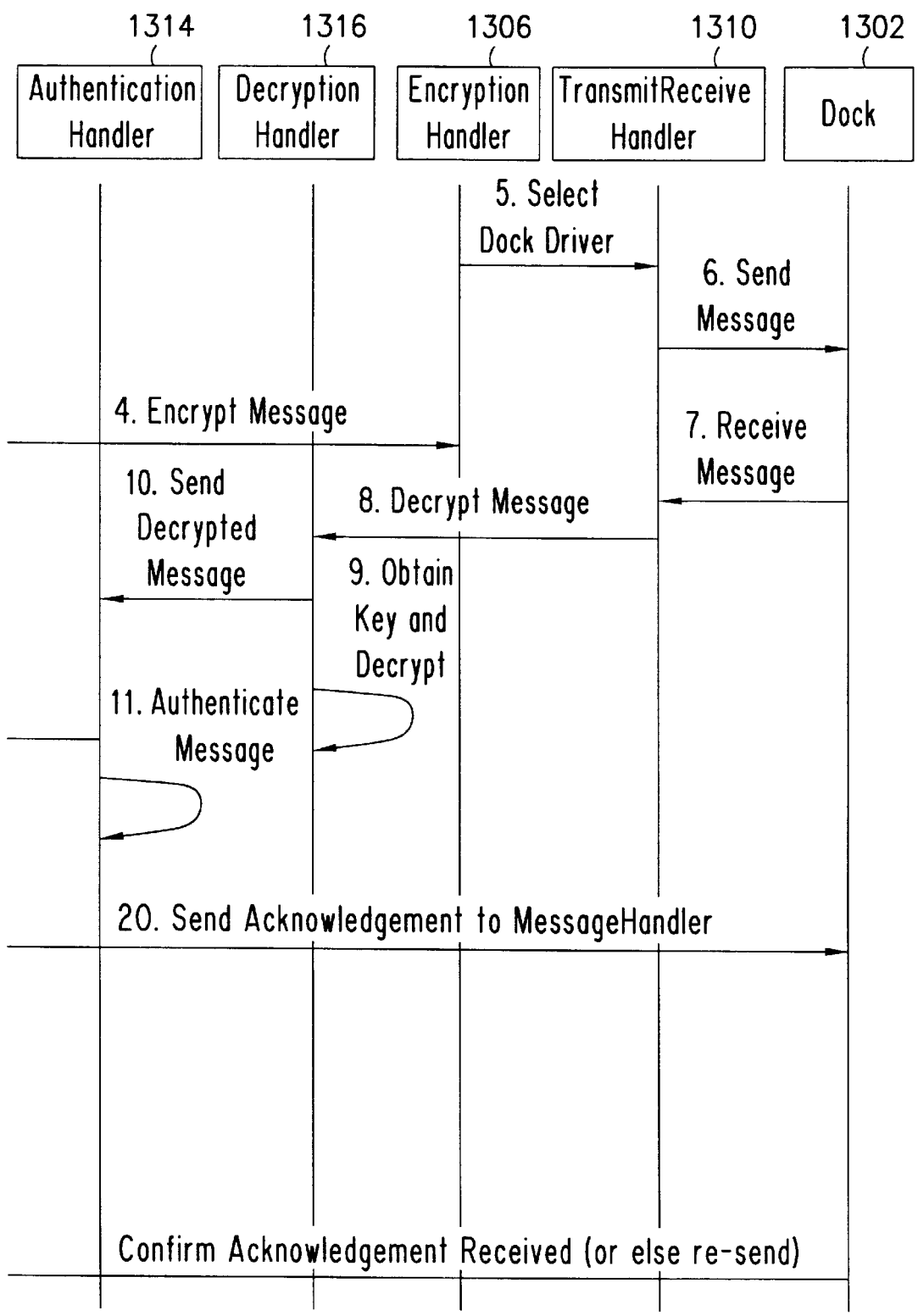

FIG. 25 illustrates a scenario where an XML message is sent to the Dock 1302 and processed by the customer. The customer's response is sent back to Server 1300 via Dock 1302

Figure 26A:
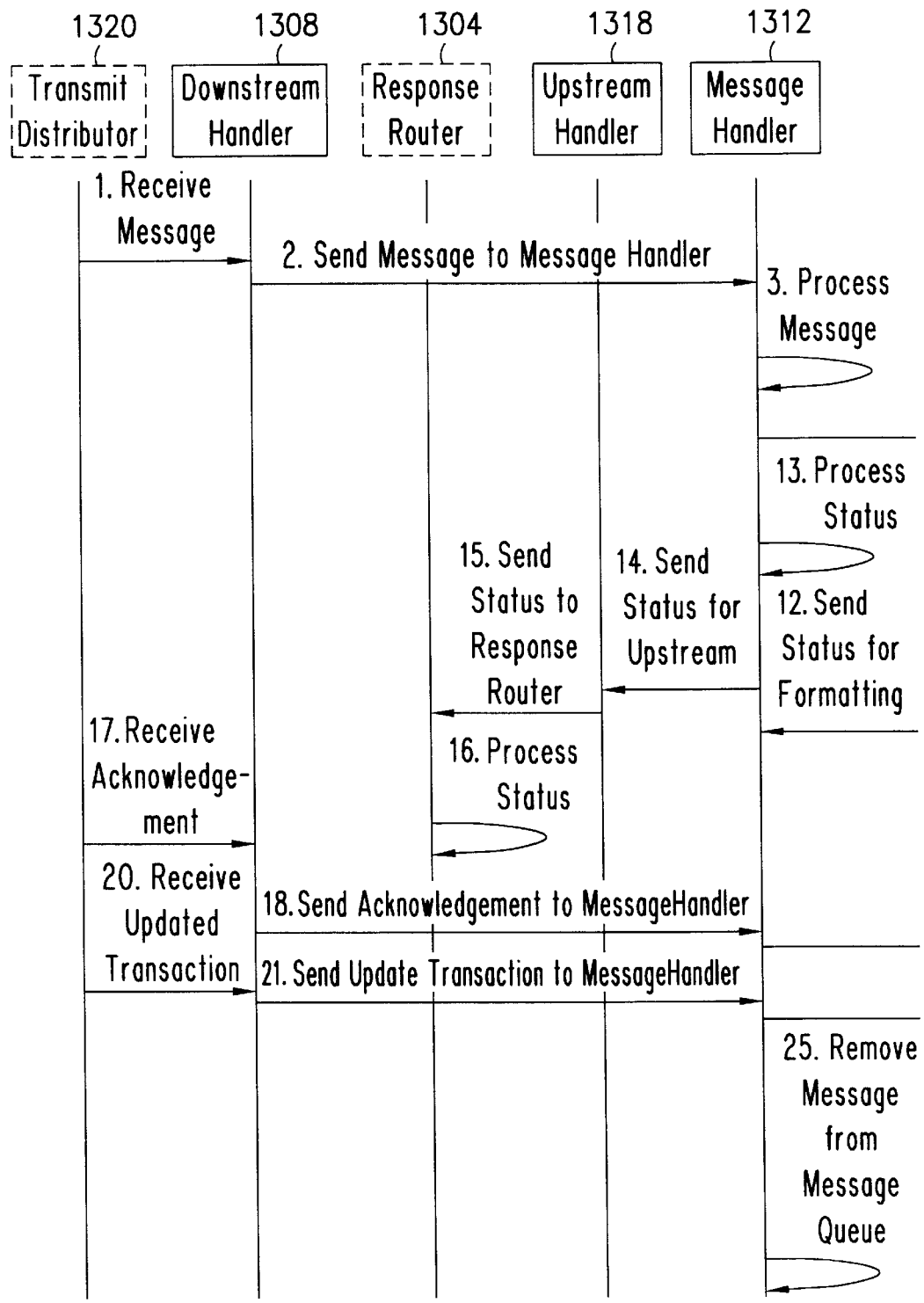
FIG. 26 shows the process flow for monitoring and deleting a Push message.
Figure 26B:
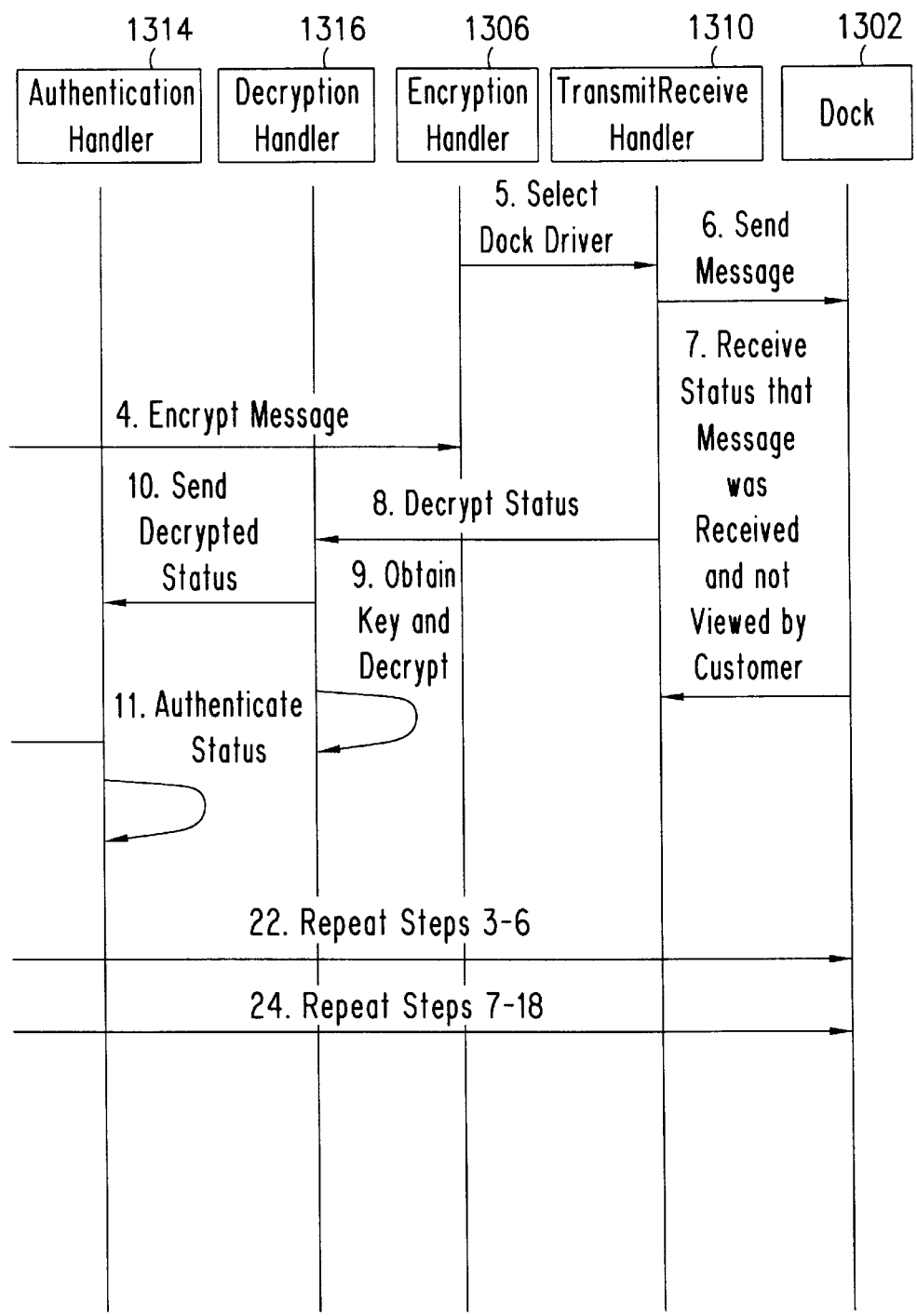

FIG. 26 illustrates an example where multiple XML messages are received asynchronously. The customer does not view the original message and, consequently, an updated transaction is sent and original message is removed from the message queue.

The following describes the functionality of the Internet Dock side of the system (traditionally called the client). An Internet Dock is responsible for receiving messages from the Server 1300, processing the customer's responses, and transmitting the response back to Server 1300. This section only addresses the application on the customer's system, and not on the transmission side. This application, hereafter referred to as Dock, is a smart Dock, capable of offering a wide range of services to the customer. The Dock resides on a customer's intelligent device. The Dock supports the following services: Receive and display messages; Allow the customer to respond to "push" messages, process them, and transmit responses to the Server 1300; Encrypt all transmissions Automatically alert the customer to incoming messages; Prioritize multiple incoming messages; Allow the customer to view off-line previously received messages that were not responded to; Allow the customer to view processed responses (i.e., messages and their responses) and confirmation information; Automatically delete historical processed messages at a predefined date; Allow the customer to delete historical processed messages. Provide the Server 1300 with the status of the transmitted message; Allow the Server to automatically delete and reprioritizes messages that were not viewed by the customer; Support an alternative applet security implementation (i.e., applet mating); and Allow the customer to initiate communications with operator of the Server 1300 to change their customer profile.

When an encrypted message is received from the Server, a message notification is exercised, and the customer is prompted to enter their Personal Identification Number (i.e., PIN). This PIN is then validated, and if correct, displays the message and its response. Otherwise, will keep retrying and display a message to contact Customer Service for assistance.

The customer has the option of selecting a response from a list of responses that were sent from the Server 1300. Once the selection is made, the customer then issues a command for it to be transmitted back to the Server 1300. The response is then stored locally and encrypted for transmission. Once it's encrypted, the Dock sends it to the Server 1300 and receives a confirmation of receipt. The confirmation is then displayed to the customer for acknowledgment. If an error is encountered during transmission, the customer is informed of an error and the appropriate action. The customer also has the option of responding to a message off-line.

All receptions and transmissions between the Dock and the Server 1300 are encrypted. The Server 1300 will determine the appropriate encryption method.

Once a message is received, the Dock will notify the customer of an incoming message by a method specific to the customer's device. If multiple messages are received, the notification message will include the total number of incoming messages. The customer must then acknowledge the alert. Once acknowledged, message processing is as described above.

If multiple messages are received concurrently, the Dock prioritizes these messages based on their priority level. After a message has been processed, the next message is displayed for the customer to respond. All subsequent messages are processed in this fashion. If the customer chooses to view messages off-line, then the unprocessed messages are displayed first in priority order, followed by processed messages.

The Dock allows the customer to view unprocessed messages off-line. The customer chooses the unprocessed message option to enter this mode. Once selected, the messages are displayed in priority order. The Dock will also display a notification dialog box, reminding the customer they have unprocessed messages in the queue. Should the customer reconnect (i.e., on-line) when viewing previously received message, the unprocessed messages are displayed first, unless the new messages have a priority that supersedes all messages.

The Dock maintains a historical database of processed messages along with their responses and confirmation. Each message is date and time stamped. Should multiple messages be received for the same transaction, these messages will be group by date order. The customer has the option of viewing a list of all the messages, with a brief description, selecting a transaction, and then viewing the details of each message.

The Dock automatically deletes historical information, when the disk spaces (e.g., hard disk, PCMCIA EEPROM) or data limits are reached. The type of device will determine the limit for the disk space. Date limits are based on the oldest stored messages. These deletions are necessary to clean up the customer's device. Typically, only the oldest messages will be deleted. The only exceptions to this deletion function, are messages that were marked as protected by the customer. These messages must be marked unprotected before they can be removed.

The Dock allows the customer to delete processed messages. Prior to the deletion, the customer is asked to confirm the deletion.

The Dock provides the Server 1300 with status of the transmitted message. Some of the status messages are: When a message(s) was received, along with a time stamp; If customer has viewed a message; If the customer has composed a response to a message, but has not transmitted it; The time and date of the customer's computer; Messages that are approaching the stale time threshold and have not been responded to by the customer; Messages whose stale time expired without a response by the customer; Inform the Server of a change in a message state; and Communication error messages.

The Dock will allow the Server 1300 to delete and reprioritizes any messages that were received by the Dock, but not viewed by the customer. For example, a message is received stating "your account is overdrawn by $2 million dollars", along with appropriate responses, but the customer has chosen not to read it. Subsequently, another message for the same account is received with a different amount. The Dock will delete the original message and forward the new message. The Dock will inform the customer of this change. Additionally, if a message is received with a different priority, the Dock will automatically reprioritize any messages not viewed by the customer.

As previously stated, most of the examples provided in this description use XML documents to send and receive information. An alternative method is to supply the AppletViewer with an incomplete applet (i.e., a program). This applet becomes functional once is "joined" with another applet sent by the Server 1300. This process is described as applet-mating. In other words, the Server 1300 sends an applet to the customer's system, the AppletViewer validates the received applet, and links it with the applet residing on the device. Once linked, the information is displayed to the customer. Should the applet fail its validation, the customer is asked to contact Customer Server Service.

This type of communication provides an additional layer of security and functionality over the purely XML examples used in the rest of this description. For example, the applet-XML combination provides for a standard method of displaying the push messages, which typically only differ in message content. In comparison, applet-mating provides for enhanced display and processing capabilities. These enhancements are due to the fact that instead of using a document to provide information, a program is used. This program provides, in addition to document information, the GUI (i.e., graphical user interfaces) and controls. The applet residing in Dock allows the linked application to communicate with the other Dock objects.

Figure 27:
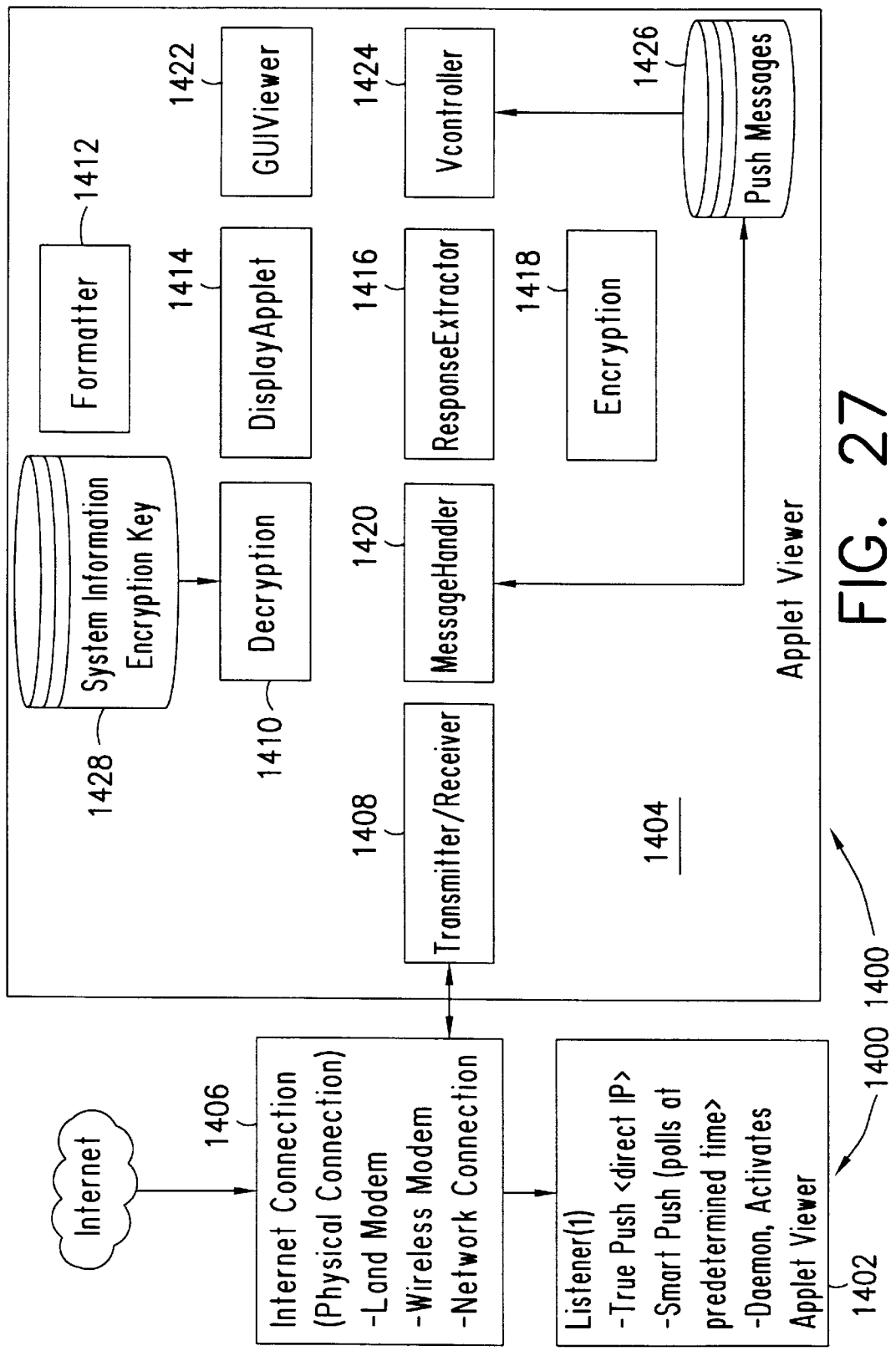
FIG. 27 illustrates a block diagram of a Dock employing an applet viewer (the Listener and Applet Viewer reside on the customer's device)
Figure 28A:
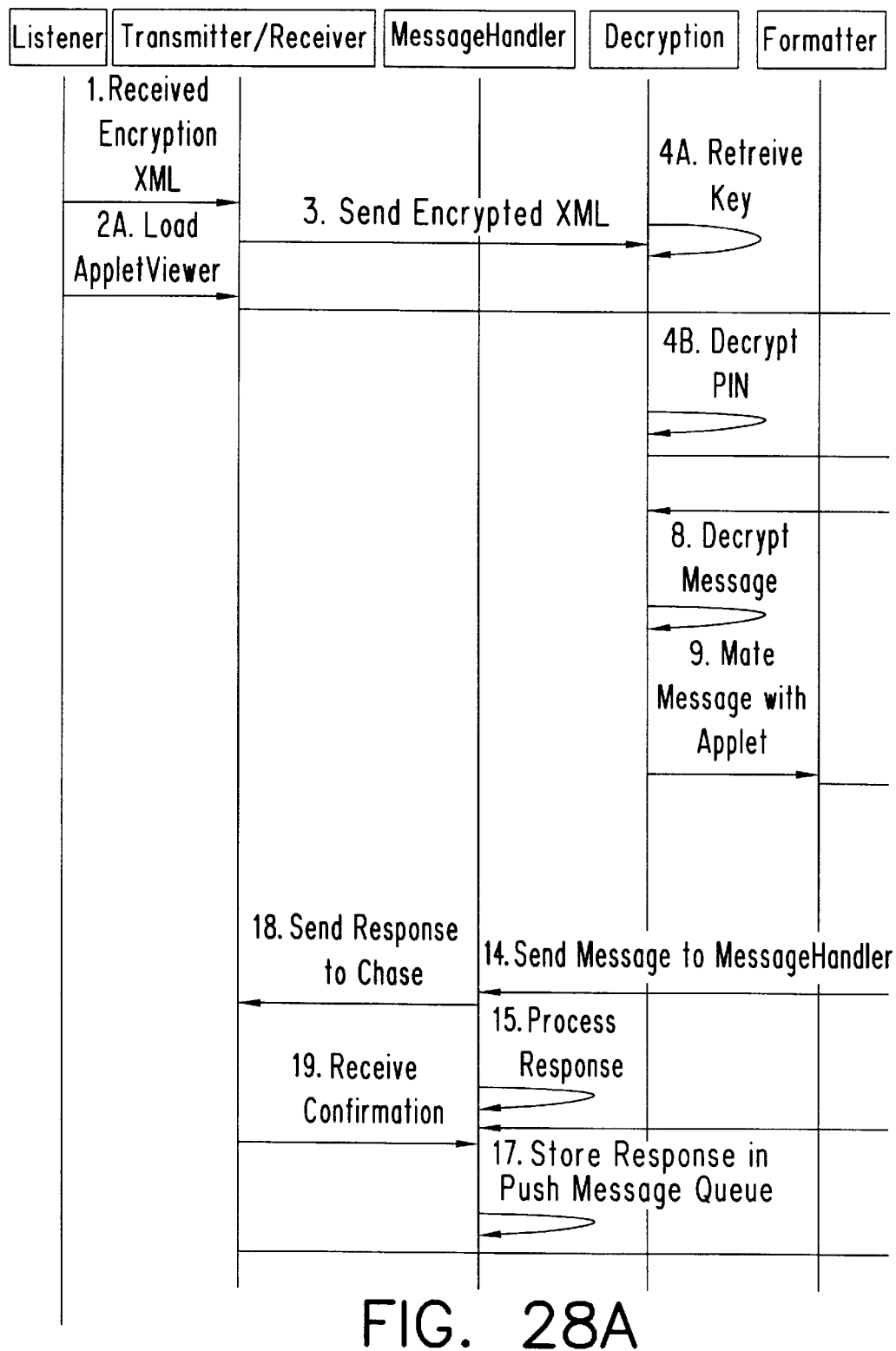
FIG. 28 illustrates the process of the Dock of FIG. 27 for a Push message.
Figure 28B:
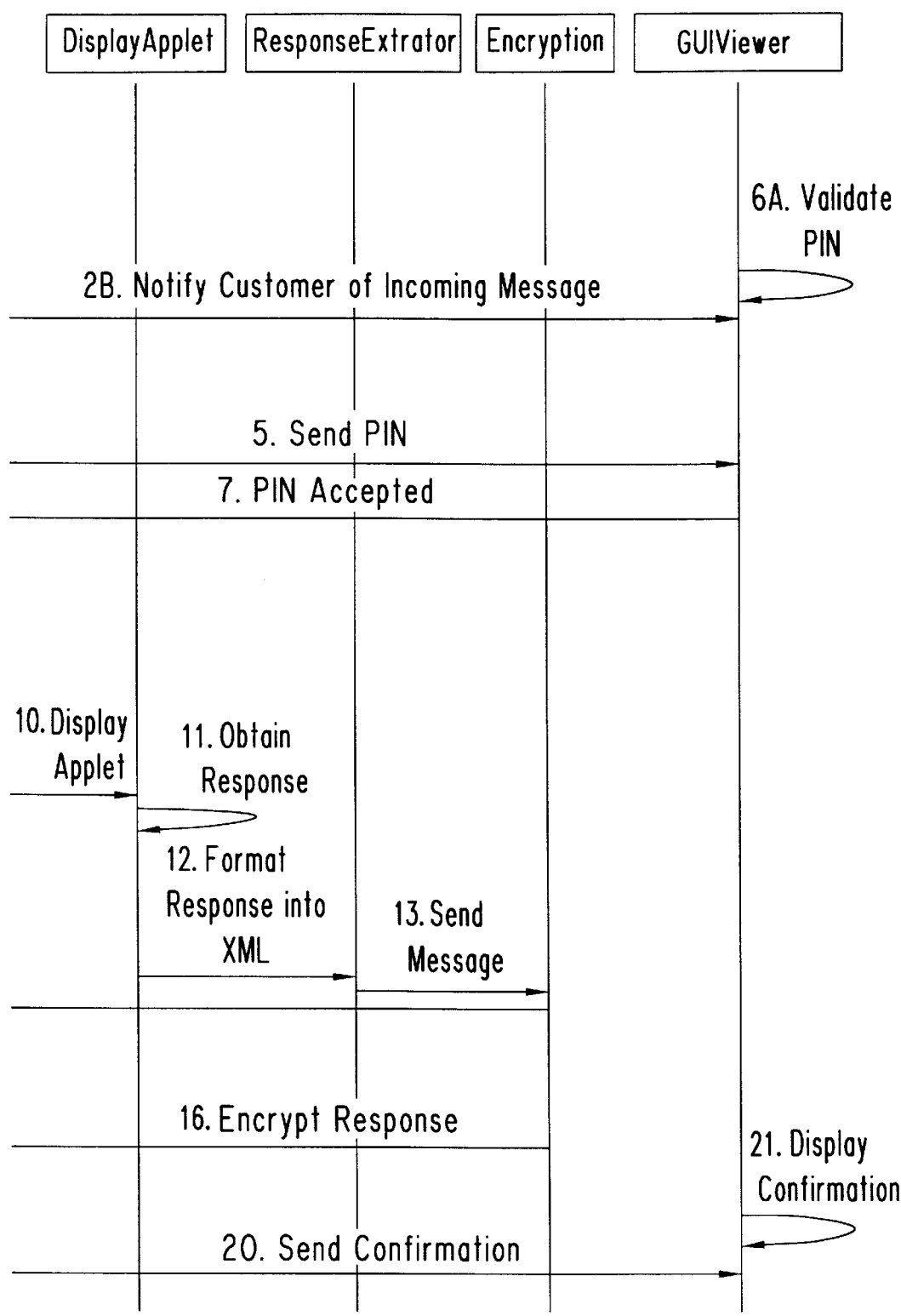
Figure 29A:
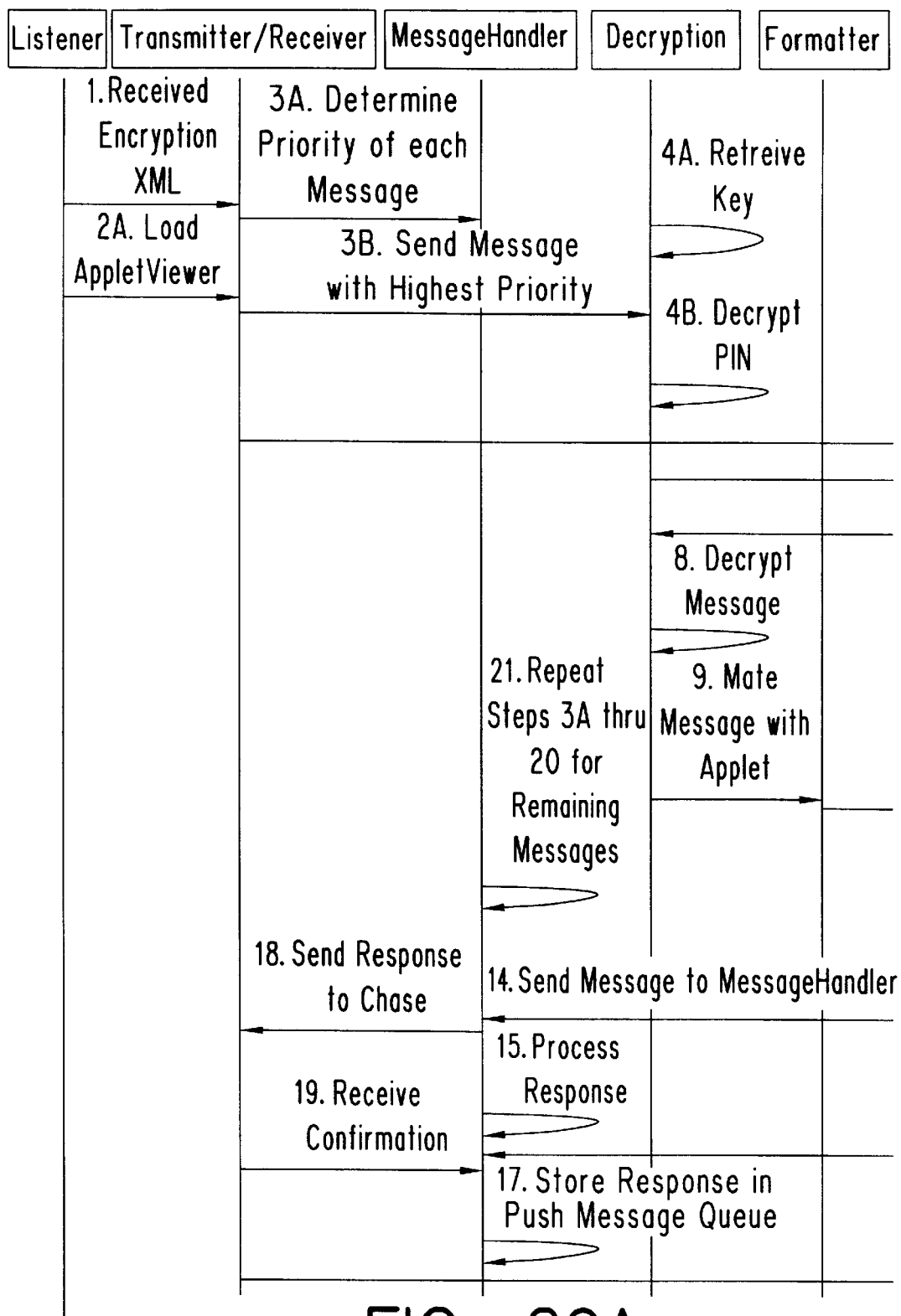
FIG. 29 illustrates the process of the Dock of FIG. 27 for multiple Push messages with different priorities.
Figure 29B:
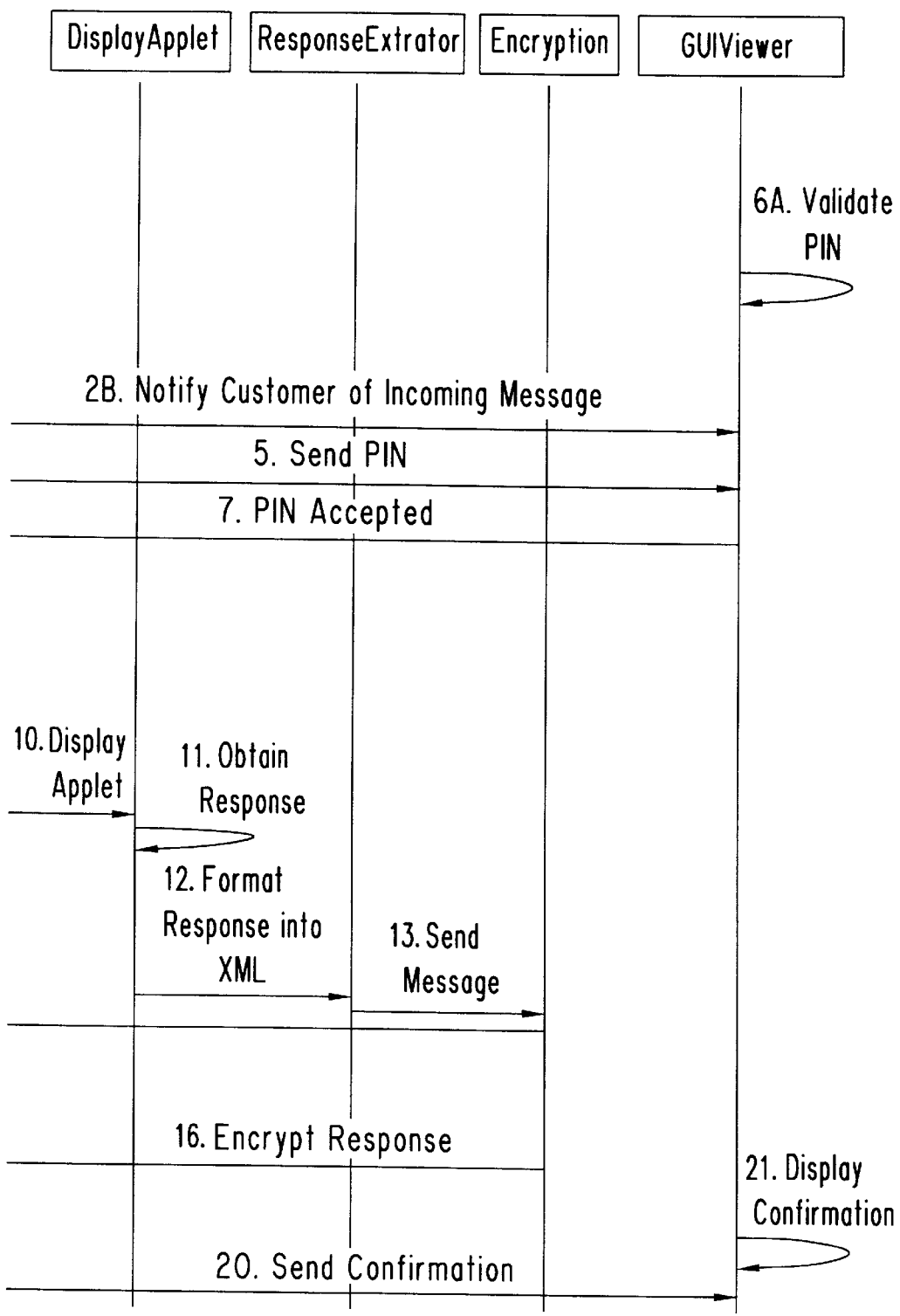

The Dock will allow the customer to change their customer profile information and transmitted to Chase for processing. The customer for example will be able to change their calling priority. Once the Dock has been installed on the customer's device, it remains active at all times listening for an incoming push from the Server 1300. The Dock as illustrated in FIG. 27 consists of two major components: Listener 1402 and Applet Viewer 1404. Each major and minor component shown in FIG. 27 is detail below. FIGS. 28 and 29 depict in time sequence the processing occurring in a Dock. FIG. 28 illustrates a scenario where a Dock is processing one Push message. FIG. 29 shows the processing conducted in a Dock for multiple Push messages with different priorities.

The Listener 1402 is responsible for receiving push messages from the Server. Once installed, the Listener 1402 remains active at all times waiting for messages. The device is capable of operating in either True-push or Smart-pull mode. It communicates with the computer's physical communication component 1406 (e.g., modem, wireless modem, LAN connection, etc.)

In the True-push mode the Listener 1402 operates in receiver mode, waiting to be interrupted by a message that was sent by the Server. True-push mode allows for information to be sent directly to the customer by the Server. In the Smart-pull mode Listener 1402 polls the Server at predetermined times for any push information. Once information is available, it is automatically downloaded to the customer's device.

Regardless of which mode is used, once the Listener 1402 receives a "push" message, it automatically loads the Applet Viewer 1404. If the Applet Viewer 1404 is loaded, then the Listener 1402 sends the information to the Applet Viewers Transmitter/Receiver component 1408.

"Information" as used above may be a Java applet, XML document, or any other type of component, which is capable of delivering a message. For the purposes of this technical note, an XML document is used as the medium for the message.

The Applet Viewer 1404 is directly responsible for displaying the "push" message and capturing the customer's response. It is also responsible for displaying both stored unprocessed and processed messages. This method of processing allows the customer to view messages off-line. The Applet Viewer 1404 consists of nine objects: Transmitter/Receiver; Decryption; Formatter; DisplayApplet; ResponseExtractor; Encryption; MessageHandler; GUI Viewer Vcontroller;

The transmitter/receiver object 1408 is the communications layer responsible for sending and receiving information from the physical communication component. This component also receives the message from the Listener 1402 when the AppletViewer 1404 is loaded into memory. The MessageHandler 1420 communicates directly with this component.

The MessageHandler object 1420 is responsible for directing the flow of the message. If the message is downstream, it directs the message to the Decryption object. If the message is upstream, it sends the message to Transmitter/Receiver 1408. This object is also responsible confirmation processing, cleanup, prioritizing, and error processing.

When a response is sent to the Server, the message is temporary stored in the Push Message queue. The MessageHandler 1420 then waits to receive a confirmation from the Server. If a confirmation message is received, the push message is deleted (i.e., cleaned up) from the queue and the confirmation message is sent to the GUIViewer 1422. If the confirmation is not received, the MessageHandler 1420 retries. If after retrying for a specified number of times, an error message is displayed informing the customer to call Customer Service for assistance. The next time the AppletViewer 1404 is loaded into memory, it sends the response with the appropriate error code.

This object 1420 is also responsible for prioritizing unprocessed (i.e., not viewed) messages. If multiple messages are received concurrently, this component will send the message to the Decryption 1410 object priority order. The message's priority is embedded in the message. If the received messages all have the same priority, then each message is sent sequentially. Note, for each session (i.e., message is displayed and the response is captured), the customer will be prompted to enter their PIN number prior to start of the session.

Should the customer choose not to process any messages, the unprocessed messages are stored in the Push Message queue 1426.

Finally this component 1420 is responsible for sending and/or detecting any communication and processing errors that may have occurred during the session.

The System must ensure that a high level of security exists whenever the device can support it. The Dock 1400 will support the recommend security standard. For example, if an XML message is sent to the Dock 1400, the original message will be encrypted at the originating site prior to transmission. Thus any message must be first be decrypted by Decryption 1410 object prior to its use. When a message is first received, this object will retrieve the encryption key from the System Information Database 1428 and then apply it to the message header, which contains the PIN. This information is then sent to the DisplayApplet 1414 object. Once the customer's PIN has been validated, the DisplayApplet 1414 informs this object and the message contents are then decrypted. The decrypted message is then sent to the Formatter 1412. The process is repeated for each message. This object 1410 also decrypts previously unprocessed and processed messages in the Push Message queue 1426.

The Formatter 1412 is responsible for matching (i.e., mating) the message (i.e., transmitted file) to the native applet (i.e., program residing on the customer's computer), thus creating the display applet that will be viewed. Once the applet is created, it is sent to the Display Applet 1414 component. Note: The term applet may either be a program or scripting language and not tied to any development language or platform. For example, two possible program structures for the display applet may be messages written in XML (i.e., scripting language) and Java (i.e., programming language).

For an XML messages, the native applet uses the XML document for data used to populate the text fields.

For Java messages (i.e., or similar file structures), the Formatter 1412 uses the two applets (i.e., message and native applet) to create (i.e., link) a functional applet from the two applets. Prior to the creation of the functional applet, the message and native applets are non-functional (i.e., cannot be executed)).

The DisplayApplet object 1414 is responsible for displaying the push message, processing the customer's keystrokes, and capturing the customer's response and a customer-specified stale date, the date upon which Server must process the response or else consider the response void. This component is also responsible for validating the customer's PIN.

The Response Extractor object 1416 is responsible for formatting the customer's response into the proper format. It receives the customer's responses from the Response Extractor 1416. One possible format for the response is an XML document, though other languages or formats may be used.

The Encryption object 1418 is responsible for encrypting the XML response document for transmission to the Server. It is uses the encryption key stored in the System Information Database 1428.

The GUIViewer object 1422 is responsible for three principal functions. First it displays unprocessed and processed messages. Processed message are first retrieved from this object and then sent to the DisplayApplet 1414 object for processing. The historical processed messages are displayed in a list and then the customer has the option of viewing the details (e.g., original message, response, confirmation, and date/time stamp). This object also displays the confirmation and error messages, as well as providing navigational options (e.g., menus, lists, etc.).

Second, the GUIViewer 1422 localizes the object will localize the display and controls (e.g., menus and text fields). This object will determine the locale by the version of the customer's computer operating system. The option also exists to localize the GUI, based on the customer's profile, independent of the operating system. The XML message format includes provisions for localizing the message. Locale information can be stored in resource files or in the System Information Database 1428.

Thirdly, the GUIViewer 1422 acts as the primary interface for customer initiated messages. The customer can request changes to their profile from a menu option. Upon selecting this option, the customer is presented with several profile change options. After entering their changes, the customer then elects to send their changes to the Server. Upon this selection, the changes are formatted and encrypted. The AppletViewer 1404 then establishes a communications connection with Chase and transmits the changes.

The Vcontroller object 1424 is responsible for the retrieval of unprocessed and historical processed messages from the Push Message queue 1426 and controlling their decryption and formatting. Messages are retrieved in priority and stale date order, where stale date has the greater precedence. This object will also periodically (at a specified time) check the Push Message queue 1426 for any messages that have a stale date reaching their expiration threshold. If the threshold is being reached, this object will send an alert reminder message to the GUIViewer object 1422.

Figure 30A:
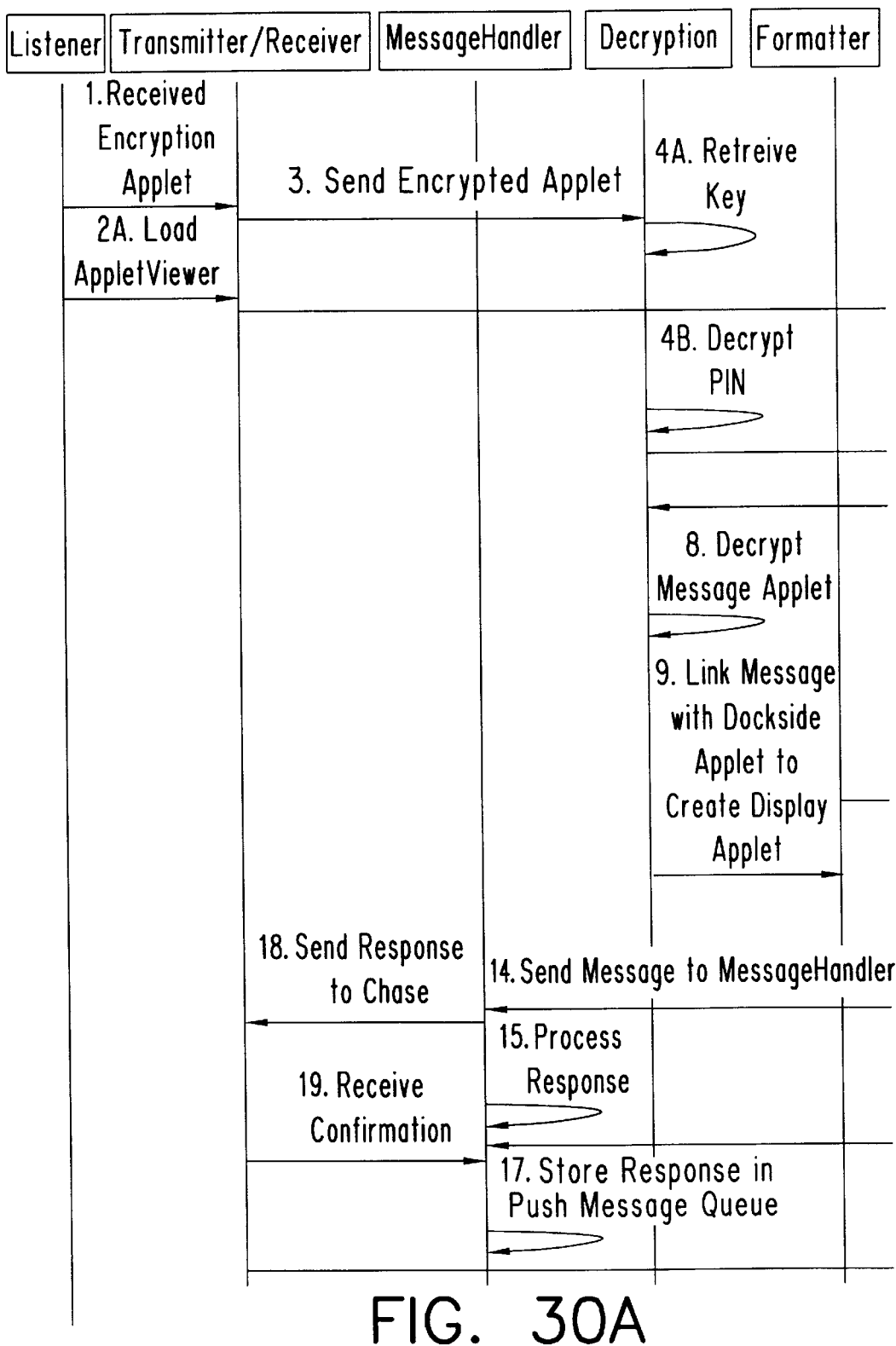
FIG. 30 shows the process of sending an Applet instead of an XML document to a Dock.
Figure 30B:
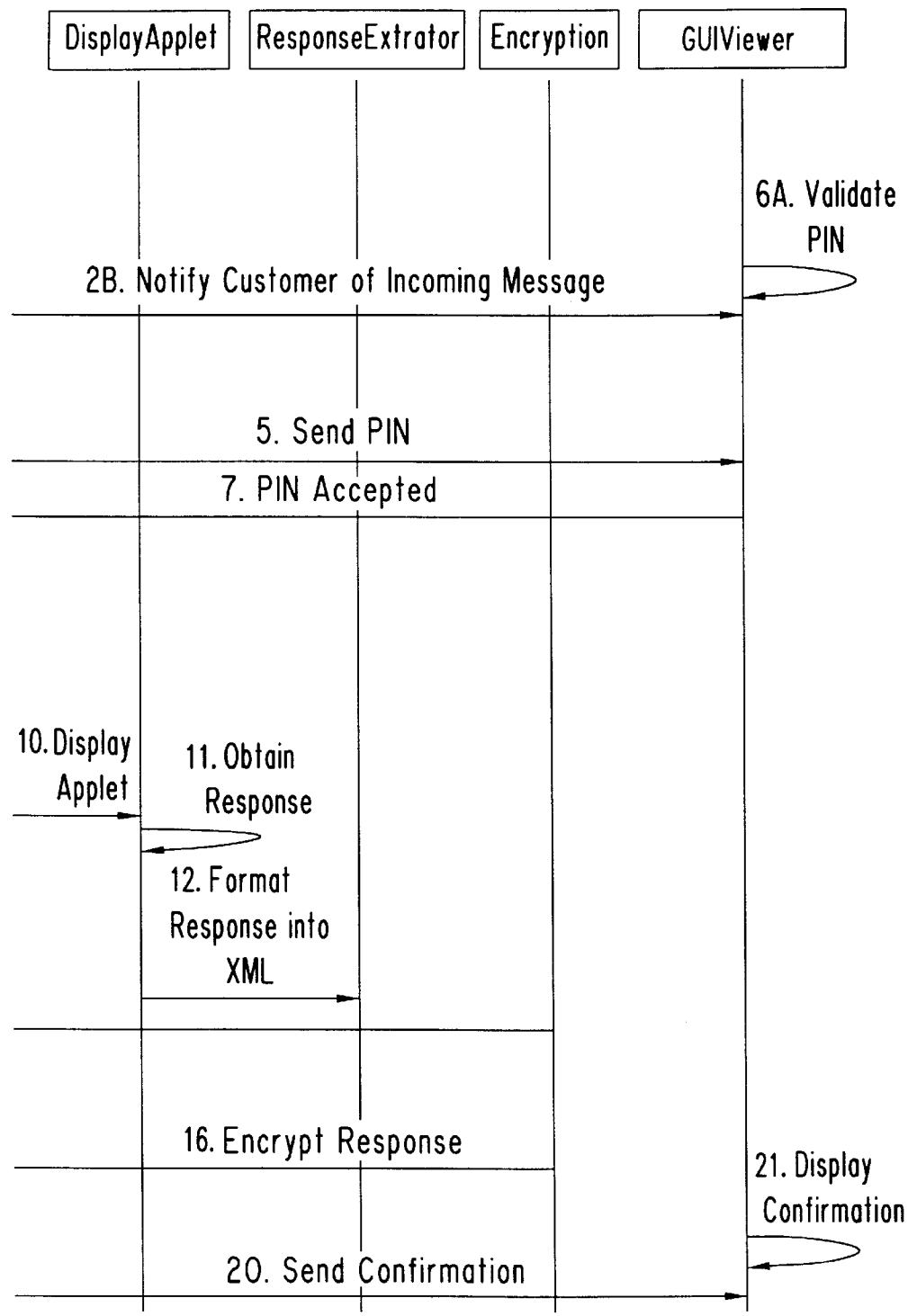
Figure 31A:
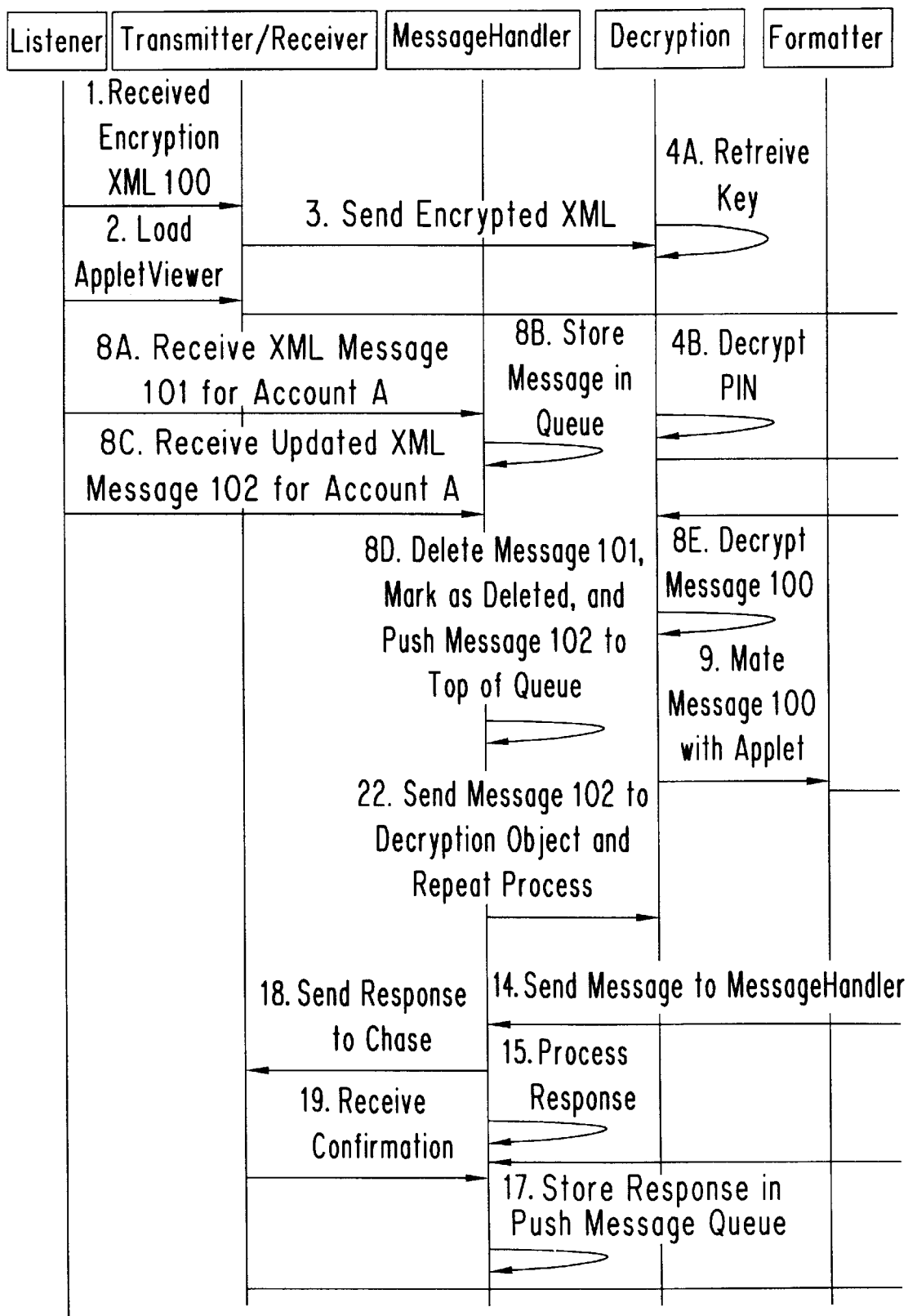
FIG. 31 illustrates the process of reprioritizing and cleaning up unprocessed messages.
Figure 31B:
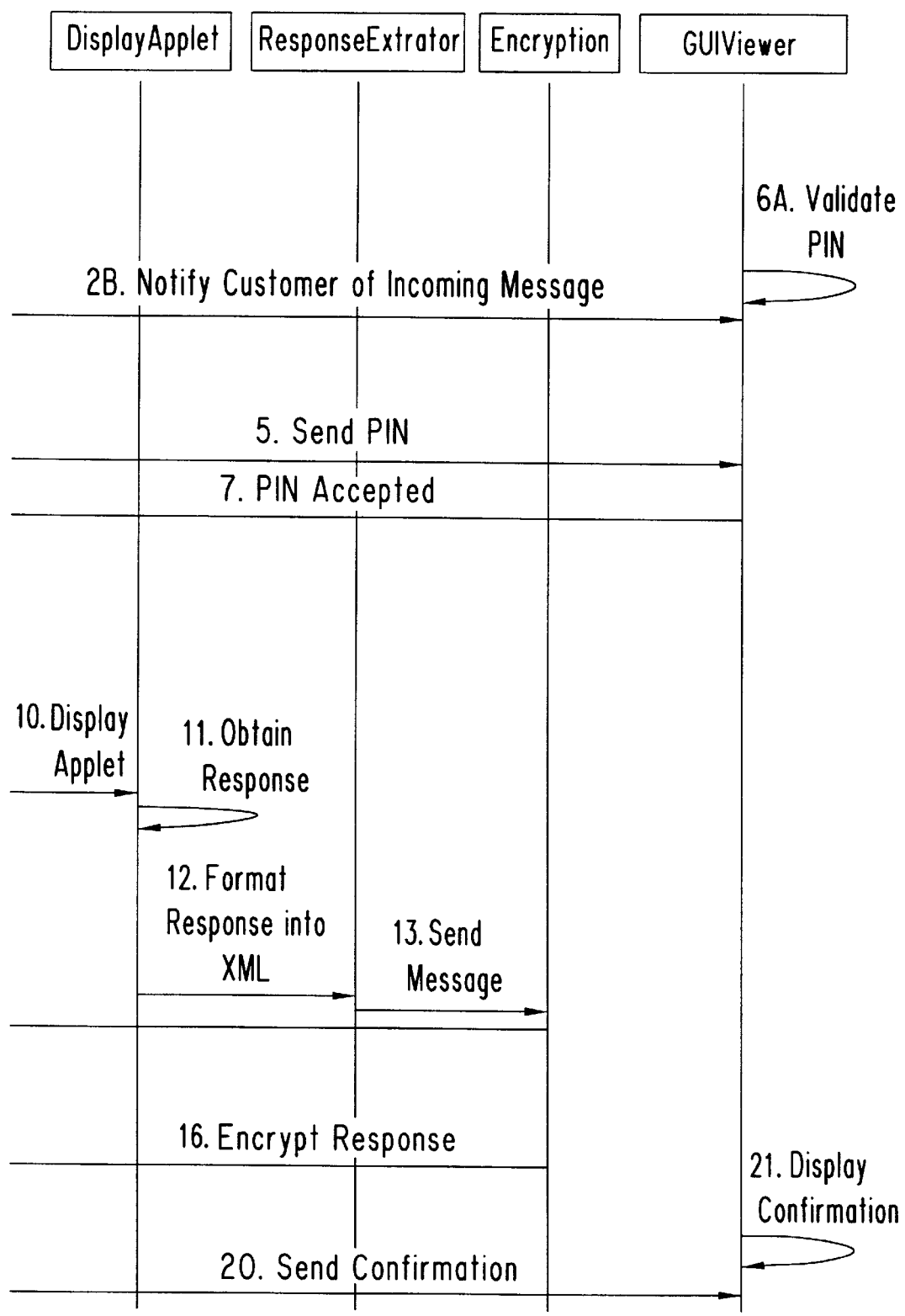
Figure 32A:
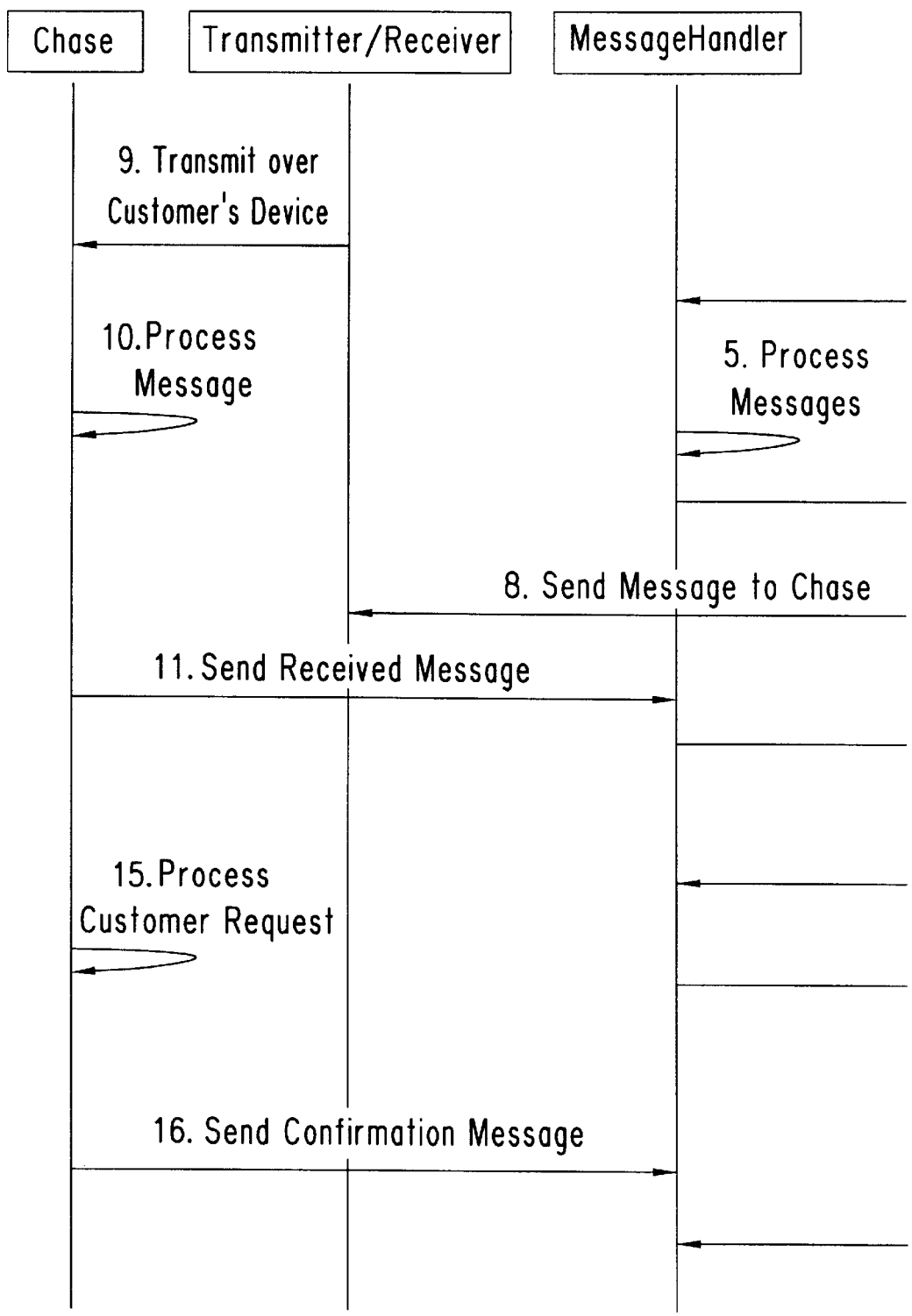
FIG. 32 shows the process for a Customer initiated message.
Figure 32B:
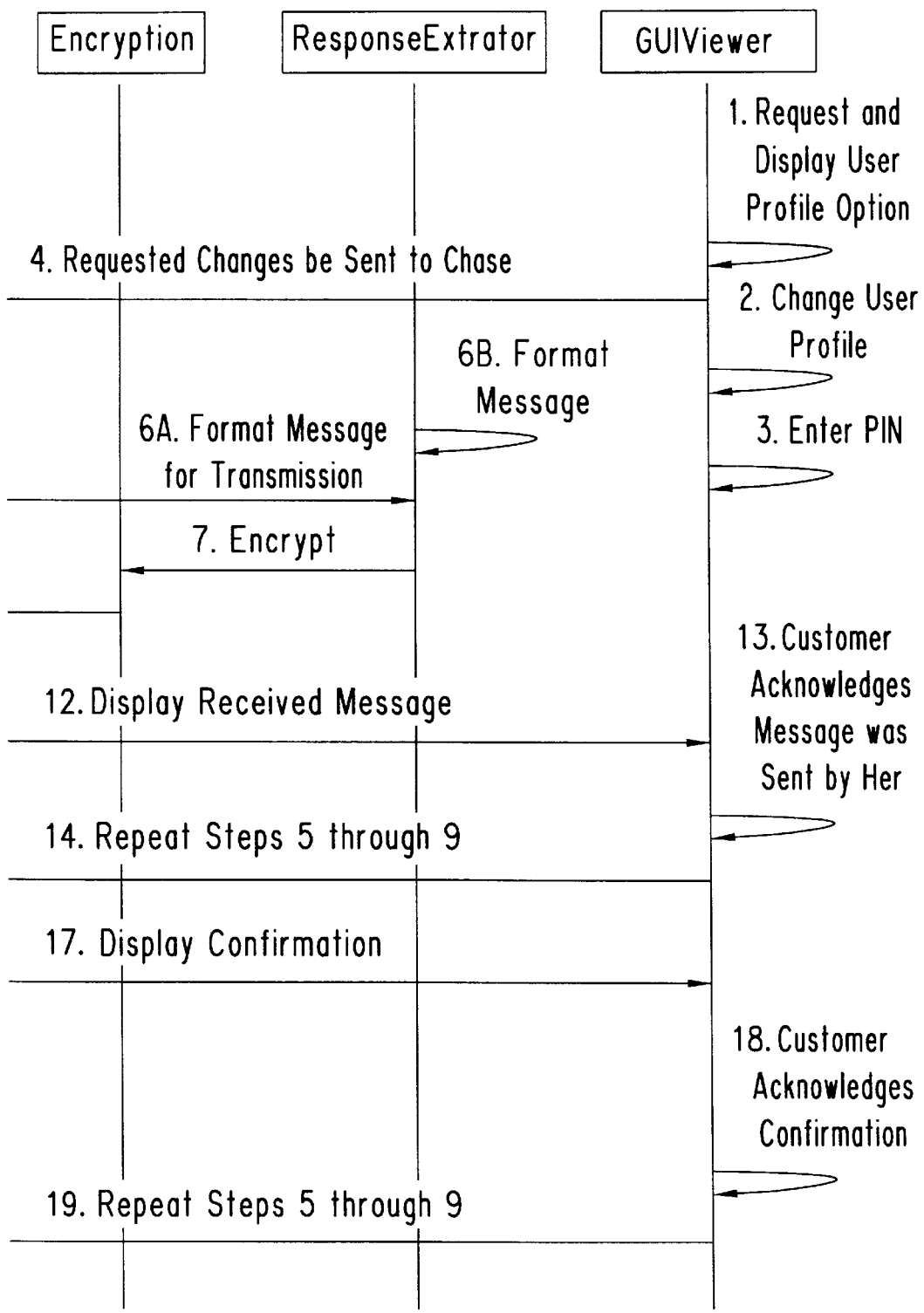

FIGS. 30–32 contain three sequence diagrams illustrating further Dock processing. FIG. 30 depicts an applet being sent to the dock instead of an XML document. The applet is then mated with the Dock's inactive applet. FIG. 31, illustrates the reprioritization and cleanup of unprocessed messages. While a message is being processed by the customer and another message is in the queue, a new message arrives which supersedes the queue's message. FIG. 32 depicts a scenario where a customer initiates a change to their customer profile and transmits the changes to the Server.

The following section describes Pager/Processing components which are responsible for transmitting a message(s) from the system to a customer and retrieving the customer response(s) from a paging company's network.

This section addresses the transmission and receptions of two and one-way pager messages. Paging devices are defined as devices that support either two-way transmission (i.e., message transmission and response reception) or one-way transmission (i.e. from the system to the Customer) and adhere to the standard paging architectural. Additionally, this section addresses the application from the server side. This application, hereafter referred to as Server, is a series of components designed to scale as its use warrants it.

Figure 33:
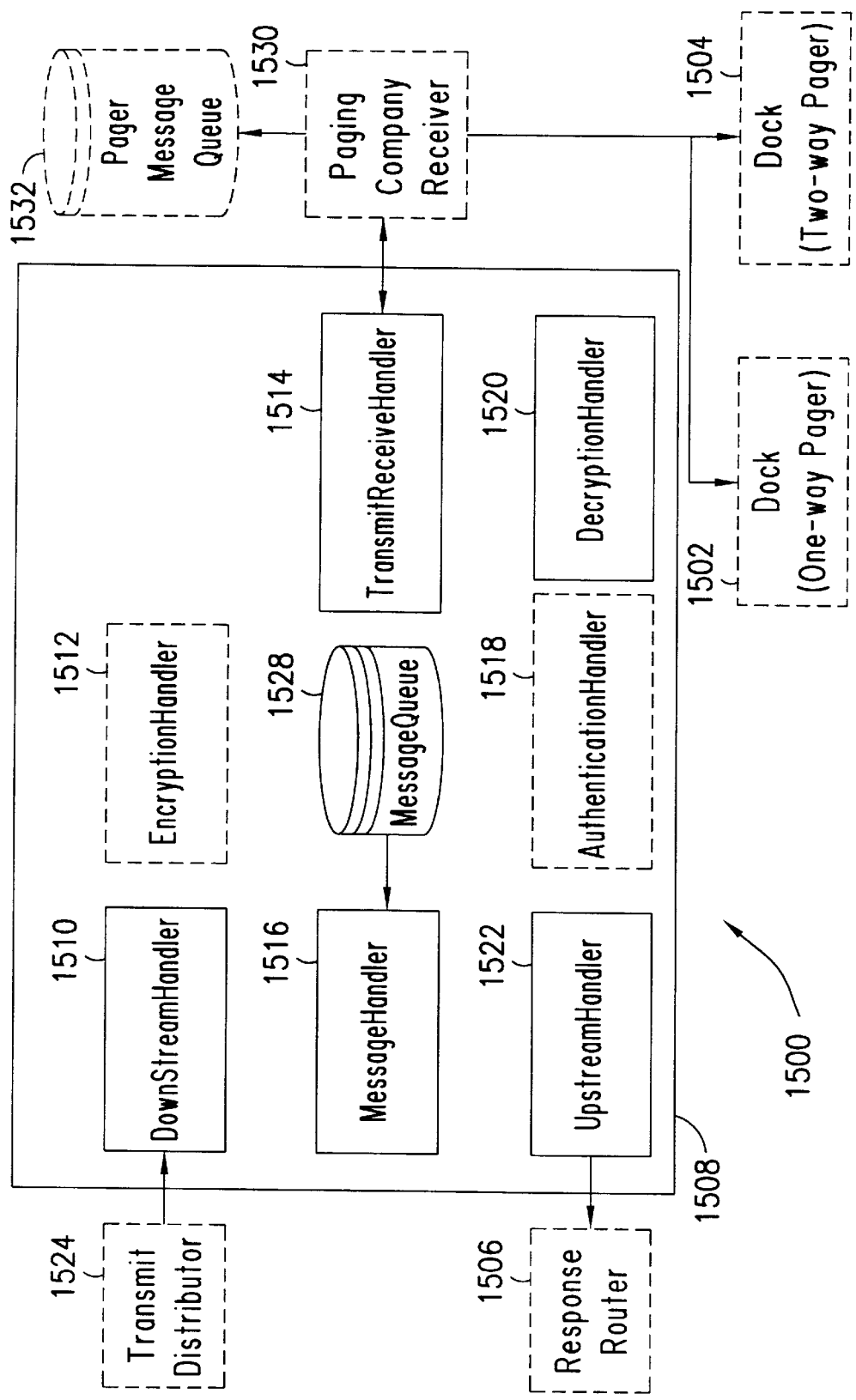
FIG. 33 depicts the architectural components of a Server configuration for pager processing including the components at the Bank, the paging company and the pager.

As depicted in FIG. 33 Pager Processing components 1500 reside at the Server and utilize the paging company's network to communicate with the customer's pager. These separate components form the Page Processing Architecture. The Architecture will support the following services: format and transmit messages to the client's one-way 1502 or two-way pagers 1504; retrieval of customer's responses and status from intelligent pagers (e.g. two-way pagers and SkyWriter 2000); encrypt all transmissions; monitor all transmissions and forward the status to the Response Router 1506; prioritize outgoing messages; and Support the transmission to a wide range of pagers.

Once the Server 1508 receives a request to transmit a message, it then determines the destination device transmission characteristics based on the Code Field, formats the message, encrypts and transmits it. After transmission, the Server 1508 waits for a reception confirmation message from the Pager 1502, 1504. Once a confirmation message is received, the Server 1508, waits for response message.

The Server 1508 receives and processes messages from the Dock 1502, 1504, (i.e. pager) via the NOC (i.e. Paging Company's Network Operating Center). These messages range from status messages to customer initiated messages. Once a response is received, the response (i.e. message) is first virus scanned and decrypted. After its decrypted, it is authenticated, formatted, and send to the Response Router 1506. The Response Router 1506 is responsible for forwarding the message to appropriate object.

All receptions and transmissions between the Server 1508 and Dock 1502, 1504 are be encrypted. The Server 1508 determines the appropriate encryption method.

Once a message is sent downstream, the Server 1508 will monitor for an updated status from the Dock 1502, polling the NOC. If a response is not received in a specified time, the Server 1508 either retransmits the message for non-intelligent devices or sends a status message to the Response Router 1506. Retransmission is based on the customer's profile and device. The following are some of the responses the Server 1508 will forward to the Response Router 1506: When a message(s) was received along with a time stamp; if customer has viewed a message; messages that are approaching the state time threshold and have not been responded to by the customer; messages who's stale time expired without a response by the customer; communication error messages; and customer initiated messages.

Since the number of outgoing messages may exceed the capacity of the NOC, the Server 1508 is able to prioritize outgoing messages based on priority level and stale time. Should the Server 1508 not be able to transmit a message before its stale date is reached, it will inform the Response Router 1506 of this condition. The Server 1508 then removes the message from its message queue and marks it accordingly.

The Server 1508 must support a wide range of pagers 1502, 1504. These pagers 1502, 1504 can range from one-way devices to Java enabled devices once they are introduced.

Unlike other intelligent devices, the two-way pagers 1504 do not presently allow a bank or other organization to develop unique services for the pager. For example, the following services are not supported in either two-way or one-way pagers. Automatic cleanup messages cannot be deleted automatically at the client side and must be deleted by the customer. This limitation implies the Server 1508 could conceivably fill a customer's pager with messages. While this is not a problem with one-way pagers (i.e. these devices only store one copy of a duplicate telephone number), two-way pagers will store duplicate messages. Once a pager allows the Server 1508 to remotely delete unread messages, then this feature can be supported. Message prioritization—since the Server 1508 does not have direct access to a customer's pager, messages at the client side cannot be prioritized. Encryption—presently pagers do not support encryption or Java Virtual Machines (i.e. JVM). As a result, "push" transmission will be generic in scope and will not contain any sensitive information at this time. Once encryption and/or Java becomes available, then transmit messages can be customized and encrypted.

The Server 1508 is responsible for two modes of communications; transmission and reception of customer messages. Like the Internet Dock Server (see FIG. 24) it is designed to function concurrently in the two modes. The Server 1508 consists of several objects, which support these functions. These objects are: DownStreamHandler 1510; EncryptionHandler 1512; TransmitHandler 1514; MessageHandler 1516; AuthenticationHandler 1518; DecryptionHandler 1520; and UpstreamHandler 1522.

The DownstreamHandler 1510 is responsible for receiving messages from the Transmit Distributor 1524. It is also responsible for resolving any communication errors that may occur during interprocess communication. Upon receiving and validating the message, this object sends the message to the MessageHandler 1516.

The MessageHandler 1516 is responsible for processing downstream and upstream messages. Downstream tasks include processing messages for transmission and reprioritizing messages.

For message transmission, this object 1516 determines the destination device characteristics (e.g. PIN number, hours of operation) from the customer's profile and message format. Once the device characteristics are determined, the message is formatted accordingly and sent to the EncryptionHandler 1512.

Reprioritization requires the MessageHandler 1516 to determine when a message should be transmitted. To determine the message's priority, two elements are considered: Message's priority level and expiration stale date. For example, a message was originally marked as the tenth message for transmission. The MessageHandler 1516 determines it should be the second and then reprioritizes it. Additionally, for messages for non-intelligent devices are retransmitted as per their customer profile. For example, a customer profile states that if they do not respond to a page in one hour and another page should be sent out. The MessageHandler 1516 tracks the time between transmission and transmits it accordingly.

Upstream tasks include monitoring the status of messages and sending the messages to the Response Route 1506.

Monitoring of messages requires the MessageHandler 1516 to either determine it a response has been received for "push" message or analyzing response. If a response has not been received during a specified time, the MessageHandler 1516 will either have the message retransmitted or remove the message from the message queue 1528. In any event, the Response Router 1506 is informed of the action. If a response has been received, the MessageHandler 1516 determines if a message should be retransmitted, wait for additional status updates, or remove the message from the message queue. For example, communication errors would require that a message be retransmitted. Status updates, such as "message has been received", requires the MessageHandler 1516 to keep monitoring for a customer response. Whereas customer responses are formatted (e.g. date and time received are added) forwarded to the UpstreamHandler 1522 and then delete from the message queue 1528. Note the MessageHandler 1516 must poll the paging company's database to obtain the status and/or message.

The Transmit/ReceiveHandler object 1514 is responsible for physically transmitting and receiving messages to/from the Dock via the Paging Company 1530. Typically, communications between the Server 1500 and the paging company 1530 is done via a leased line. The individual Dock drivers communicate with this object to transfer the message. These dock drivers are the paging company's 1530 communication protocols.

As new Dock devices 1502, 1504 are introduced, their drivers only have to interface with this object 1514. This object 1514 is also responsible for resolving any communication errors that may occur during communications with the Dock 1502, 1504.

The EncryptionHandler object 1512 is responsible for encrypting the message for transmission to the Dock 1502, 1504. The approved security standard will be used for encryption. If the paging company 1530 only provides encryption, then this object is not needed.

The DecryptionHandler object 1520 is responsible for decryption of the upstream message. If the paging company 1530 only provides decryption, then this object is not needed.

The AuthenticationHandler object 1518 is responsible for authenticating the incoming messages. If a message fails authentication, the MessageHandler 1516 is informed and an alert is sent to the Response Router 1506. The Messagehandler 1516 then waits for instructions from the Transmit Distributor 1524.

The Upstream Handler object 1522 responsible communicating with the Response Router 1506. It is also responsible for resolving any communications errors between the two objects.

Paging Company Receiver 1530 is not the Server's domain, it is responsible for communicating directly with pagers 1502, 1504 and the TransmitReceiveHandler 1514. All communication messages are stored in the Pager Message Queue 1532 for retrieval by MessageHandler.

Figure 34A:
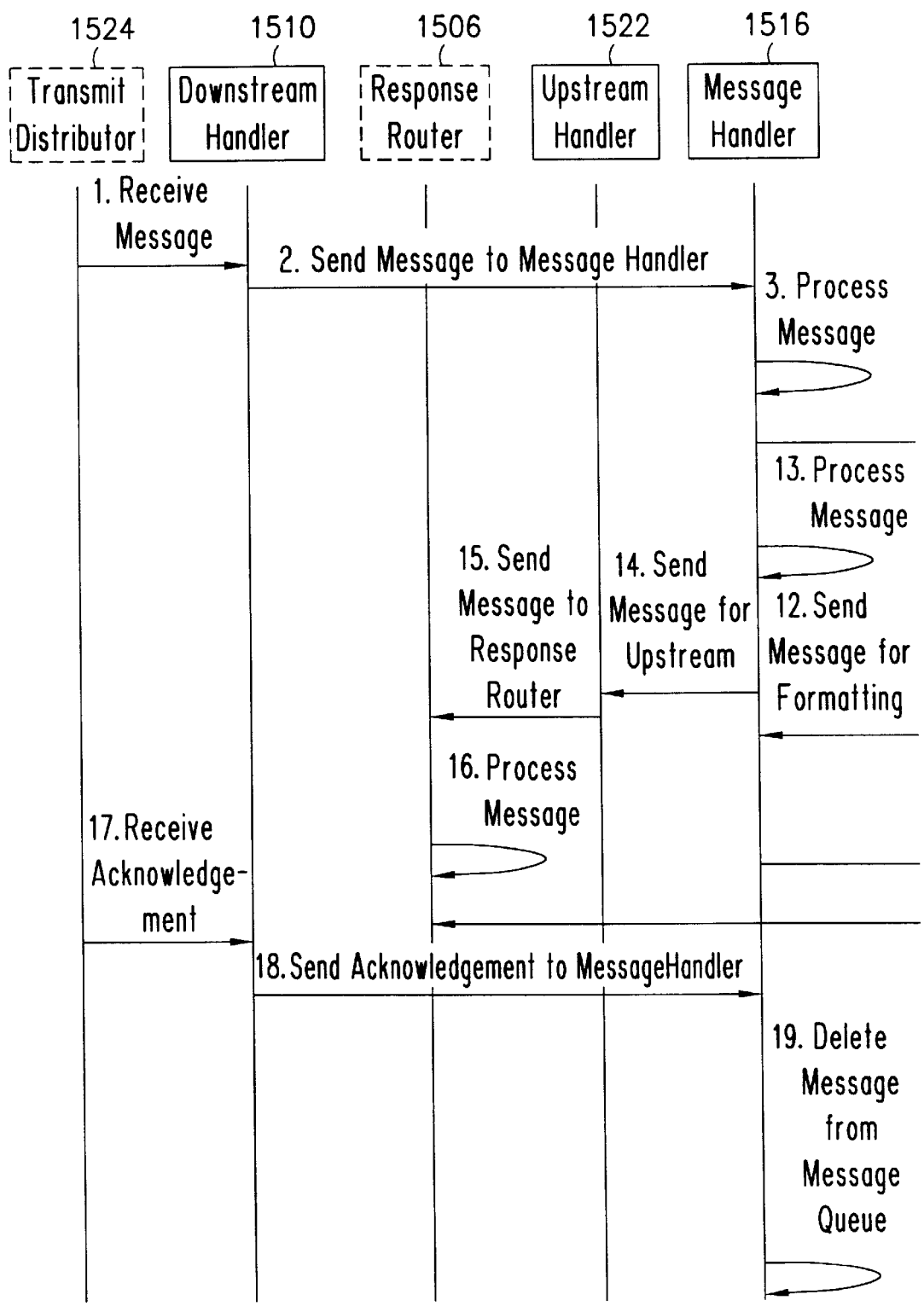
Figure 35B:
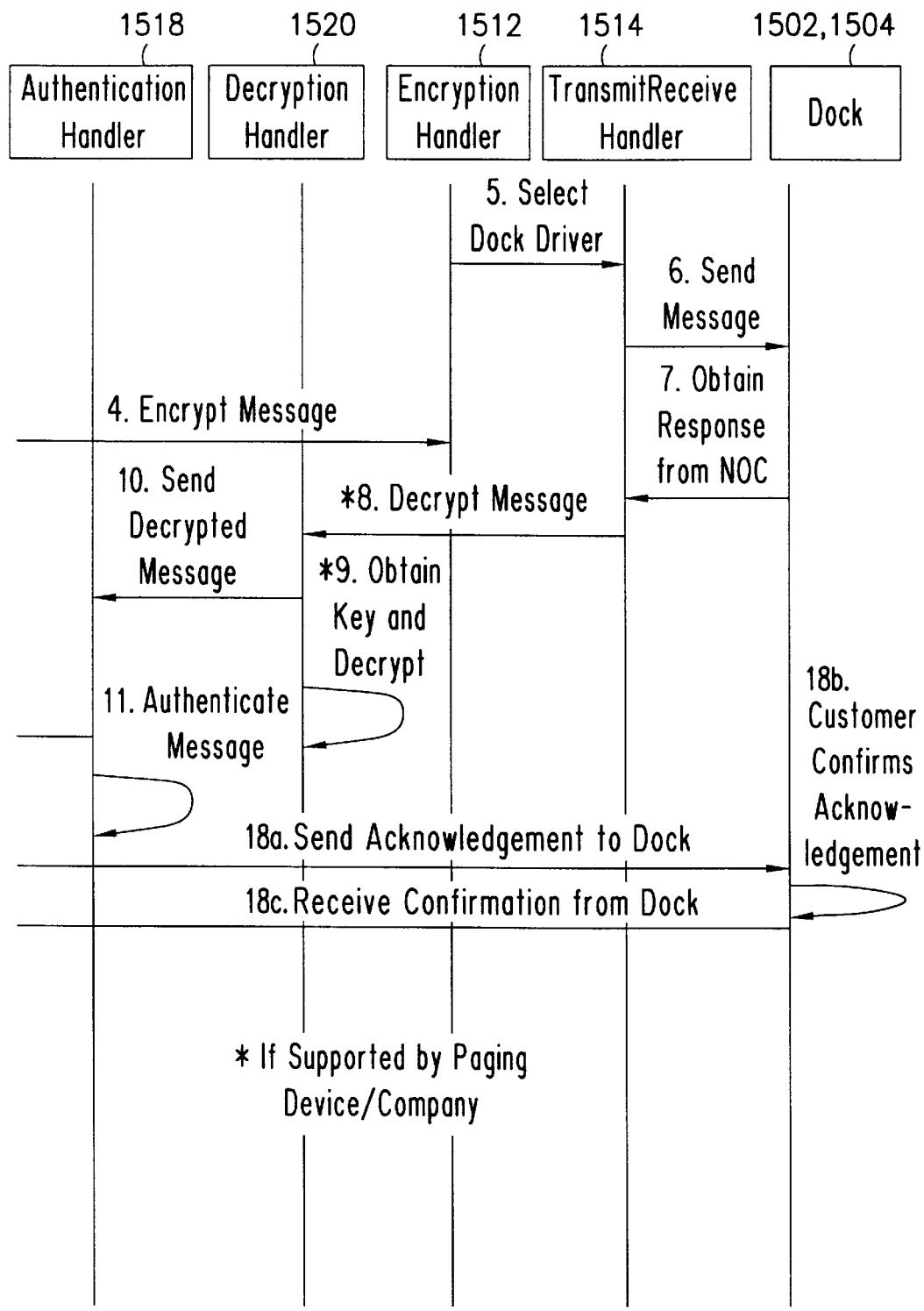

FIGS. 34A and 34B illustrates the process flow of a message from the Server 1508 to a paging device 1502, 1504 and the response thereto.

The Push Banking system teaches a new method of communications called "metanetworking." Previous communications systems concerned themselves with sending a message from one terminal across a network to a receiving terminal. Sometimes networks were linked, e.g. an internal Lotus Notes E-mail system is linked to the Internet e-mail or a computer network notifies a technician via pager that a component has gone down.

Metanetworked communications rises above standard network software and hardware systems and acts as an "orchestrator" for general communications needs. The primitive subjects of a metanetwork are 1) the Sender and Receiver/Responder as communicating persons and or entities and 2) the Message (i.e. the "application layer" content of a message or its meaning).

Metanetworking requires features ordinary network don't have 1) The Sender's reasons for sending a message, the Receiver/Responder's rules for accepting messages and the actual content of the message must be stored in profiles, queues and caches and constantly be re-evaluated across the dimension of Time and vis-a-vis the capabilities of the standard communications networks (e.g. via artificial intelligence control tools). 2) All existing networks must be accessible to the metanetwork in order to optimize message delivery. 3) Once a message is responded to or goes "stale" copies of it in other networks or on other devices must be cleaned out of the system. 4) Messages must be reprioritizable "on the fly" in order to respond to changing situations of the Sender and/or Receiver.

The Push Banking system is an instantiation of a metanetwork. The Communications, Decision making and Caching Component (CDMC) 1100 (FIGS. 22 and 23) is the basic functional unit of a metanetwork communications system.

Although the present invention has been described in relation to particular embodiments thereof, many other variations and modifications and other uses will become apparent to those skilled in the art. It is preferred, therefore, that the present invention be limited not by the specific disclosure herein, but only the gist and scope of the disclosure.

What is claimed is:

1. A method comprising:

identifying information related to a subscriber;

identifying at least two different channels of communication with which to communicate with the subscriber;

creating a message containing the information, the message further containing response information enabling the subscriber to generate and transmit a response to the message over at least one of the two channels of communication; and transmitting the message to the subscriber contemporaneously on the at least two different channels of communication.

2. A method as recited in claim 1, wherein there are a plurality of subscribers, the method further comprising performing each of the method steps for each of the subscribers.

3. A method as recited in claim 1, further comprising:

creating a plurality of messages;

establishing a priority of the plurality of messages; and wherein the step of transmitting includes transmitting messages in accordance with the established priority.

4. A method as recited in claim 1, further comprising retransmitting a message if a response has not been received from the subscriber in a predetermined period of time.

5. A method as recited in claim 1, further comprising receiving an acknowledgement that the message was successfully transmitted over at least one of the at least two channels of communication.

6. A method as recited in claim 1, further comprising encrypting the message prior to its transmission.

7. A method as recited in claim 1, further comprising formatting the message for each of the at least two channels of communication prior to transmission.

8. A method as recited in claim 1, wherein the information is time critical.

9. A method as recited in claim 1, further comprising:
identifying at least one alternative channel of communication with which to communicate with the subscriber; and
transmitting the message over the at least one alternative channel of communication if a response has not been received from the subscriber in a predetermined period of time.

10. A method as recited in claim 1, further comprising assigning a time at which the message will become stale.

11. A method as recited in claim 10, further comprising periodically retransmitting the message until the message becomes stale or until a response is received from the subscriber.

12. A method as recited in claim 1, further comprising receiving a response to the message from the subscriber.

13. A method as recited in claim 12, wherein the information is related to at least one account of the subscriber, the method further comprising altering the at least one account of the subscriber in response to the response from the subscriber.

14. A method as recited in claim 12, further comprising authenticating the transmitted message and the received response.

15. A method as recited in claim 1, wherein the act of identifying the information further includes monitoring at least one data source for information which affects the subscriber.

16. A method as recited in claim 15, wherein the subscriber has accounts at a financial institution and wherein the monitoring step includes monitoring the accounts.

17. A method as recited in claim 15, wherein the method is performed on a system and wherein the monitoring step includes monitoring databases within the system and monitoring external data sources.

18. A method comprising:
identifying information related to a subscriber's account;
creating a message containing the information;
embedding the message in an applet, the applet providing functionality for the subscriber to display the message, to respond to the message, and to alter the subscriber's account; and
transmitting the applet to the subscriber.

19. A method comprising:
identifying information related to a subscriber;
identifying at least one channel of communication with which to communicate with the subscriber;
creating a message containing the information;
transmitting the message to the subscriber on the at least one channel of communication;
receiving a response from the subscriber; and
correlating the response to the message.

20. A method a recited in claim 19, the method further comprising:
creating transmission information indicating that the message was transmitted; and
wherein the step of correlating includes modifying the transmission information indicating the response has been received.

21. A method a recited in claim 19, wherein the information is related to at least one account of the subscriber, the method further comprising:
altering the at least one account of the subscriber in response to the response from the subscriber.

22. A method of communicating with subscribers to a system, the method comprising:
establishing subscriber profiles for a plurality of subscribers, the subscriber profiles containing information related to subscriber identification, preferred channels of communication and alternative channels of communication;
periodically scanning at least one of databases internal to the system and data sources external to the system for first information which affects any of the plurality of subscribers;
actively monitoring at least one of the databases internal to the system and data sources external to the system for updates and identifying second information which affects any of the plurality of subscribers;
determining if any of the first and second information should be communicated to any of the plurality of subscribers, any such information so determined being denoted as determined information;
creating at least one message containing the determined information;
identifying at least one of the plurality of subscribers to which the determined information should be communicated;
retrieving from the subscriber profile, the information related to the preferred channels of communication for the at least one of the plurality of subscribers;
formatting the at least one message for the preferred channels of communication for the at least one of the plurality of subscribers;
encrypting the at least one message;
assigning a time at which the at least one message will become stale;
transmitting the at least one message over the preferred channels of communication for the at least one of the plurality of subscribers;
monitoring for receipt of an acknowledgement of successful transmission of the at least one message over at least one of the preferred channels of communication for the at least one of the plurality of subscribers;
if an acknowledgement is not received in a first predetermined time, retrieving from the subscriber profile the information related to the alternative channels of communication for the at least one of the plurality of subscribers, and transmitting the at least one message over the alternative channels of communication for the at least one of the plurality of subscribers;

monitoring for receipt of a response from the at least one of the plurality of subscribers;

if the response from the at least one of the plurality of subscribers has not been received in a second predetermined period of time, retransmitting the at least one message over at least the preferred channels of communication for the at least one of the plurality of subscribers;

terminating the retransmission step if the at least one message has become stale;

receiving the response from the at least one of the plurality of subscribers; and authenticating the response from the at least one of the plurality of subscribers.

23. A method comprising:

identifying information related to at least one account of a subscriber;

identifying at least one channel of communication with which to communicate with the subscriber;

creating a message containing the information, the message further containing response information enabling the subscriber to generate and transmit a response;

transmitting the message to the subscriber on the at least one channels of communication;

receiving a response to the message from the subscriber; and altering the at least one account of the subscriber in response to the response from the subscriber.

24. A system for communicating with a subscriber to the system, the system comprising:

an information identification module identifying update information related to the subscriber;

a subscriber database containing channel information which identifies at least two different channels of communication with which to communicate with the subscriber;

a message generation module coupled to the information identification module and generating a message containing the update information, the message further containing response information enabling the subscriber to generate and transmit a response to the message over at least one of the two channels of communication; and a communication layer coupled to the message generation module, the communication layer including interfaces to the at least two channels of communication, the communication layer transmitting the message to the subscriber contemporaneously on the at least two different channels of communication.

25. A system as recited in claim 24, wherein there are a plurality of subscribers to the system.

26. A system as recited in claim 24, wherein the message generation module generates a plurality of messages, the system further comprising a prioritization module coupled to the message generation module and establishing a priority of the plurality of messages, and wherein the communication layer transmits the plurality of messages in accordance with the priority established by the prioritization module.

27. A system as recited in claim 24, wherein the communication layer retransmits the message if a response has not been received from the subscriber in a predetermined period of time.

28. A system as recited in claim 24, wherein the communication layer receives an acknowledgement that the message was successfully transmitted over at least one of the at least two channels of communication.

29. A system as recited in claim 24, further comprising and encryption module coupled to the message generation module, the encryption module encrypting the message prior to its transmission by the communication layer.

30. A system as recited in claim 24, further comprising a message formatter coupled to the message generation module, the message formatter formatting the message for each of the at least two channels of communication prior to transmission by the communication layer.

31. A system as recited in claim 24, wherein the update information is time critical.

32. A system as recited in claim 24, further comprising an interface in the communication to at least one alternative channel of communication with which to communicate with the subscriber; and wherein the communication layer transmits the message over the at least one alternative channel of communication if a response has not been received from the subscriber in a predetermined period of time.

33. A system as recited in claim 24, further comprising an administration module coupled to the message generation module, the administration module assigning a time at which the message will become stale.

34. A system as recited in claim 33, wherein the communication layer periodically retransmits the message until the message becomes stale or until a response is received from the subscriber.

35. A system as recited in claim 24 wherein communication layer receives a response to the message from the subscriber, the system further comprising a response module coupled to the communication layer and processing the response from the subscriber.

36. A system as recited in claim 35 wherein the update information is related to an account of the subscriber, the system further comprising an alteration module coupled to the response module, the alteration module altering the account of the subscriber in response to the processing of the response by the response module.

37. A system as recited in claim 35, further comprising an authentication module coupled to the message generation module and coupled to the response module, the authentication module authenticating the message generated by the message generation module and authenticating the response processed by the response module.

38. A system as recited in claim 24, further comprising at least one data source, wherein the information identification module is coupled to the at least one data source and monitors the least one data source for the update information.

39. A system as recited in claim 38, wherein the at least one data source is an account information data source at a financial institution.

40. A system as recited in claim 38, further comprising an external database interface, wherein the information identification module is coupled to the external database interface and monitors the external database for the update information.

41. A system for communicating with subscribers comprising:

an information identification module identifying update information related to the subscriber;

a message generation module coupled to the information identification module and generating a message containing the update information;

at least one communication channel;

a communication channel interface coupled to the message generation module and coupled to the at least one communication channel, the communication channel interface transmitting the message to the subscriber on the at least one communication channel and receiving a response from the subscriber on the at least one communication channel; and a response module coupled to the communication channel interface and correlating the received response to the transmitted message.

* * * * *